US011070791B2

(12) United States Patent
Woodgate et al.

(10) Patent No.: US 11,070,791 B2
(45) Date of Patent: Jul. 20, 2021

(54) PRIVACY DISPLAY APPARATUS

(71) Applicant: RealD Spark, LLC, Beverly Hills, CA (US)

(72) Inventors: Graham J. Woodgate, Henley on Thames (GB); Jonathan Harrold, Leamington Spa (GB); Michael G. Robinson, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/760,419

(22) PCT Filed: Nov. 5, 2018

(86) PCT No.: PCT/US2018/059256
§ 371 (c)(1),
(2) Date: Apr. 29, 2020

(87) PCT Pub. No.: WO2019/090252
PCT Pub. Date: May 9, 2019

(65) Prior Publication Data
US 2020/0341305 A1    Oct. 29, 2020

Related U.S. Application Data

(60) Provisional application No. 62/582,030, filed on Nov. 6, 2017.

(51) Int. Cl.
*G02F 1/1347* (2006.01)
*H04N 13/30* (2018.01)
(Continued)

(52) U.S. Cl.
CPC ........... *H04N 13/30* (2018.05); *G02B 6/0048* (2013.01); *G02B 6/0068* (2013.01); *G02F 1/13* (2013.01);
(Continued)

(58) Field of Classification Search
CPC . H04N 13/30; G02F 1/1323; G02F 1/133536; G02F 2001/13478; G02F 2001/133562
See application file for complete search history.

(56) References Cited

U.S. PATENT DOCUMENTS 4,621,898 A    11/1986  Cohen
4,974,941 A    12/1990  Gibbons et al.
(Continued)

FOREIGN PATENT DOCUMENTS

CA        2222313 A1     6/1998
CN       104133292 A    11/2014
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Donald L Raleigh
(74) *Attorney, Agent, or Firm* — Penny L. Lowry

(57) ABSTRACT

A privacy display comprises a luminance-privacy arrangement and a contrast-privacy arrangement. In a privacy mode of operation, ambient light levels are detected and a visual security level is calculated. At and above a visual security level threshold the luminance-privacy arrangement is operable and below the threshold both the luminance-privacy and contrast-privacy arrangements are operable. Image quality for on-axis users is optimised and high levels of visual security are achieved for off-axis snoopers over a wide range of display illuminance conditions.

16 Claims, 45 Drawing Sheets

(51) Int. Cl.

| | |
|---|---|
| *F21V 8/00* | (2006.01) |
| *G02F 1/295* | (2006.01) |
| *G02F 1/365* | (2006.01) |
| *G02F 1/1335* | (2006.01) |
| *G02F 1/13* | (2006.01) |
| *G02F 1/13363* | (2006.01) |
| *G02F 1/1337* | (2006.01) |
| *G02F 1/137* | (2006.01) |
| *G02F 1/13357* | (2006.01) |

(52) U.S. Cl.
CPC ............ *G02F 1/137* (2013.01); *G02F 1/1323* (2013.01); *G02F 1/1337* (2013.01); *G02F 1/1347* (2013.01); *G02F 1/13363* (2013.01); *G02F 1/133524* (2013.01); *G02F 1/133528* (2013.01); *G02F 1/133536* (2013.01); *G02F 1/133615* (2013.01); *G02F 1/133753* (2013.01); *G02F 1/295* (2013.01); *G02F 1/365* (2013.01); *G02B 6/0011* (2013.01); *G02F 1/13478* (2021.01); *G02F 1/13706* (2021.01); *G02F 1/13712* (2021.01); *G02F 1/133562* (2021.01); *G02F 1/133567* (2021.01); *G02F 1/133638* (2021.01); *G02F 1/133738* (2021.01); *G02F 1/133742* (2021.01); *G02F 2203/12* (2013.01); *H04N 2013/403* (2018.05)

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,658,490 A | 8/1997 | Sharp et al. |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1* | 11/2010 | Park ................ G02F 1/134363 349/46 |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |

(56) References Cited

U.S. PATENT DOCUMENTS

| | | |
|---|---|---|
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshavsky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346417 A1 | 12/2015 | Powell |
| 2015/0346532 A1 | 12/2015 | Do et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1* | 12/2016 | Choi ................ G02B 6/0051 |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1* | 3/2017 | Greenebaum ............ G09G 5/10 |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | | |
|---|---|---|---|
| CN | 204740413 U | 11/2015 | |
| CN | 209171779 U | 7/2019 | |
| GB | 2418518 A | 3/2006 | |
| GB | 2428100 A | 1/2007 | |
| GB | 2482065 A | 1/2012 | |
| GB | 2486935 B | 9/2013 | |
| JP | H01130783 U | 9/1989 | |
| JP | 2007273288 A | 10/2007 | |
| KR | 20120011228 A | 2/2012 | |
| KR | 101990286 B1 | 6/2019 | |
| TW | M537663 U | 3/2017 | |
| WO | 2005071449 A2 | 8/2005 | |
| WO | 2010021926 A2 | 2/2010 | |
| WO | 2014011328 A1 | 1/2014 | |
| WO | 2015040776 A1 | 3/2015 | |
| WO | 2015057625 A1 | 4/2015 | |
| WO | 2015143227 A1 | 9/2015 | |
| WO | 2015157184 A1 | 10/2015 | |
| WO | 2015190311 A1 | 12/2015 | |
| WO | WO-2015200814 A1 * | 12/2015 | ............ G02B 6/0068 |
| WO | WO-2017050631 A1 * | 3/2017 | ............ G02B 30/27 |
| WO | 2018035492 A1 | 2/2018 | |
| WO | 2018208618 A1 | 11/2018 | |
| WO | 2019055755 A1 | 3/2019 | |
| WO | 2019067846 A1 | 4/2019 | |
| WO | 2019147762 A1 | 8/2019 | |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.

EP-16860628.3 Extended European Search Report of European Patent Office dated Apr. 26, 2019.

EP-17799963.8 Extended European Search Report of European Patent Office dated Oct. 9, 2019.

Gass, et al. "Privacy LCD Technology for Cellular Phones", Sharp Laboratories of Europe Ltd, Mobile LCD Group, Feb. 2007, pp. 45-49.

Ishikawa, T., "New Design for a Highly Collimating Turning Film", SID 06 Digest, pp. 514-517.

Kalantar, et al. "Backlight Unit With Double Surface Light Emission," J. Soc. Inf. Display, vol. 12, Issue 4, pp. 379-387 (Dec. 2004).

PCT/US2016/058695 International search report and written opinion of the international searching authority dated Feb. 28, 2017.

PCT/US2017/032734 International search report and written opinion of the international searching authority dated Jul. 27, 2017.

PCT/US2018/031206 International search report and written opinion of the international searching authority dated Jul. 20, 2018.

PCT/US2018/031218 International Preliminary Report on Patentability dated Nov. 21, 2019.

(56) References Cited

OTHER PUBLICATIONS

PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/060155 International search report and written opinion of the international searching authority dated Feb. 5, 2021.
PCT/US2020/060191 International search report and written opinion of the international searching authority dated Feb. 8, 2021.
Robson, et al. "Spatial and temporal contrast-sensitivity functions of the visual system", J. Opt. Soc. Amer., vol. 56, pp. 1141-1142 (1966).
PCT/US2020/053863 International search report and written opinion of the international searching authority dated Mar. 12, 2021.
PCT/US2020/063638 International search report and written opinion of the international searching authority dated Mar. 2, 2021.
PCT/US2020/064633 International search report and written opinion of the international searching authority dated Mar. 15, 2021.
Simonyan et al., "Very Deep Convolutional Networks for Large-Scale Image Recognition", ICLR 2015.

* cited by examiner

Reflectivity

PRIVACY DISPLAY APPARATUS

TECHNICAL FIELD

This disclosure generally relates to illumination from light modulation devices, and more specifically relates to switchable optical stacks for providing control of illumination for use in display including privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to the present disclosure, there is provided a display apparatus comprising: a display device arranged to display an image, the display device having a selectively operable luminance-privacy optical arrangement arranged on operation to reduce the luminance of the image to an off-axis viewer, and a selectively operable contrast-privacy optical arrangement arranged on operation to reduce the contrast of the image to an off-axis viewer; and a control system arranged to control the display device, the control system being capable of selectively operating either one or both of the luminance-privacy arrangement and the contrast-privacy arrangement. The control system may be arranged to operate neither of the luminance-privacy arrangement and the contrast-privacy arrangement in a public mode and one or both of the luminance-privacy arrangement and the contrast-privacy arrangement in a privacy mode. Advantageously a privacy display may provide at least one of luminance reduction and contrast reduction to an off-axis viewer in a privacy mode of operation and may be switched to a public mode with high image visibility for off-axis viewers.

The display apparatus may further comprise an ambient light sensor arrange to detect the level of the ambient light, and the control system may be arranged, in the privacy mode, to operate the luminance-privacy arrangement when the ambient light sensor detects first levels of ambient light and to operate both the luminance-privacy arrangement and the contrast-privacy arrangement when the ambient light sensor detects second levels of ambient light below the first levels. The contrast-privacy optical arrangement may be arranged on operation to reduce the contrast of the image to an off-axis viewer by a controllable amount, and the control system may be arranged, when operating the contrast-privacy arrangement, to control the amount of reduction of the contrast of the image to an off-axis viewer in dependence on the detected level of ambient light. The control system may be arranged, in the privacy mode, to determine a visual security level representing the security against viewing of a displayed image by an off-axis viewer, the visual security level being dependent on the level of ambient light detected by the ambient light sensor and increasing as the level of ambient light increases, and the control system may be arranged, in the privacy mode, to selectively operate the luminance-privacy arrangement and the contrast-privacy arrangement to maintain the visual security level above a predetermined threshold.

Advantageously the image observed by an on-axis viewer may have high contrast in high ambient illuminance environments, while achieving desirable visual security to an off-axis snooper. As the illuminance level falls, the visual security level of the display may be maintained at desirable levels. The contrast reduction provided to achieve desirable visual security may be minimised, to achieve increased image visibility to the head-on user.

The display device may comprise: a spatial light modulator; and a display polariser arranged on a side of the spatial light modulator, and the luminance-privacy optical arrangement may comprise: an additional polariser arranged on the same side of the spatial light modulator as the display polariser; and at least one retarder arranged between the additional polariser and the display polariser, the at least one retarder including a switchable liquid crystal retarder comprising a layer of liquid crystal material and electrodes arranged to apply a voltage for switching the layer of liquid crystal material. Advantageously the luminance-privacy arrangement may have high efficiency for public mode operation and high luminance-privacy visual security for high ambient illuminance.

The at least one retarder may further include at least one passive compensation retarder. Advantageously the luminance-privacy arrangement may achieve visual security over a wide polar range of snooper locations.

The additional polariser may be arranged on the output side of the spatial light modulator and the luminance-privacy optical arrangement may further comprise a reflective polariser arranged between the at least one retarder and the output polariser. Advantageously the ambient illuminance at which the contrast-privacy arrangement is operable is reduced, so that image visibility is increased for the head-on user at such illuminance levels.

The display device may comprise: a backlight comprising plural light sources and a directional waveguide arranged to direct light from different light sources in different angular ranges; and a spatial light modulator arranged to receive light from the waveguide and output light from an output side, and the luminance-privacy optical arrangement may comprise a switching arrangement arranged to selectively operate the light sources. Advantageously the public mode may be provided with wide viewing angle while the privacy mode may be provided with high visual security level from the luminance-privacy arrangement.

The display device may comprise: a backlight; a spatial light modulator comprising a layer of liquid crystal material arranged to receive light from the backlight and output light from an output side; an input polariser arranged on an input side of the spatial light modulator; and an output polariser arranged on the output side of the spatial light modulator, and the contrast-privacy optical arrangement may comprise at least one retarder arranged between the input polariser and the output polariser on either the input side or the output side of spatial light modulator, the at least one retarder including a switchable liquid crystal retarder comprising a layer of liquid crystal material and electrodes arranged to apply a voltage for switching the layer of liquid crystal material. Advantageously the contrast-privacy arrangement may be provided with improved variation of chromaticity with viewing angle.

The display device may comprise a spatial light modulator comprising a layer of liquid crystal material and the contrast-privacy optical arrangement comprises at least one electrode arranged to apply a voltage to provide biased in-plane switching of the liquid crystal material. Advantageously the contrast-privacy arrangement may be provided with reduced thickness and complexity.

The voltage may be adjusted when the ambient light sensor detects second levels of ambient light below the first levels. Advantageously the contrast-privacy arrangement may be conveniently controlled with low cost.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
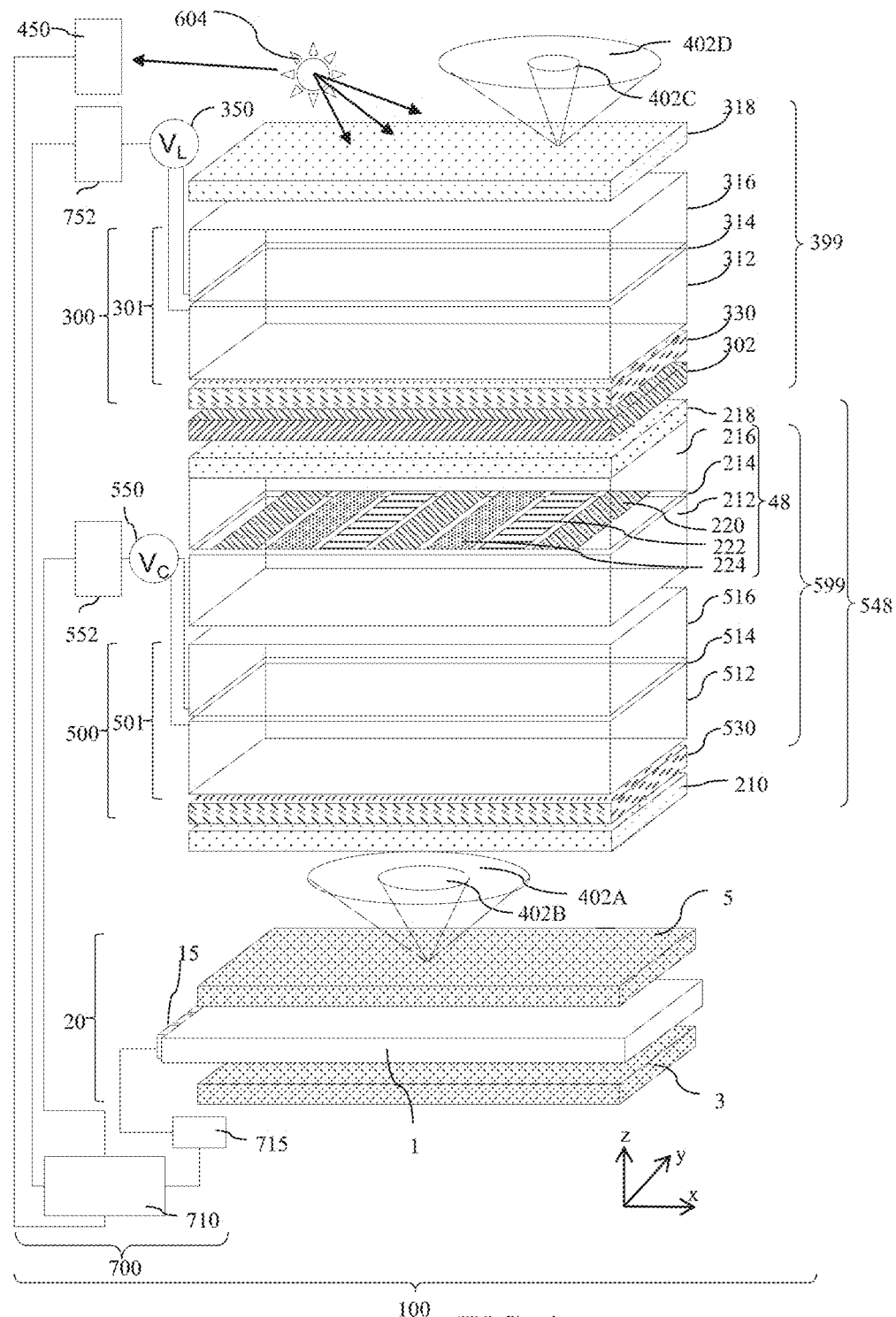
FIG. 1 is a schematic diagram illustrating in side perspective view a controllable privacy display for use in ambient illumination comprising: a transmissive spatial light modulator, a switchable retarder and a passive compensation retarder arranged between input and output polarisers; and a reflective polariser, a compensation retarder and a switchable liquid crystal retarder arranged between the output polariser and an additional polariser.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of alight ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 318 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films.

Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic Molecules have Negative Birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho/\pi \cdot (C+1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. The visual security level may then be approximated to:

$$VSL=1+I \cdot \rho/(\pi \cdot P \cdot L) \qquad \text{eqn. 8}$$

In comparison to privacy displays, desirably public displays are wide angle displays that are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2 \cdot R) \qquad \text{eqn. 10}$$

Thus the visual security level, VSL is equivalent (but not identical to) 1/M. In the present discussion, for a given off-axis relative luminance, P the public mode image visibility, W is approximated as $$W=1/VSL=1/(1+I \cdot \rho/(\pi \cdot P \cdot L)) \qquad \text{eqn. 11}$$

It would be desirable to provide a display that is switchable between privacy and public modes of operation over a wide range of ambient illuminance and further provides optimised image quality for head-on display users.

FIG. 1 is a schematic diagram illustrating in side perspective view a switchable privacy display apparatus comprising display device 100 arranged to display an image. The display device 100 comprises a transmissive spatial light modulator 48, a switchable retarder 501 and a passive compensation retarder 530 arranged between crossed input polariser 210 and output polariser 218; and a reflective polariser 302, compensated switchable retarder 300 and additional polariser 318 arranged on the output side of the input polariser 218.

The display device 100 further comprises a backlight 20 arranged to illuminate the optical stack 548 and luminance-privacy arrangement 399 with light cone 402A. The backlight 20 comprises input light sources 15, waveguide 1, rear reflector 3 and optical stack 5 comprising diffusers, light turning films and other known optical backlight structures. Illustrative embodiments of backlight 20 that further provide directional illumination are described below with reference to FIGS. 15A-D. Further light cone 402B of reduced solid angle may be provided by the backlight 20, providing control of output light cone 402C and providing a luminance-privacy arrangement 399 as will be described further below.

For the present embodiments, the size of a light cone 402 may be the solid angle determined by the full width half maximum luminance in comparison to the peak luminance or head-on luminance.

Optical stack 548 comprises spatial light modulator 48 comprising a layer 214 of liquid crystal material 213 that is arranged to receive light from the backlight 20 and output light from an output side. In the present disclosure, spatial light modulator 48 comprises a pixelated liquid crystal phase modulator comprising transparent substrates 212, 216, liquid crystal layer 214 and red, green and blue pixels 220, 222, 224.

The display device 100 comprises the spatial light modulator 48 and a display polariser that is an output polariser 218 arranged on the output side of the spatial light modulator 48. A selectively operable luminance-privacy optical arrangement 399 is arranged on the output side of the spatial light modulator 48, however in other embodiments (not shown) the luminance-privacy optical arrangement 399 may be arranged on the input side of the spatial light modulator 48 and the display polariser is the input polariser 210. In the embodiment of FIG. 1, an additional polariser 318 is arranged on the output side of the spatial light modulator 48.

At least one retarder 300 is arranged between the output polariser 218 and the additional polariser 318 in the case the additional polariser 318 is arranged on the output side of the output polariser 218. The at least one retarder 300 comprises a switchable liquid crystal retarder 301 comprising a layer 314 of liquid crystal material 313 and further comprises at least one passive compensation retarder 330. In general retarders 301, 330 may be replaced by other configurations of at least one retarder, some examples of which are present in the devices described below.

Typical polarisers 210, 218, 318 may be polarisers such as dichroic polarisers. The luminance-privacy optical arrangement 399 further comprises a reflective polariser 302 arranged between the at least one retarder 300 and the output polariser 218.

The substrates 312, 316 of the switchable liquid crystal retarder 301 comprise electrodes 413, 415 arranged to provide a voltage $V_L$ across the layer 314 of liquid crystal material 313. Control system 352 is arranged to control the voltage $V_L$ applied by voltage driver 350 across the electrodes 413, 415 of the switchable liquid crystal retarder 301 as will be described further with respect to FIG. 7 hereinbelow.

In operation the luminance-privacy optical arrangement 399 is arranged to reduce the luminance of the image to an off-axis viewer (or 'snooper'). The at least one retarder 300 does not affect the luminance of light passing through the reflective polariser 302, the retarders 300 and the additional polariser 318 along an axis along a normal to the plane of the retarders 300 but the at least one retarder 300 does reduce the luminance of light passing therethrough along an axis inclined to a normal to the plane of the retarders 300, in at least one of the switchable states of the switchable retarder 301. The principles leading to this effect are described in greater detail below with reference to FIG. 23A to FIG. 25E and arises from the presence or absence of a phase shift introduced by the retarders 300 to light along axes that are angled differently with respect to the liquid crystal material of the retarders 300.

The plural retarders 300 and additional polariser 318 are arranged to provide reduced size output luminance cone 402C in privacy mode in comparison to the cone 402D used for public mode.

Display device 100 further has a selectively operable contrast-privacy optical arrangement 599 arranged on operation to reduce the contrast of the image to an off-axis viewer.

In the embodiment of FIG. 1, the contrast-privacy optical arrangement 599 comprises spatial light modulator 48 and plural retarders 500 comprising switchable liquid crystal retarder 501 and passive compensation retarder 530 arranged between the input polariser 210 and output polariser 218. In other embodiments retarder 500 may comprise a single layer 514 switchable liquid crystal retarder 501.

The plural retarders 500 are illustrated as arranged on the input side of the spatial light modulator 48 but may be on the output side of the spatial light modulator 48. The plural retarders 500 include a switchable liquid crystal retarder 501 comprising a layer 514 of liquid crystal material 513 and further comprises at least one passive retarder 530.

As will be described further with respect to FIG. 1A hereinbelow, the substrates 512, 516 of the switchable liquid crystal retarder 501 comprise electrodes 513, 515 arranged to provide a voltage $V_C$ across the layer 514 of liquid crystal material 513. Control system 552 is arranged to control the voltage $V_C$ applied by voltage driver 550 across the electrodes 503, 505 of the switchable liquid crystal retarder 501.

In operation the contrast-privacy optical arrangement 599 is arranged to reduce the contrast of the image to an off-axis viewer (or 'snooper'). The at least one retarder 500 does not affect the contrast of image passing through the retarders 500, spatial light modulator 48 and the output polariser 218 along an axis along a normal to the plane of the retarders 500 but the at least one retarder 500 does reduce the contrast of light passing therethrough along an axis inclined to a normal to the plane of the retarders 500, in at least one of the switchable states of the switchable retarder 501. The principles leading to this effect are described in greater detail below with reference to FIG. 23A to FIG. 25E and arises from the presence or absence of a phase shift introduced by the retarders 500 to light along axes that are angled differently with respect to the liquid crystal material of the retarders 500.

Figure 2:
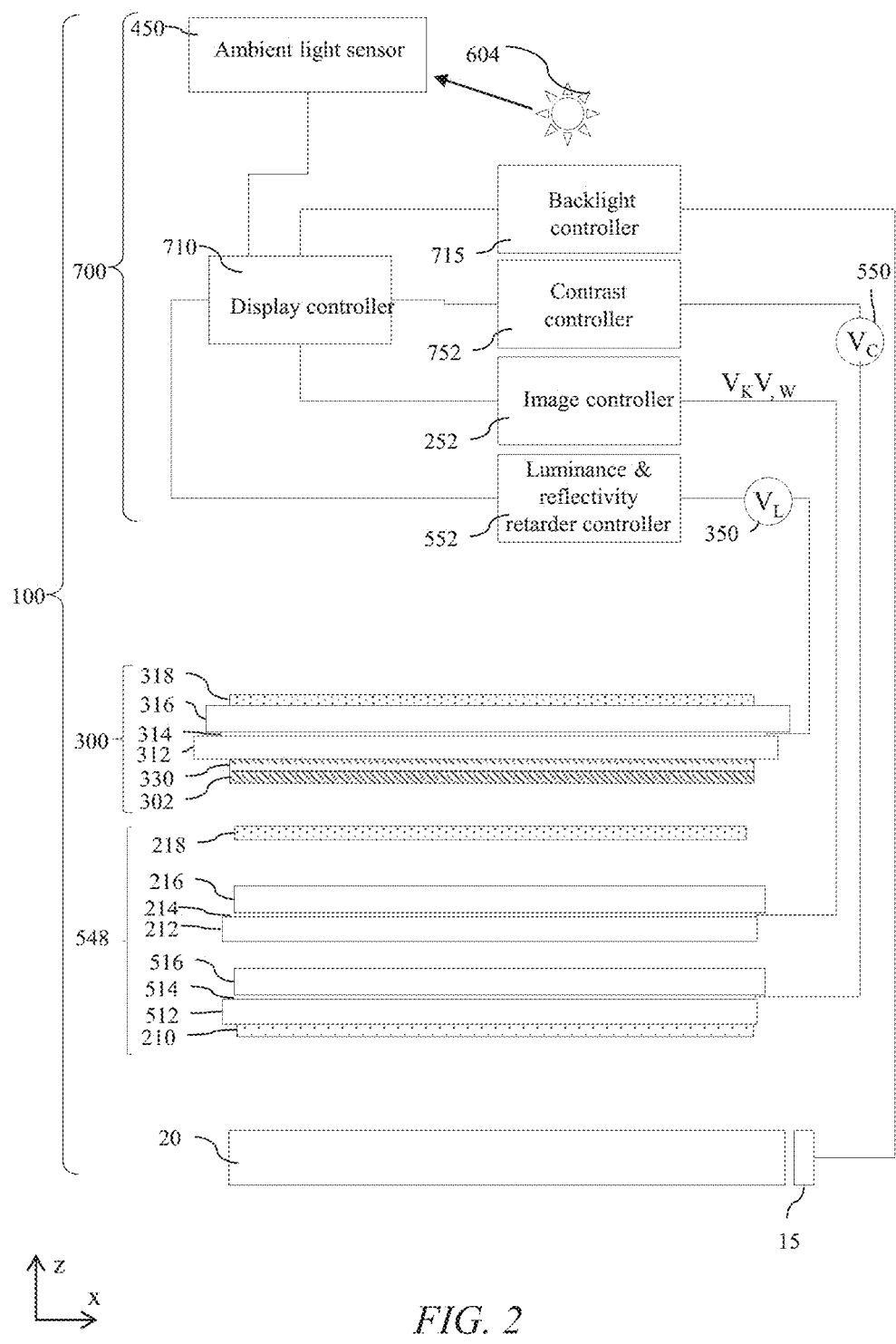
FIG. 2 is a schematic diagram illustrating a control system for the controllable privacy display of FIG. 1.

FIG. 2 is a schematic diagram illustrating a control system 700 for the controllable privacy display device 100 of FIG. 1.

Control system 700 is arranged to control the display device 100, the control system 700 being capable of selectively operating either one or both of the luminance-privacy arrangement 399 and the contrast-privacy arrangement 599.

The display apparatus comprises an ambient light sensor 450 arrange to detect the level of the ambient light 604. Ambient light 604, may be for example natural light, artificial light or light output from the display device 100 and reflected from the ambient environment. Ambient light sensor 450 detects ambient light 604 and inputs a level to the display controller 710.

Controller 710 provides control of backlight controller 715 that provides control of light sources 15, contrast controller 752 that provides control of voltage driver 550, image controller 252 that provides black and white signal voltages to respective image pixels of the spatial light modulator 48; and luminance and reflectivity retarder controller 552 that provides control of voltage driver 350.

In operation, the control system 700 is arranged to operate neither of the luminance-privacy arrangement 399 and the contrast-privacy arrangement 599 in a public mode and one or both of the luminance-privacy arrangement and the contrast-privacy arrangement in a privacy mode.

Figure 3:
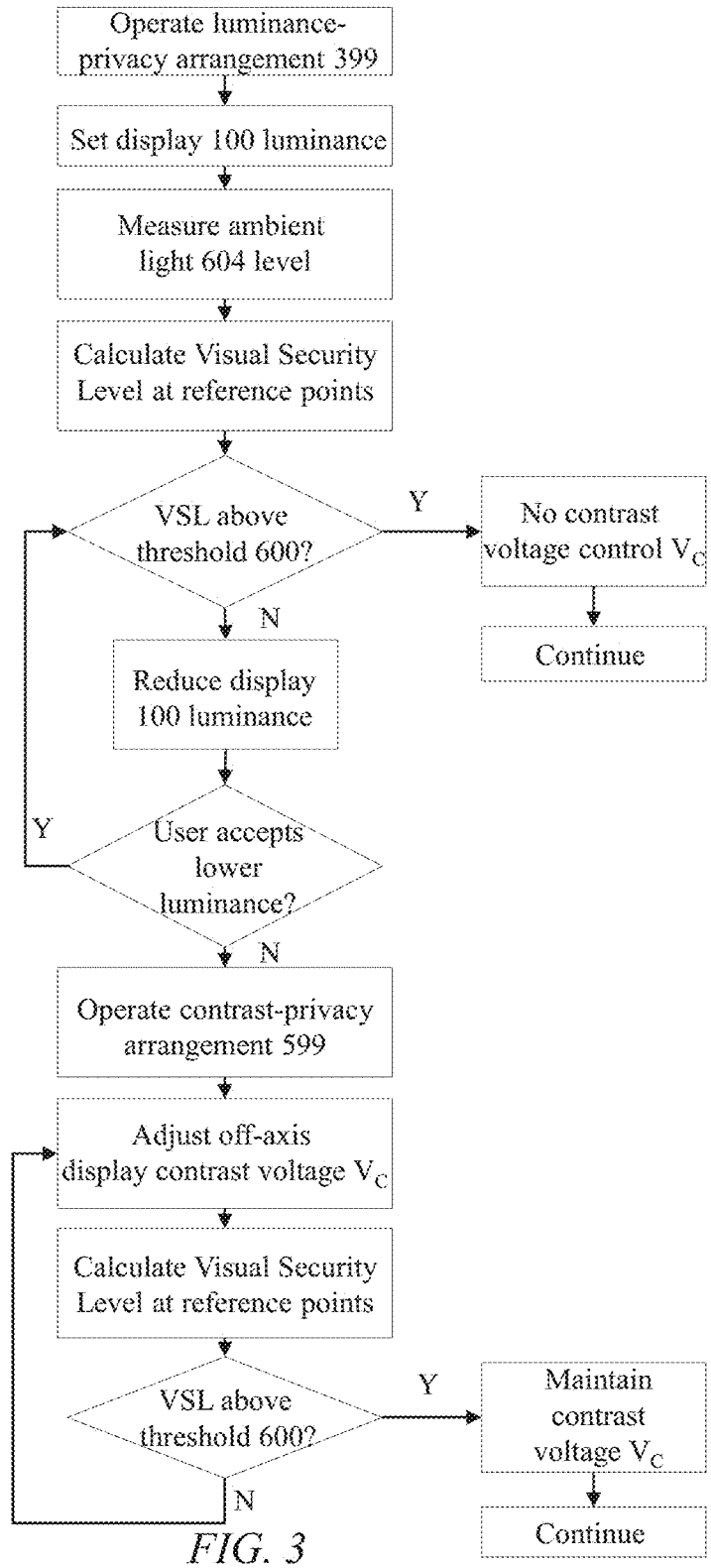
FIG. 3 is a flowchart illustrating a method to control the apparatus of FIGS. 1-2.

FIG. 3 is a flowchart illustrating a method to control the apparatus of FIGS. 1-2 for use in privacy mode of operation.

In a first step, the display luminance is set to a desirable level for typical head-on user use, for example by control of the current supplied to the light sources 15 of the backlight 20. The contrast-privacy arrangement 599 is not operated while the luminance-privacy arrangement 399 is operated.

The control system 700 is arranged, in the privacy mode, to determine a visual security level, VSL representing the security against viewing of a displayed image by an off-axis viewer, the visual security level VSL being dependent on the level of ambient light 604 detected by the ambient light sensor 450 and increasing as the level of ambient light 604 increases, and the control system 700 is arranged, in the privacy mode, to selectively operate the luminance-privacy arrangement 399 and the contrast-privacy arrangement 599 to maintain the visual security level VSL above a predetermined threshold 600.

The ambient light 604 is thus measured, and using information about the display device 100 design parameters, the visual security level, VSL calculated, for example as described in equation 4 above. Display design parameters may include but not limited to angular luminance characteristics, angular contrast characteristics and angular reflectivity characteristics. The VSL may be determined at a single polar location, for example at 45 degrees lateral viewing angle and at 0 degrees elevation, or may be an average or worst case value over a polar range of angles as will be illustrated further below.

In the present disclosure, other definitions of visual security level may be provided, and may include display white state, display black state and display reflectivity to determine the security of the displayed image seen by an off-axis snooper and the quality of the displayed image seen an on-axis user.

The control system may comprise a desirable VSL threshold 600 as will be described further below. If the VSL is above the VSL threshold 600 then no contrast voltage control is provided, and the operation of the display continues until the VSL falls below the VSL threshold 600. The VSL may vary for example if the display user increases head-on luminance, or the ambient illuminance changes. The control system 700 is thus arranged, in the privacy mode, to operate the luminance-privacy arrangement 399 when the ambient light sensor 450 detects first levels of ambient light 604; that is the VSL is above a certain VSL threshold 600 for the given display parameters. Advantageously, the contrast-privacy arrangement 599 is not operated and display contrast seen by the primary user is not compromised while desirable levels of privacy are achieved for off-axis snoopers.

The operation of the display device 100 when the VSL falls below VSL threshold 600 will now be described. The control system 700 is arranged to operate both the luminance-privacy arrangement 399 and the contrast-privacy arrangement 599 when the ambient light sensor 450 detects second levels of ambient light 604 below the first levels. When the ambient light 604 falls below the first levels, the VSL falls below the VSL threshold 600.

The control system may automatically reduce the display luminance for example by reduction of backlight luminance, that may be achieved by backlight controller 715. If the primary user accepts the reduced luminance while achieving the desirable VSL threshold then no further contrast control is provided.

However, if the head-on luminance is too low for desirable operation by the head-on user then the contrast-privacy arrangement 599 is operable by means of contrast controller 752 that determines the drive voltage $V_C$ from voltage driver 550.

The control system 700 determines the VSL and adjusts the voltage $V_C$ of the contrast-privacy arrangement 599 until the display VSL is at or above the VSL threshold 600, at which point the contrast properties are set and display operation continues, monitoring ambient light 604 in order to provide desirable VSL to off-axis snoopers.

Advantageously desirable security can be achieved while optimising display performance to the primary user as will be further described below.

Illustrative embodiments for the variation of VSL with ambient light 604 illuminance will now be further described.

Figure 4A:
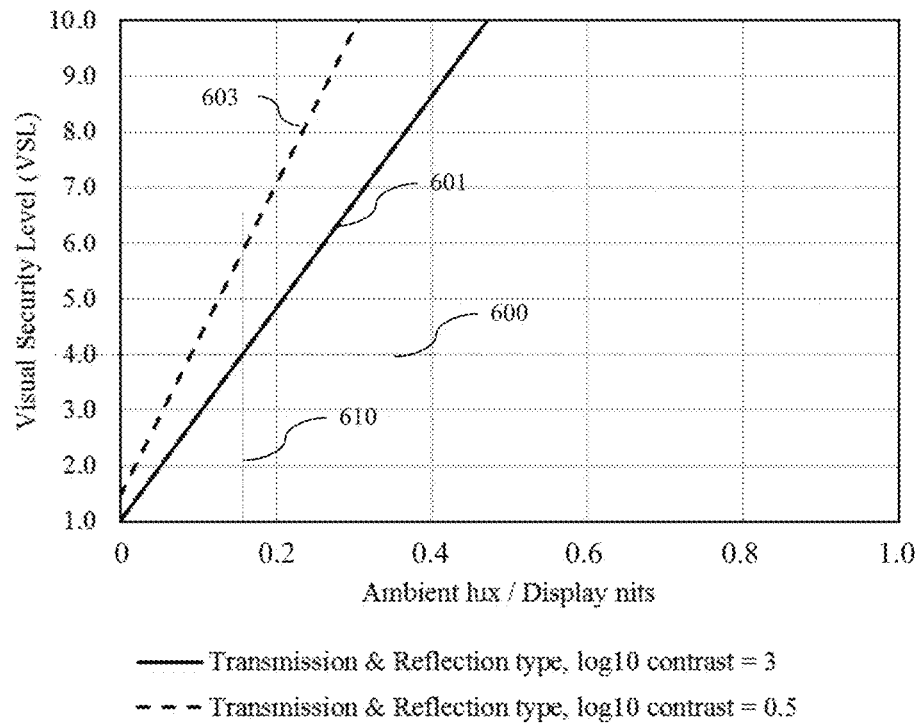
FIG. 4A is a schematic graph illustrating the variation of visual security level with the ratio of ambient luminance to display head-on luminance for two different contrast ratios in an a display comprising a reflective polariser.
Figure 4B:
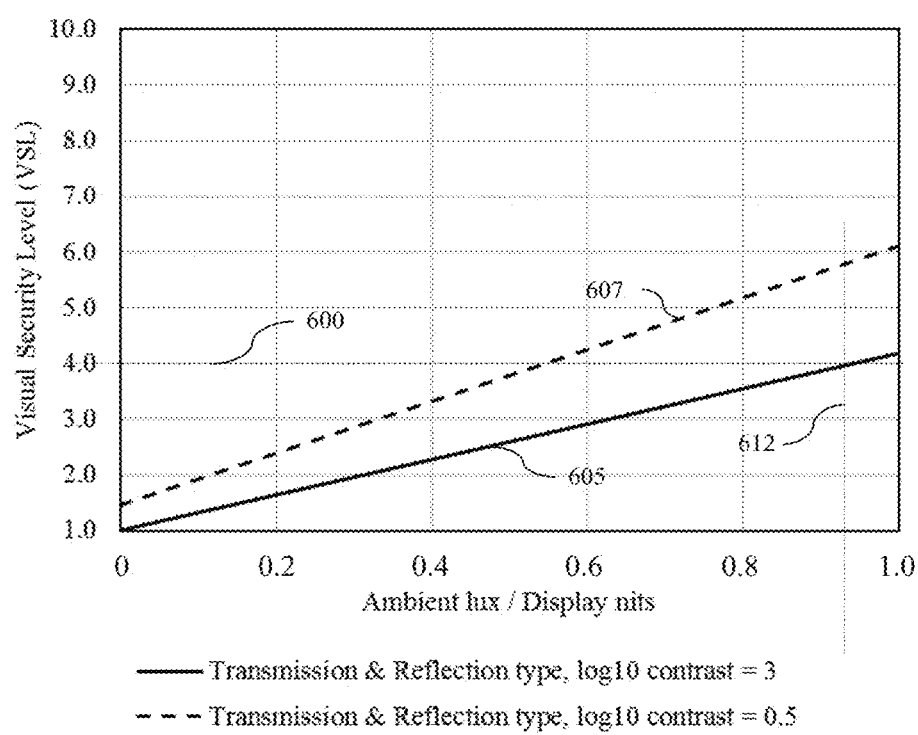
FIG. 4B is a schematic graph illustrating the variation of visual security level with the ratio of ambient luminance to display head-on luminance for two different contrast ratios in an a display comprising no reflective polariser.

FIG. 4A is a schematic graph illustrating the variation of visual security level, VSL with the ratio of ambient luminance to display head-on luminance for two different displayed contrast ratios in an a display comprising a reflective polariser 302 with a display reflectivity of 30%; and FIG. 4B is a schematic graph illustrating the variation of visual security level with the ratio of ambient luminance to display head-on luminance for two different contrast ratios in an a display comprising no reflective polariser, with a display reflectivity of 5%. For both graphs, the privacy level, P is assumed to be 0.5%. The reflective polariser 302 increases frontal reflection and so correspondingly increases VSL. Profiles 601, 605 are for contrast ratios of 1000:1 and profiles 603, 607 are for contrast ratios of 3.2:1.

To continue the illustrative embodiment, a display device 100 with head-on luminance of 300 nits may be illuminated by a Lambertian light source with illuminance onto the front of the display of 300 lux, providing a lux/nit ratio of 1.0. Such a display can provide comfortable on-axis viewing in an office environment and a visual security level of just over VSL=4.0 in displays with no reflective polariser 302 and VSL=20 with reflective polariser 302.

However, as the display illuminance is reduced, for example by moving the display to a darker environment, the VSL falls due to reduced luminance of ambient light 604 reflected from the front of the display device 100.

Such VSL reduction can be compensated by reducing head-on display luminance, to restore the lux/nits ratio. However, the display may become undesirably dim to the head-on user.

As illustrated in FIG. 4B, when the lux/nits ratio is reduced to ratio 612, of about 0.95 (285 lux in the illustrative example) then the VSL falls below a desirable VSL threshold 600 of 4.0. Thus the display has undesirable visibility to an off-axis snooper at illuminance below 285 nits without some further control of VSL.

It would be desirable to increase VSL at such reduced illuminance. As illustrated in FIG. 4B by the profile 607 for an image contrast of $\log_{10}$ contrast=0.5 then the VSL increases from 4.0 to just under 6.0 at lux/nits=0.95. For the arrangement of FIG. 4A in which a reflective polariser 302 is provided in FIG. 1, then such a VSL threshold 600 is provided at lux/nits ratio of 0.15 (45 lux for the 300 nit head-on luminance).

The control of image contrast in response to reduced ambient illuminance will now be described.

Figure 5A:
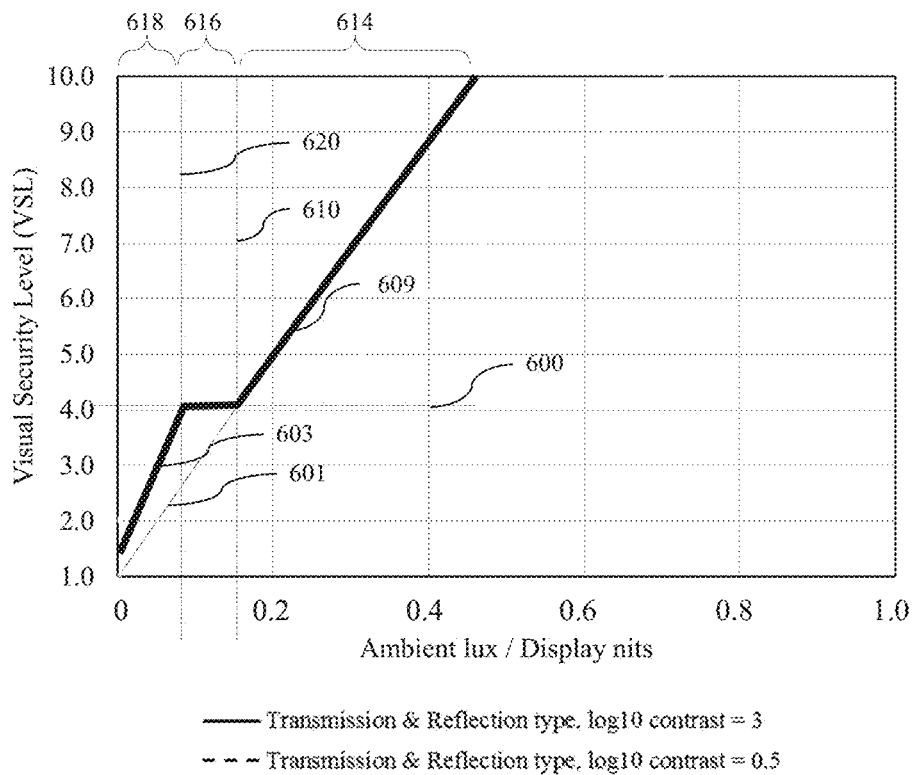
FIG. 5A is a schematic graph illustrating the variation of visual security level with the ratio of ambient luminance to display head-on luminance provided by the display of FIG. 1 with a reflective polariser.
Figure 5B:
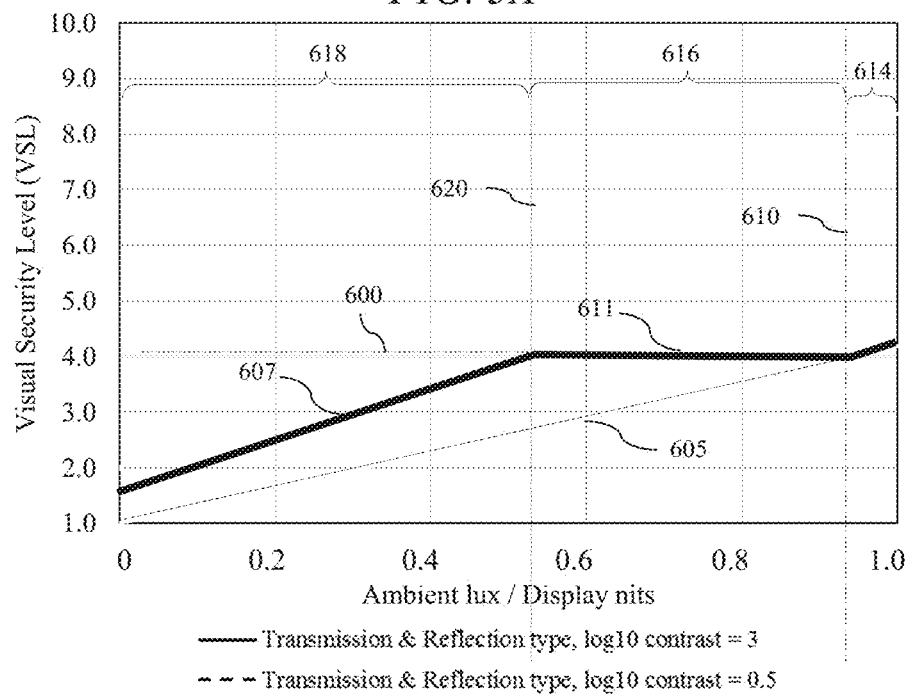
FIG. 5B is a schematic graph illustrating the variation of visual security level with the ratio of ambient luminance to display head-on luminance provided by the display of FIG. 1 with the reflective polariser omitted.

FIG. 5A is a schematic graph illustrating the variation of visual security level, VSL with the ratio of ambient luminance to display head-on luminance provided by the display device 100 of FIG. 1 with the reflective polariser 302 incorporated; and FIG. 5B is a schematic graph illustrating the variation of visual security level with the ratio of ambient luminance to display device 100 head-on luminance provided by the display of FIG. 1 with the reflective polariser 302 omitted.

As illustrated by profiles 609, 611, the contrast-privacy optical arrangement 599 is arranged on operation to reduce the contrast of the image to an off-axis viewer by a controllable amount, and the control system 700 is arranged, when operating the contrast-privacy arrangement 599, to control the amount of reduction of the contrast of the image to an off-axis viewer in dependence on the detected level of ambient light 604.

In operation, VSL profile 609 is the same as profile 601 in lux/nit region 614, is the same as the profiles 601, 605. In lux/nit region 616, the profile 609 has a uniform VSL at the VSL threshold level 600. In lux/nit region 618, the VSL is determined by the VSL that is provided for the contrast ratio that can be conveniently achieved over the snooper visibility and is thus similar to or the same as the profile 603, 607 respectively.

When the measured ambient illuminance of light 604 is above a threshold such that the VSL is above VSL threshold 600, then the privacy performance is controlled by the luminance-privacy arrangement 399 alone.

When the measured ambient illuminance of light 604 is below a minimum level 610 of lux/nit (representing a first level 610 of ambient light 604) then the visual security level, VSL is controlled by both the luminance-privacy arrangement 399 and the contrast-privacy arrangement 599. The display device 100 desirably maintains VSL at VSL threshold 600 level until the lux/nit ratio falls to a second ambient light 604 threshold represented by lux/nit threshold 620 by means of adjustment of control voltage $V_C$ to the contrast-privacy arrangement 599.

Below the threshold 620 of lux/nit ratio, further adjustment of control voltage $V_C$ does not provide improvement in VSL, and so the profile 609 is provided by profiles 603, 607 for the combined effects of luminance and contrast reduction.

The polar profiles of VSL will be considered further below, however the same principles of adjustment of luminance and contrast to achieve a display which operates at or above the threshold VSL can be applied by considering regions in the polar profile of likely or measured snooper locations.

As will be described, contrast-privacy arrangements 599 typically provide undesirable roll-offs in image contrast with polar viewing angle that may degrade image appearance and colour to the head-on user. The present embodiment may not operate the contrast-privacy arrangement 599 above the threshold VSL 600. Advantageously the present embodiments provide high image contrast and image uniformity for illuminance levels above a first level, while achieving high visual security for off-axis snoopers. Improved image quality is provided to the primary user by providing contrast reduction at the minimal level that achieves desirable display visual security to off-axis snoopers for a given measured ambient light 604 illuminance.

The structure of the luminance-privacy arrangement 399 and contrast-privacy arrangement 599 of FIG. 1 will now be further described.

Figure 6:
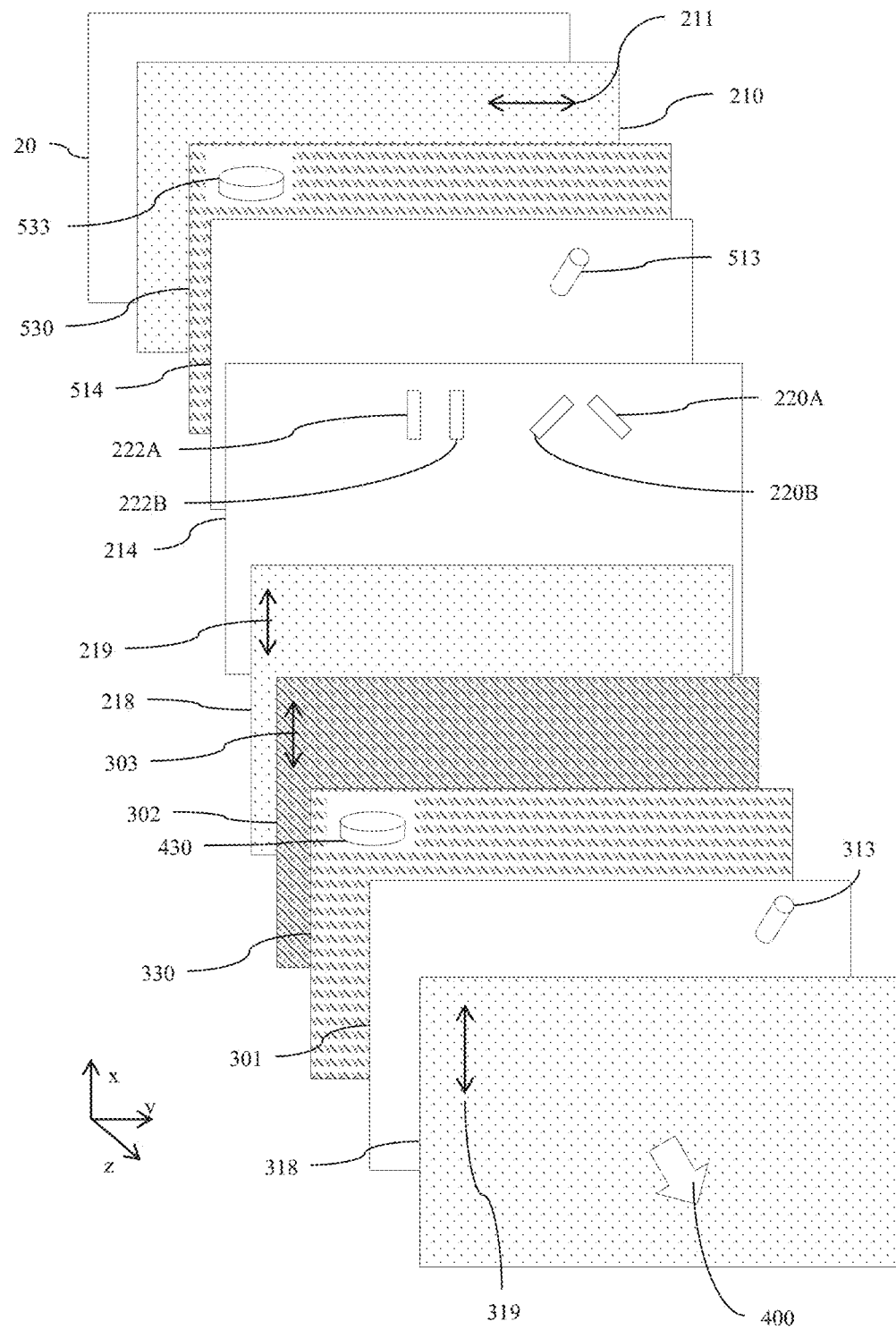
FIG. 6 is a schematic diagram illustrating in front view alignment of optical layers in the optical stack of FIG. 1.

FIG. 6 is a schematic diagram illustrating in front view alignment of optical layers in the optical stack of FIG. 1. The input polariser 210 has an electric vector transmission direction 211 that is orthogonal to the electric vector transmission direction 219 of the output polariser 218. Passive compensation retarder 530 comprises a negative dielectric anisotropy material 533 that has an optical axis that is perpendicular to the plane of the passive retarder 530. The liquid crystal layer 214 of the spatial light modulator has liquid crystal material 213 that can be switched in orientation in the plane of the liquid crystal layer 214 by means of an applied electric field between orientations 222A, 222B and orientations 220A, 220B to provide black and white states respectively.

The electric vector transmission direction of the reflective polariser 302 is parallel to the electric vector transmission direction of the output polariser 218. Further the electric vector transmission direction 303 of the reflective polariser 302 is parallel to the electric vector transmission direction 319 of the additional polariser 318. Passive retarder 330 may comprise retardation layer with material 430 that has an optical axis that is perpendicular to the plane of the passive retarder 330, while switchable liquid crystal retarder 301 may comprise a layer 314 of liquid crystal material 313, as will be described below.

The structure of an embodiment of a luminance-privacy arrangement 399 will now be described.

Figure 7:
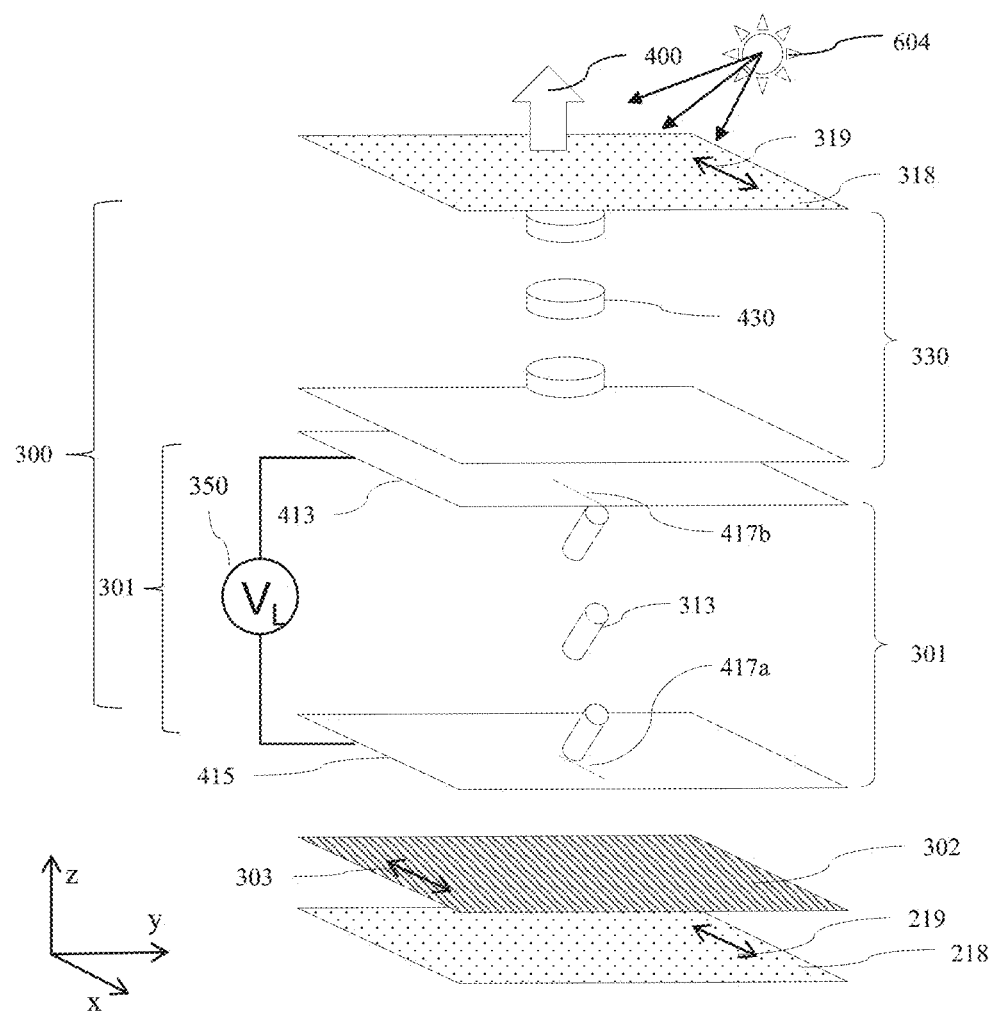
FIG. 7 is a schematic diagram illustrating in perspective side view an arrangement of a reflective polariser and plural retarder layers arranged between the output polariser and additional polariser.

FIG. 7 is a schematic diagram illustrating in perspective side view an arrangement of a reflective polariser 302 and plural retarder layers 301, 330 arranged between the output polariser 218 and additional polariser 318.

The luminance-privacy optical arrangement 399 comprises: an additional polariser 318 arranged on the same side of the spatial light modulator 48 as the display polariser 218; and at least one retarder 300 arranged between the additional polariser 318 and the display polariser 218, the at least one retarder 300 including a switchable liquid crystal retarder 301 comprising a layer 314 of liquid crystal material 313 and electrodes 413, 415 arranged to apply a voltage, $V_L$ for switching the layer 314 of liquid crystal material 313. The at least one retarder 300 further includes at least one passive compensation retarder 330.

TABLE 1 describes an illustrative embodiment for the arrangement of FIG. 7.

TABLE 1

| | | Passive retarder(s) | Active LC retarder | | | | Voltage $V_L/V$ |
|---|---|---|---|---|---|---|---|
| Mode | Type | Δn.d/ nm | Alignment layers | Pretilt/ deg | Δn.d/ nm | Δε | |
| Public | Negative C | −700 | Homeotropic Homeotropic | 88 88 | 810 | −4.3 | 0 |
| Privacy | | | | | | | 2.2 |

The operation of an embodiment of a luminance-privacy arrangement 399 will now be described.

Figure 8A:
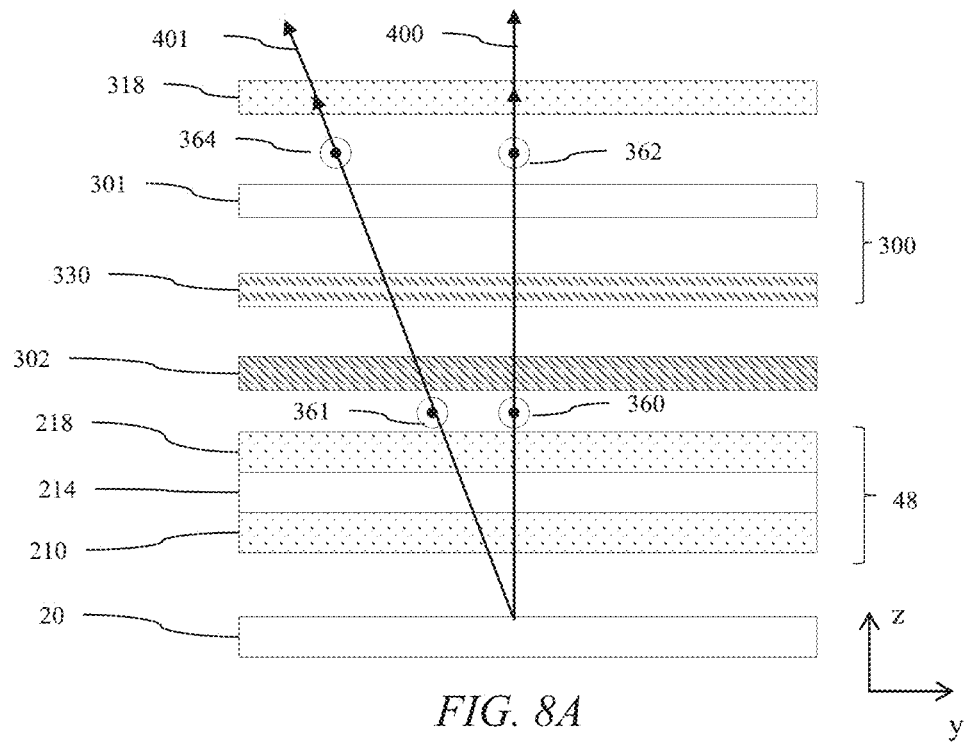
FIG. 8A is a schematic diagram illustrating in side view propagation of output light through the optical stack of FIG. 1 in a public mode of operation.
Figure 8B:
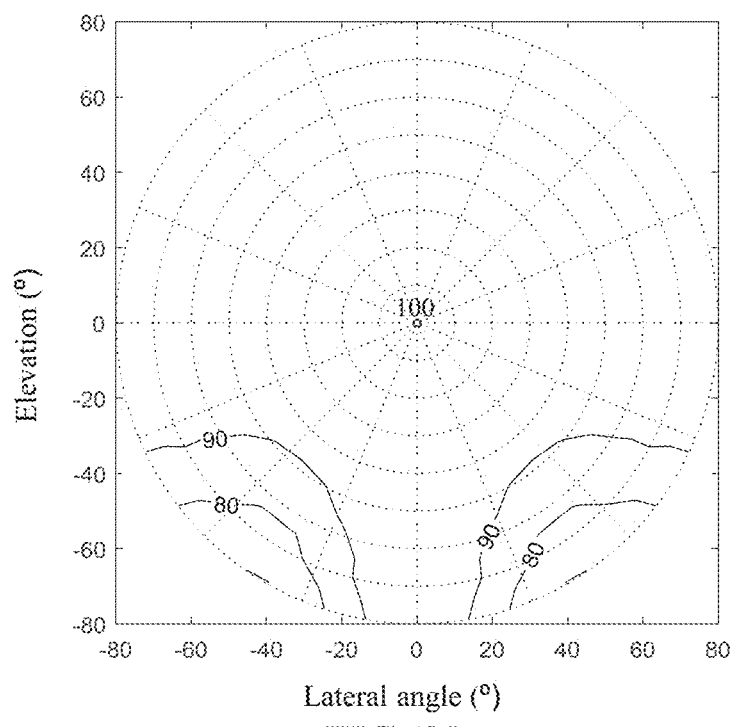
FIG. 8B is a schematic graph illustrating the variation of the transmission with polar direction for the transmitted light rays in FIG. 8A.

FIG. 8A is a schematic diagram illustrating in side view propagation of output light through the luminance-privacy arrangement 399 of FIG. 1 in a public mode of operation; and FIG. 8B is a schematic graph illustrating the variation of the transmission with polar direction for the transmitted light rays in FIG. 8A for the illustrative embodiment of TABLE 1.

When the liquid crystal retarder 301 is driven by a voltage $V_L$ to provide operation in the public mode, the retarders 300 provide no overall transformation of polarisation component 360, 361 to output light ray 400 passing therethrough perpendicular to the plane of the switchable retarder 301 or for light ray 401 at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 8B is substantially uniformly transmitting across a wide polar region. Advantageously a display may be switched to a wide field of view that can be seen by multiple display users. Further luminance uniformity is increased for the head-on user.

The operation of the reflective polariser 302 in public mode will now be described.

Figure 9A:
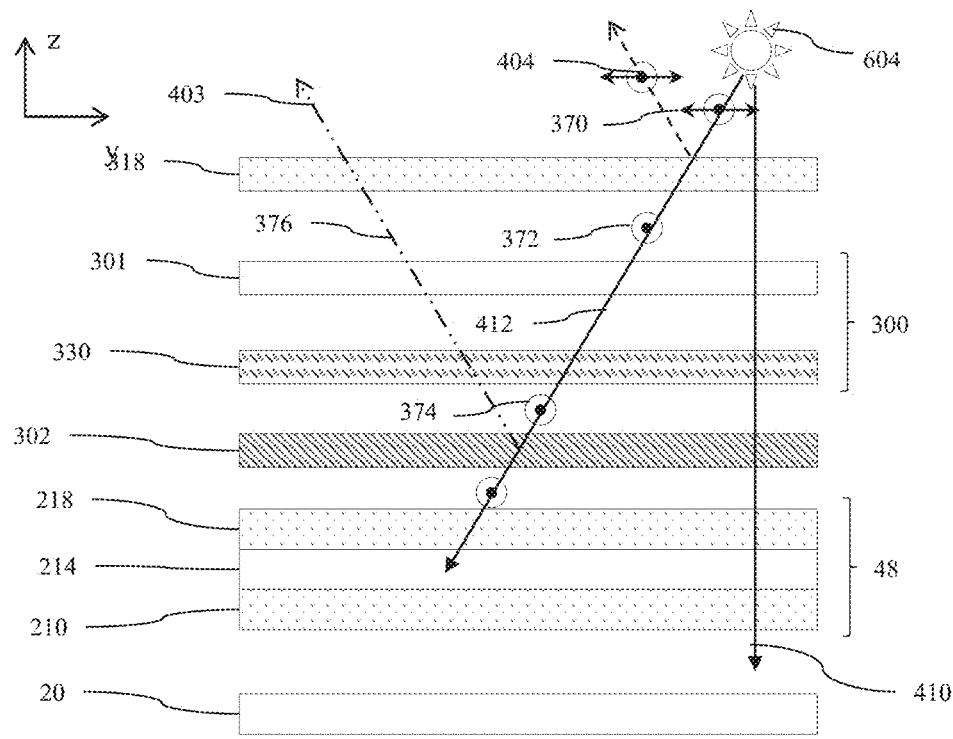
FIG. 9A is a schematic diagram illustrating in side view propagation of ambient light through the optical stack of FIG. 1 in a public mode of operation.
Figure 9B:
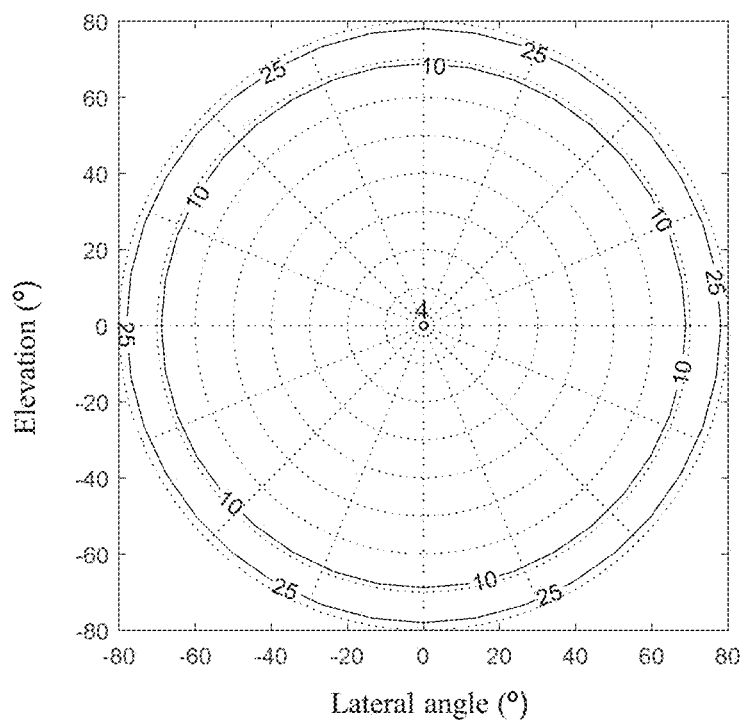
FIG. 9B is a schematic graph illustrating the variation of the reflectivity with polar direction for the transmitted light rays in FIG. 9A.

FIG. 9A is a schematic diagram illustrating in side view propagation of ambient light 604 through the luminance-privacy arrangement 399 of FIG. 1 in a public mode of operation; and FIG. 9B is a schematic graph illustrating the variation of the reflectivity with polar direction for the transmitted light rays in FIG. 9A for the illustrative embodiment of TABLE 1.

Ambient light source 604 illuminates the display 100 with unpolarised light. Additional polariser 318 transmits light ray 410 normal to the display surface with a first polarisation component 372 that is a linear polarisation component parallel to the electric vector transmission direction 319 of the additional polariser 318.

When the liquid crystal retarder 301 is driven by a voltage $V_L$ to provide operation in public mode (that may be zero volts), the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1.

Advantageously in a public mode of operation, high luminance and low reflectivity is provided across a wide field of view. Such a display can be conveniently viewed with high contrast by multiple observers.

Figure 10A:
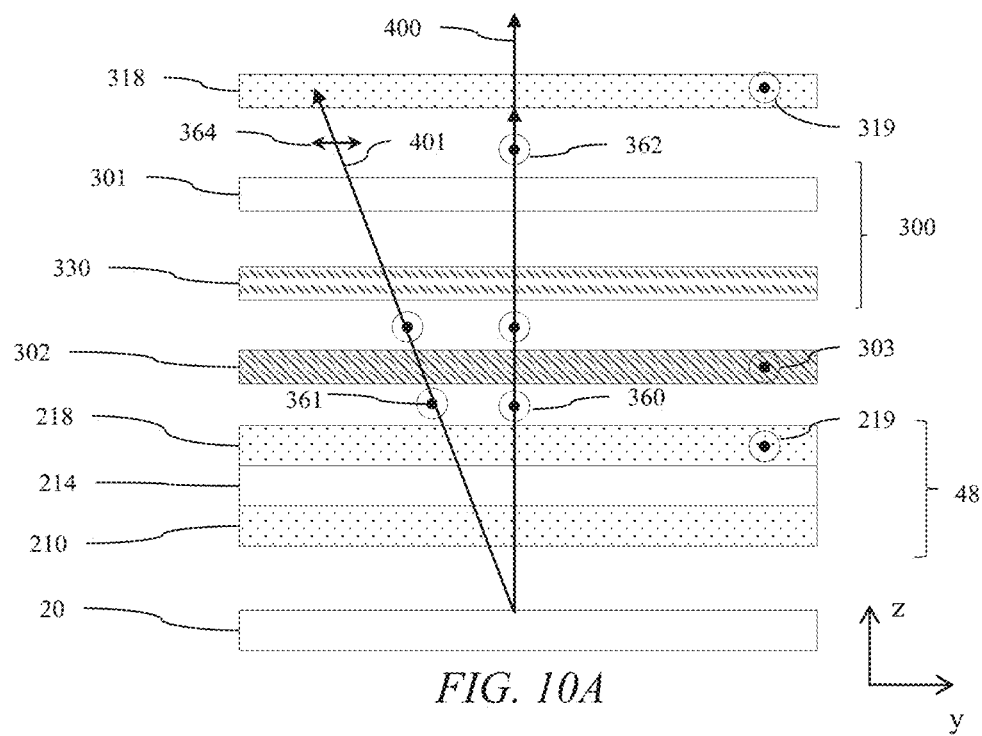
FIG. 10A is a schematic diagram illustrating in side view propagation of output light through the output polariser of FIG. 1 in a privacy mode of operation.
Figure 10B:
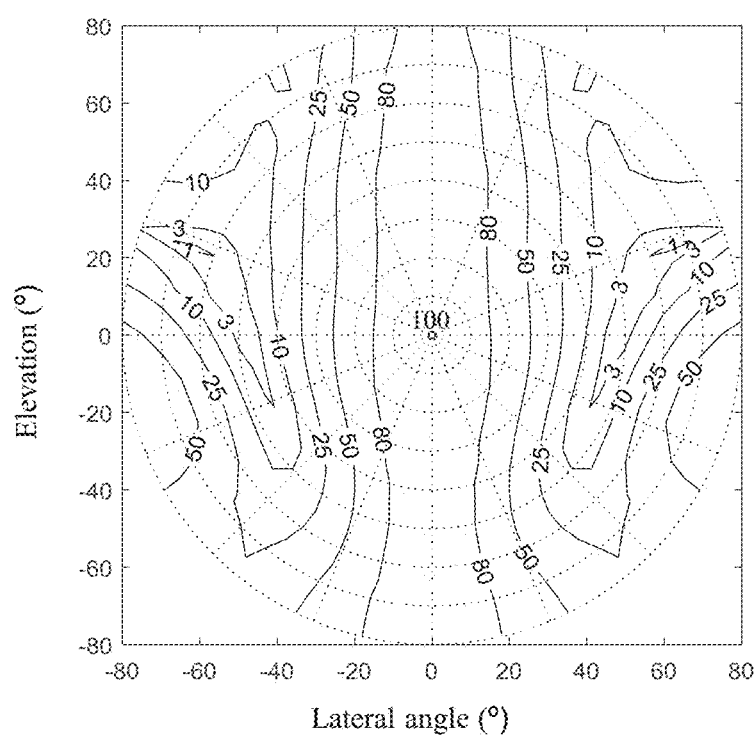
FIG. 10B is a schematic graph illustrating the variation of the transmission with polar direction for the transmitted light rays in FIG. 10A.

FIG. 10A is a schematic diagram illustrating in side view propagation of output light through the output polariser of FIG. 1 in a privacy mode of operation; and FIG. 10B is a schematic graph illustrating the variation of the transmission with polar direction for the transmitted light rays in FIG. 10A for the illustrative embodiment of TABLE 1.

When the layer 314 of liquid crystal material is driven by a second voltage $V_L$ (that is different to the voltage for the public mode) to provide operation in privacy mode, the retarders 300 provide no overall transformation of polarisation component 360 to output light rays 400 passing therethrough along an axis perpendicular to the plane of the switchable retarder, but provides an overall transformation of polarisation component 361 to light rays 401 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318 and an intermediate transmission is provided.

In a polar representation of transmission by the retarders 300 and additional polariser 318 in a privacy mode, regions of high transmission and regions of low transmission are provided as illustrated in FIG. 10B.

The polar distribution of light transmission illustrated in FIG. 4B modifies the polar distribution of luminance output of the underlying spatial light modulator 48. In the case that the spatial light modulator 48 comprises a directional backlight 20 then off-axis luminance may be further be reduced as described above.

Advantageously, a privacy display device 100 is provided that has low luminance to an off-axis snooper while maintaining high luminance for an on-axis observer.

Figure 10C:
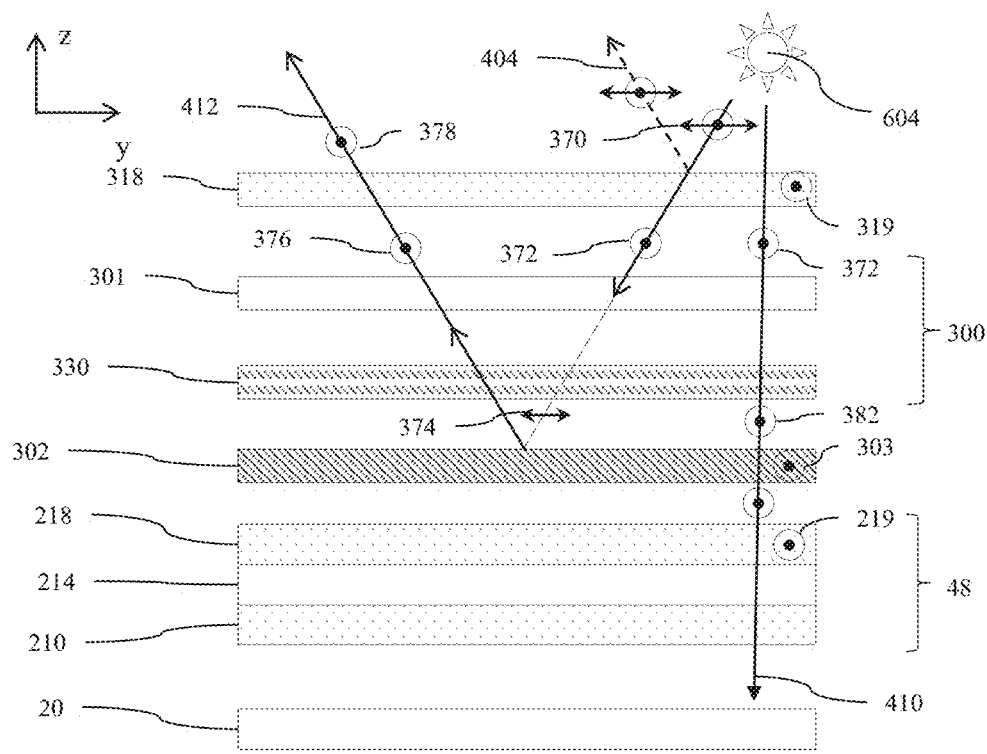
FIG. 10C is a schematic diagram illustrating in side view propagation of ambient light through the optical stack of FIG. 1 in a privacy mode of operation.
Figure 10D:
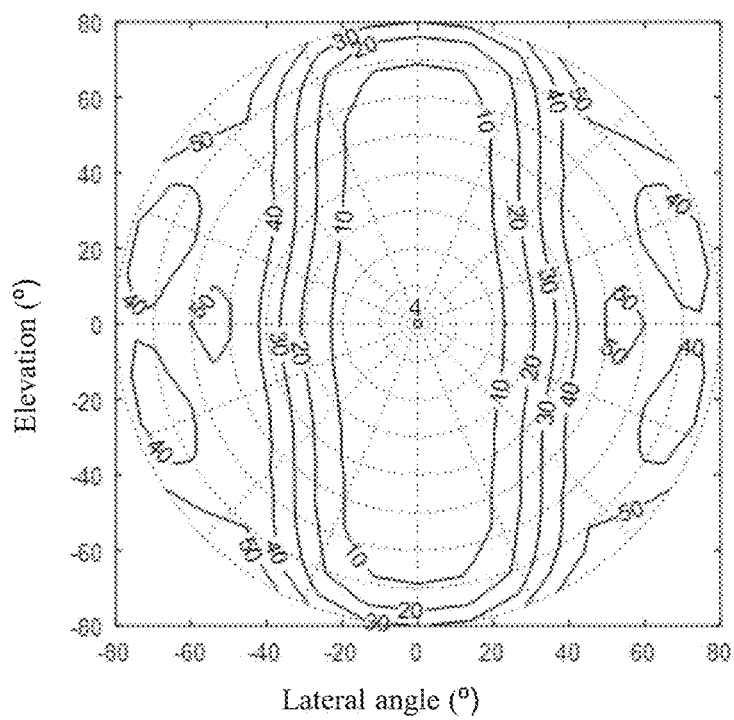
FIG. 10D is a schematic graph illustrating the variation of the reflectivity with polar direction for the transmitted light rays in FIG. 10C.

FIG. 10C is a schematic diagram illustrating in side view propagation of ambient light 604 through the luminance-privacy arrangement 399 of FIG. 1 in a privacy mode of operation; and FIG. 10D is a schematic graph illustrating the variation of the reflectivity with polar direction for the transmitted light rays in FIG. 10C for the illustrative embodiment of TABLE 1.

For on-axis ray 410 the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is driven by a second voltage $V_L$ (that is different to the voltage for the public mode) to provide operation in privacy mode, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 10D thus illustrates that high reflectivity can be provided at typical snooper locations by means of the privacy state of the retarders 300. Thus, in the privacy mode of operation, the reflectivity for off-axis viewing positions is increased, and the luminance for off-axis light from the spatial light modulator is reduced as illustrated in FIG. 10B.

Advantageously, a privacy display is provided that has high reflectivity to an off-axis snooper while maintaining low reflectivity for an on-axis observer. As will be described below, such increased reflectivity provides enhanced privacy performance for the display in an ambiently illuminated environment.

It will be appreciated that the structure of the switchable liquid crystal retarder 301 and passive compensation retarder of TABLE 1 is an illustrative embodiment, and that other arrangements may be provided to achieve luminance-privacy arrangement 399.

The operation of an embodiment of a contrast-privacy arrangement 599 will now be described.

Figure 11A:
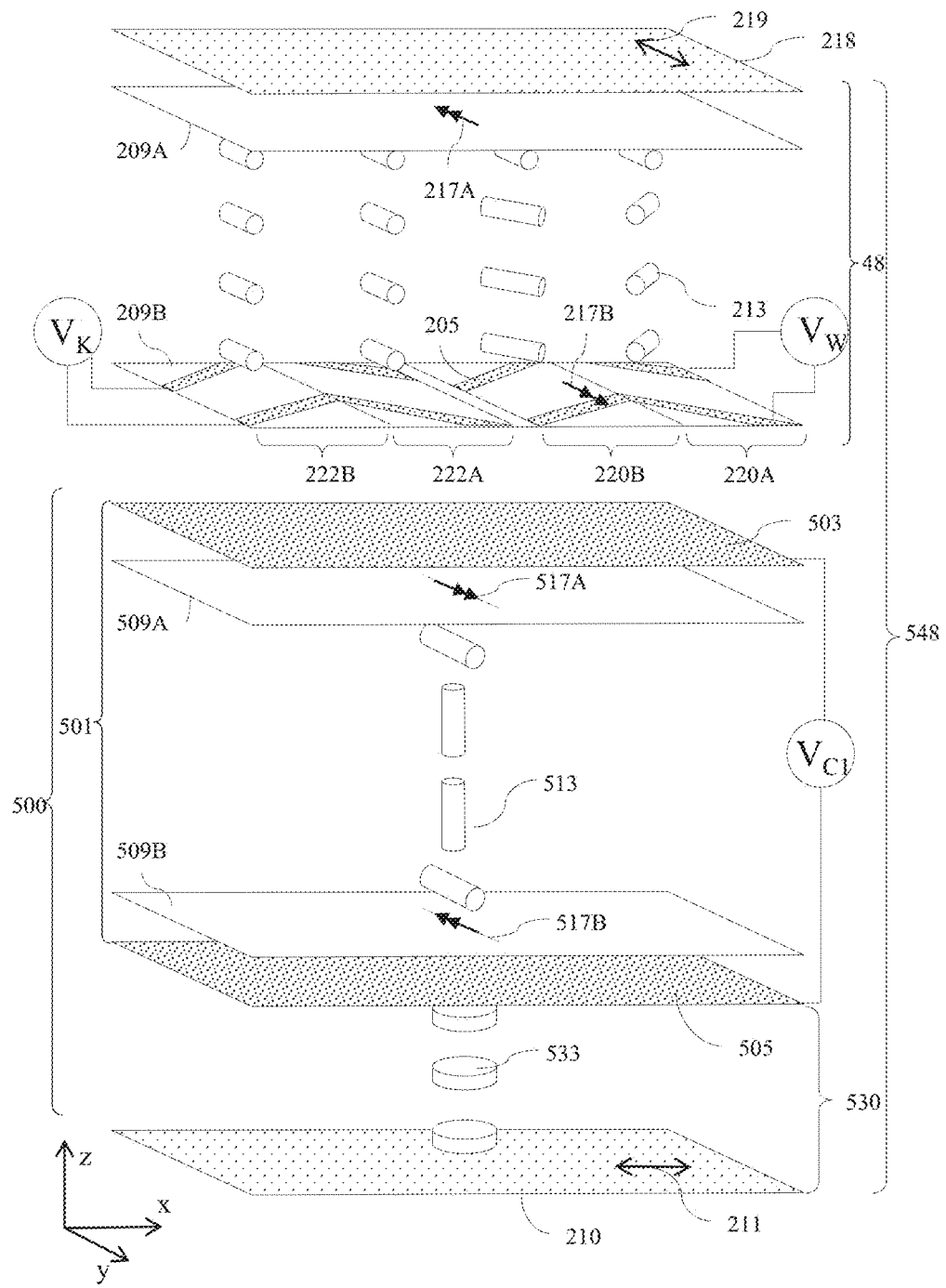
FIG. 11A is a schematic diagram illustrating in perspective side view an arrangement of an in-plane switching spatial light modulator and plural retarder layers arranged between crossed polarisers wherein the plural retarders comprise a passive negative C-plate compensation retarder and a homogeneously aligned switchable liquid crystal retarder, in a public mode of operation.

FIG. 11A is a schematic diagram illustrating in perspective side view an arrangement of an in-plane switching spatial light modulator 48 and plural retarder layers 500 arranged between crossed polarisers 210, 218 wherein the plural retarders 500 comprise a passive negative C-plate compensation retarder 530 and a homogeneously aligned switchable liquid crystal retarder 501, driven by voltage $V_{C1}$ by driver 552 to provide a public mode of operation.

The contrast-privacy optical arrangement 599 comprises at least one retarder 500 arranged between the input polariser 210 and the output polariser 218 on either the input side or the output side of spatial light modulator 48.

In the embodiment of FIG. 11A, the spatial light modulator 48 is one of an in-plane switching device or a fringe field switching device. Electrodes 503, 505 are arranged to apply a voltage for switching the layer 514 of liquid crystal material 415.

Homogeneous alignment layers 217A, 217B are arranged on opposing sides of the liquid crystal layer 214 of the spatial light modulator 48 that have pretilt directions 217A, 217B that are parallel or anti-parallel to the transmission direction 219 of the output polariser, or in other embodiments (not shown) may be orthogonal.

When no voltage is applied across the electrodes in pixels 222A, 222B (so that voltage $V_K$ is zero) the liquid crystal material 213 provides no phase modulation of polarisation states parallel to the output polariser 218 electric vector transmission direction 219. As will be described for on-axis light in privacy mode and for on-axis and off-axis light in public mode, the pixels 222A, 222B provide low transmission after the output polarisation state from the layer 214 is analysed at output polariser 218.

Pixel regions 220A, 220B illustrate first and second regions of a pixel operating in high transmission state and driven by voltage $V_W$ across electrodes 205 that are inclined at +/−45 degrees to the transmission direction 219 of the output polariser 218. For maximum transmission, the liquid crystal molecules of material 213 are rotated by the in-plane electric field so that there is a nominal orientation of the molecules of +45 degrees for the first region and −45 degrees for the second region. Incident polarisation states are arranged to undergo a half wave phase retardation. In cases in which the polarisation component incident onto the layer 214 is linear polarised at 0 degrees, then the polarisation component output from the layer 214 is rotated by 90 degrees so that it is parallel to the direction 219 and transmitted. The regions 220A, 220B are arranged to provide an averaging of polar angular transmission differences between clockwise and anti-clockwise polarisation rotations. The field of view of the luminance control of half wave retarders of pixel regions 220A, 220B of FIG. 1 is relatively high, that is the retarders do not provide an off-axis contrast effect that would be desirable for a contrast controlled privacy display.

An illustrative embodiment of the plural retarders 500 is given in TABLE 2.

219 of the output polariser 218. Thus light rays 400, 401 are transmitted with high luminance. Advantageously a pixel that has high transmittance over a wide polar viewing angle range is provided.

The propagation of light rays for black pixels in public mode will now be described.

Figure 11B:
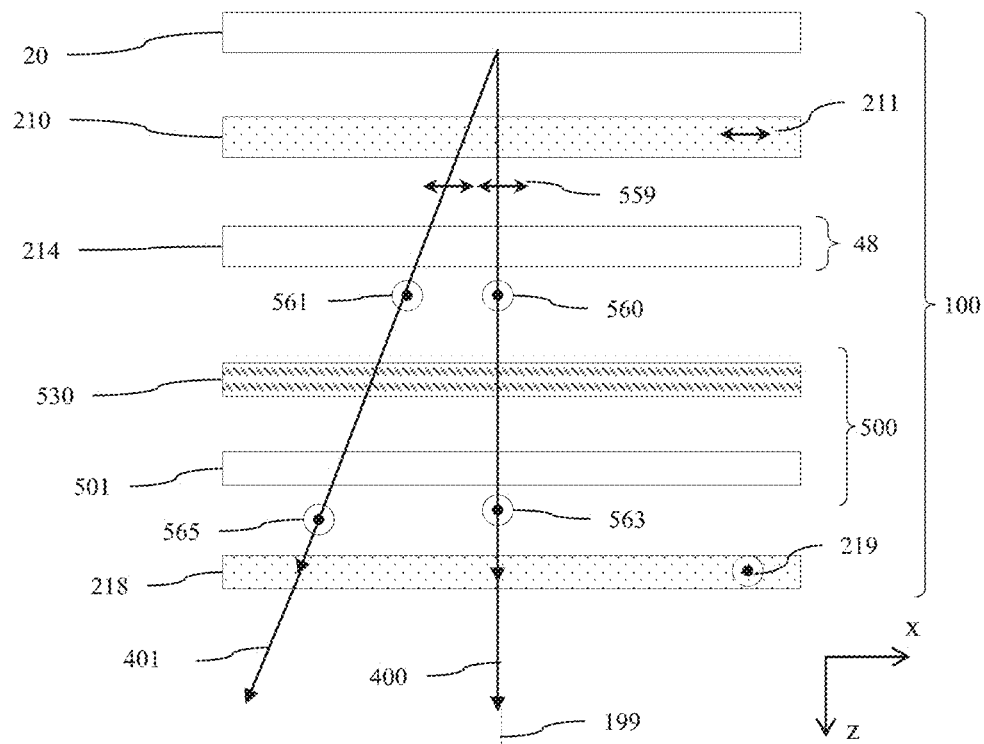
FIG. 11B is a schematic diagram illustrating in side view propagation of output light from the output polariser of a spatial light modulator through the optical stack of FIG. 1 in a public mode of operation for a maximum transmission state.
Figure 11C:
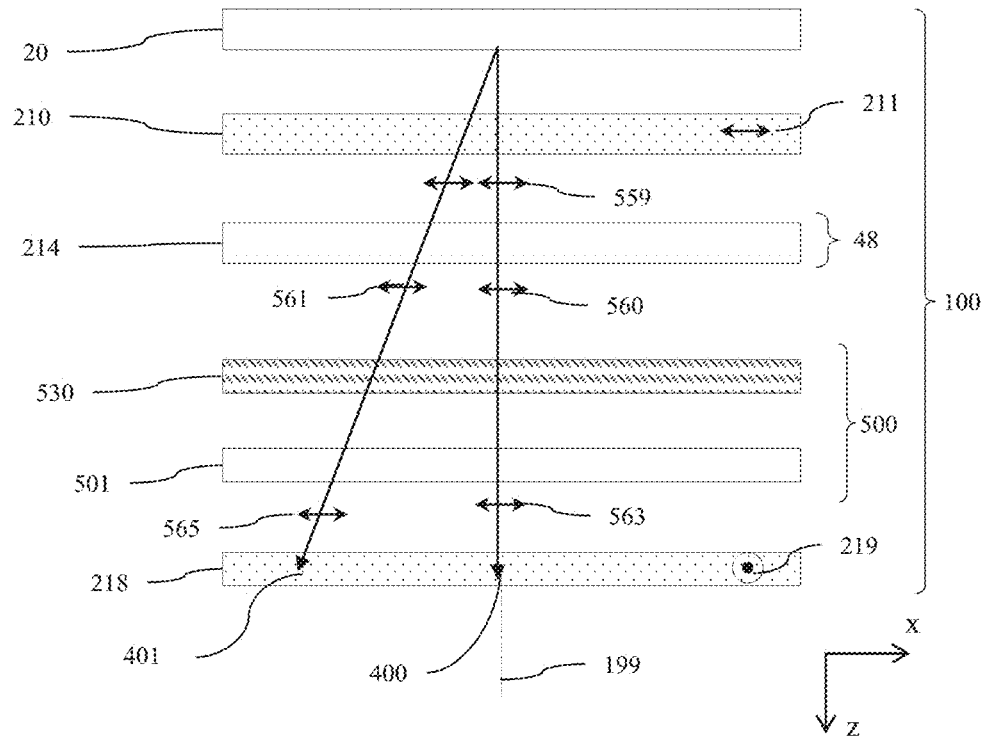
FIG. 11C is a schematic diagram illustrating in side view propagation of output light from the output polariser of a spatial light modulator through the optical stack of FIG. 1 in a public mode of operation for a minimum transmission state.

FIG. 11C is a schematic diagram illustrating inside view propagation of output light from a spatial light modulator 48 through the optical stack of FIG. 11A in a public mode of operation for a minimum transmission state. In comparison to FIG. 11B, the output polarisation components 560, 561 from the spatial light modulator 48 are unmodified in comparison to input component 559. The plural retarders 500 provide minimal further polarisation modification and

TABLE 2

| | Passive retarder(s) | | Active LC retarder | | | | | |
|---|---|---|---|---|---|---|---|---|
| Mode | Type | Δn.d/ nm | Alignment layers | Pretilt/ deg | Δn.d/ nm | Δε | Voltage $V_C$/V | LCD mode |
| Public | Negative | −300 ± 75 | Homogeneous | −2 | 400 ± 100 | 10.0 | >5 | In-plane |
| Privacy | C | | Homogeneous | 2 | | | 2.5 ± 0.2 | |

The switchable liquid crystal retarder 501 comprises two surface alignment layers 517a, 517b disposed adjacent to the layer of liquid crystal material 513 and on opposite sides thereof and each arranged to provide homogenous alignment in the adjacent liquid crystal material 513; and the liquid crystal material 513 has a positive dielectric anisotropy.

The at least one passive retarder comprises a passive retarder 530 having an optical axis perpendicular to the plane of the passive retarder 530 and having and having a retardance for light of a wavelength of 550 nm in a range from −375 nm to −225 nm.

In public mode a high voltage is applied across the switchable liquid crystal layer 514 such that the molecules of the layer 514 have a substantially homeotropic alignment under the applied field, with small residual splay near to the alignment layers 509A, 509B.

The propagation of light through the optical stack 548 when the liquid crystal material 533 of the switchable liquid crystal retarder 530 is arranged for public mode as illustrated in FIG. 11A will now be described.

FIG. 11B is a schematic diagram illustrating inside view propagation of output light from a spatial light modulator 48 through the optical stack of FIG. 11A in a public mode of operation for a maximum transmission state. The propagation of on-axis light ray 400 and off-axis light ray 401 will now be considered.

In comparison to the arrangement of FIG. 11A, in the embodiment of FIG. 11B the plural retarders 500 are arranged between the spatial light modulator 48 and the output polariser 218, however the output polarisation state achieved in both embodiments is similar or identical.

Polarisation component 559 from input polariser 210 is incident onto spatial light modulator 48. As illustrated in FIG. 11A, pixels 220A, 220B provide a linear polarisation component 560 for on-axis light and similarly a linear polarisation component 561 for off-axis light that is substantially the same as the component 560.

In the public mode of operation, the plural retarders 500 are arranged to provide substantially no modification of the polarisation components 560, 561 so that rays 400, 401 have polarisation components 563, 565 that are substantially linear with directions parallel to the transmission direction the output components 563, 565 are substantially absorbed at the output polariser 218. Advantageously a pixel that remains black with low transmittance over a wide polar viewing angle range is provided and high image contrast may be achieved over a wide polar field of view.

The operation of the display of TABLE 2 in privacy mode will now be described. In comparison to the arrangement of FIG. 1A, a different voltage $V_{C2}$ is applied to the layer 514 so that the material 513 is re-oriented. Such reorientation provides a splayed retarder structure, with a uniform retardance across the area of the display 100.

Figure 12A:
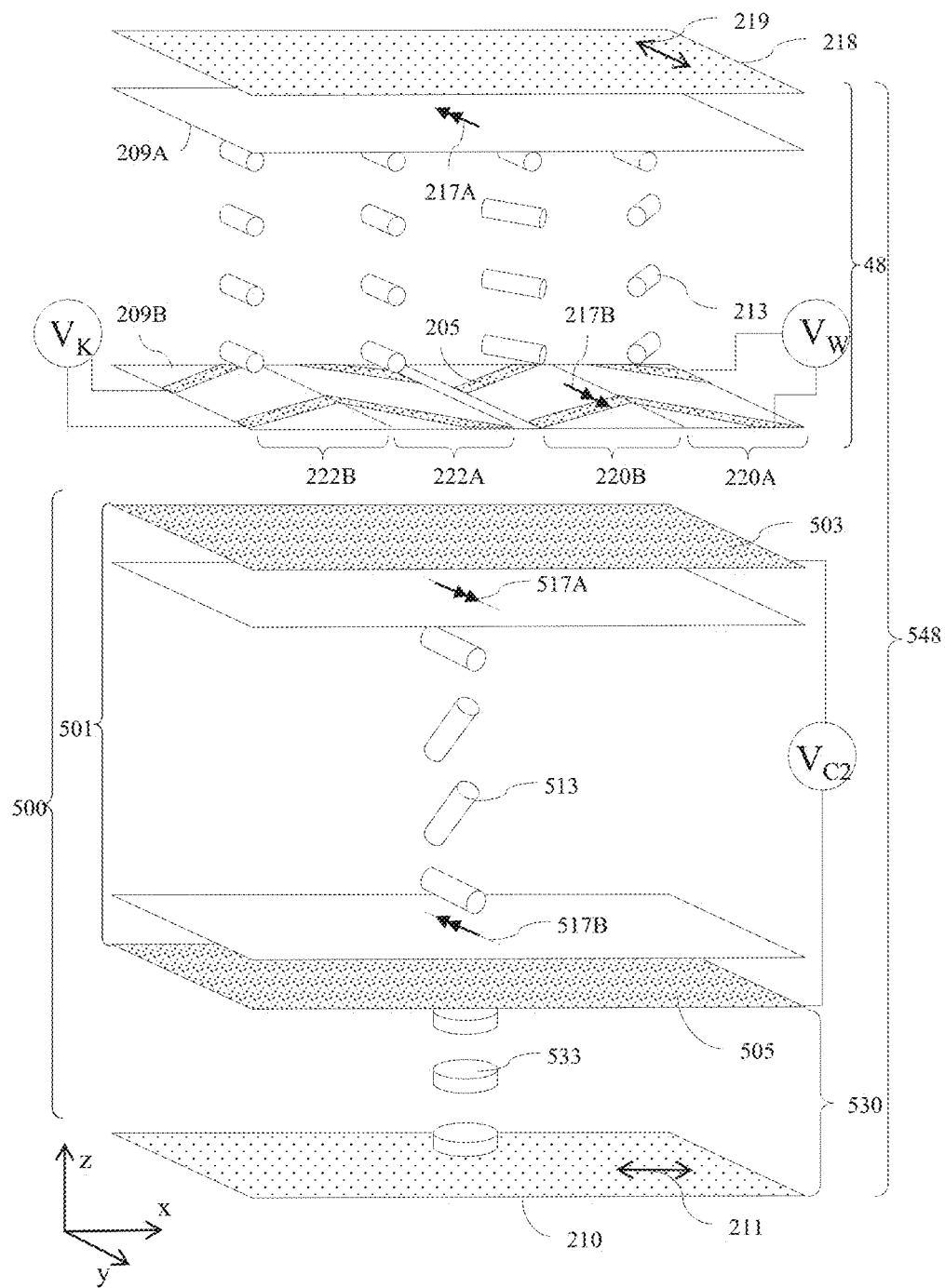
FIG. 12A is a schematic diagram illustrating in perspective side view an arrangement of an in-plane switching spatial light modulator and plural retarder layers arranged between crossed polarisers wherein the plural retarders comprise a passive negative C-plate compensation retarder and a homogeneously aligned switchable liquid crystal retarder, in a privacy mode of operation.

FIG. 12A is a schematic diagram illustrating in perspective side view an arrangement of an in-plane switching spatial light modulator 48 and plural retarder layers 500 arranged between crossed polarisers 210, 218 wherein the plural retarders 500 comprise a passive negative C-plate compensation retarder 530 and a homogeneously aligned switchable liquid crystal retarder 501, in a privacy mode of operation. In comparison to the arrangement of FIG. 11A, the voltage $V_{C2}$ is adjusted and the liquid crystal molecules 513 have different alignment within the layer 514 to achieve a polar field-of-view contrast roll-off characteristic.

The propagation of light through the optical stack 548 when the liquid crystal material 533 of the switchable liquid crystal retarder 530 is arranged for privacy mode as illustrated in FIG. 12A will now be described.

Figure 12B:
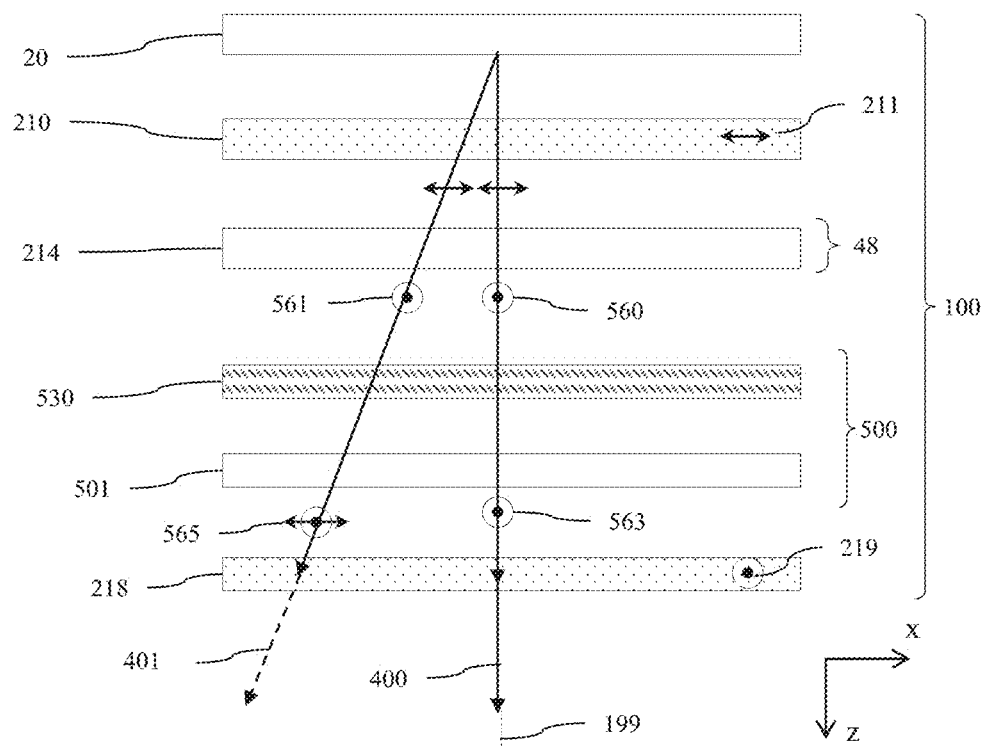
FIG. 12B is a schematic diagram illustrating in side view propagation of output light from the output polariser of a spatial light modulator through the optical stack of FIG. 1 in a privacy mode of operation for a maximum transmission state.

FIG. 12B is a schematic diagram illustrating in side view propagation of output light rays 400, 401 from a spatial light modulator 48 through the contrast-privacy arrangement 599 of FIG. 6 in a privacy mode of operation for a maximum transmission state.

In comparison to the arrangement of FIG. 11B, the plural retarders 500 are arranged to introduce no phase shift to polarisation components of light passed by the input polariser 210 along an axis 199 along a normal to the plane of the retarder 500 and are arranged to introduce a phase shift to polarisation components of light rays 401 passed by the input polariser 210 along an axis inclined to the axis 199 along a normal to the plane of the retarder in a switchable mode of the at least one switchable liquid crystal retarder 501.

Thus on-axis ray 400 has polarisation component 560 that is output as unmodified polarisation component 563 from the plural retarders 500 and is transmitted by the output polariser 218. However, off-axis ray 401 has polarisation component that comprises a combination of polarisation components that are respectively parallel and perpendicular to the electric vector transmission direction 219 of the output polariser 218, providing an intermediate output transmission, rather than a maximum transmission.

Figure 12C:
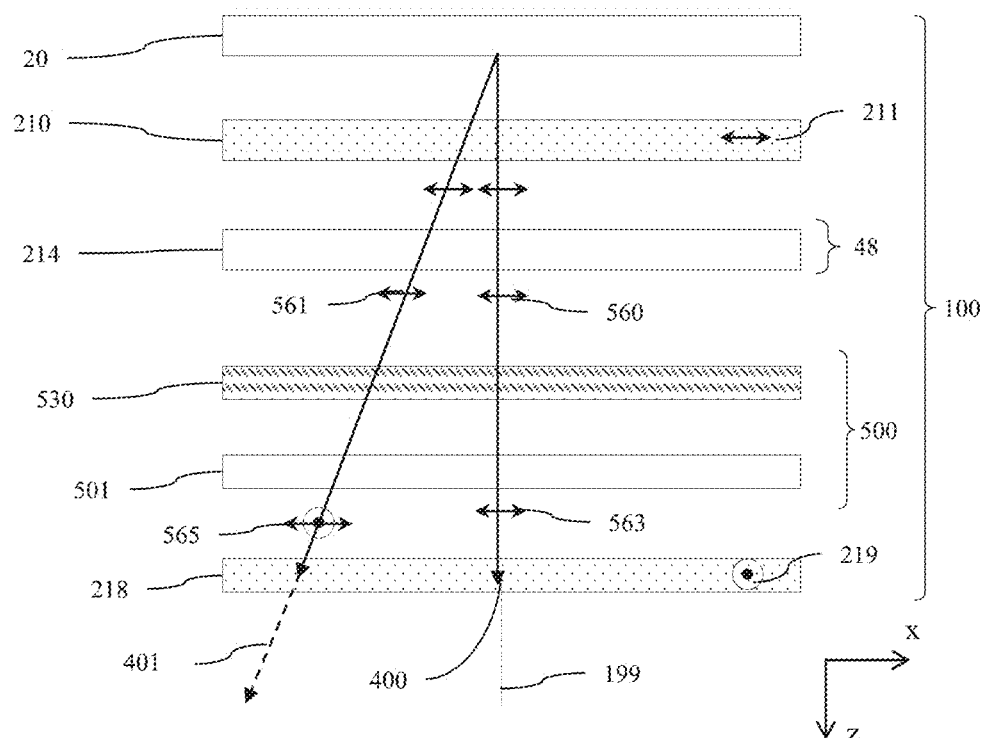
FIG. 12C is a schematic diagram illustrating in side view propagation of output light from the output polariser of a spatial light modulator through the optical stack of FIG. 1 in a privacy mode of operation for a minimum transmission state.

FIG. 12C is a schematic diagram illustrating in side view propagation of output light from a spatial light modulator 48 through the contrast-privacy arrangement 599 of FIG. 12A in a privacy mode of operation for a minimum transmission state. As with FIG. 12B, the polarisation component 563 of the on-axis ray 400 is substantially unmodified, while the off-axis ray 401 has a polarisation component that is modified, to provide an intermediate output transmission.

The polar contrast profiles for FIGS. 12B-C for the present illustrative embodiment will now be described.

Figure 13A:
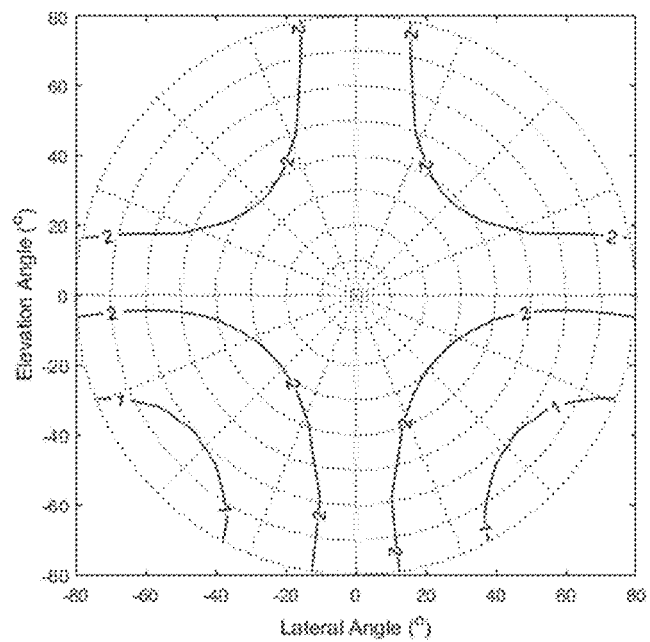
FIG. 13A is a schematic graph illustrating the variation of the logarithm of contrast with polar direction for the transmitted light rays in FIGS. 1B-C.

FIG. 13A is a schematic graph illustrating the variation of the logarithm of contrast with polar direction for the transmitted light rays in FIGS. 11B-C and the illustrative embodiment of TABLE 2. In combination the rays 400, 401 achieve high contrast over a wide polar range. Advantageously the display device 100 may be visible with high contrast by multiple users over a wide viewing range of polar viewing angles.

Figure 13B:
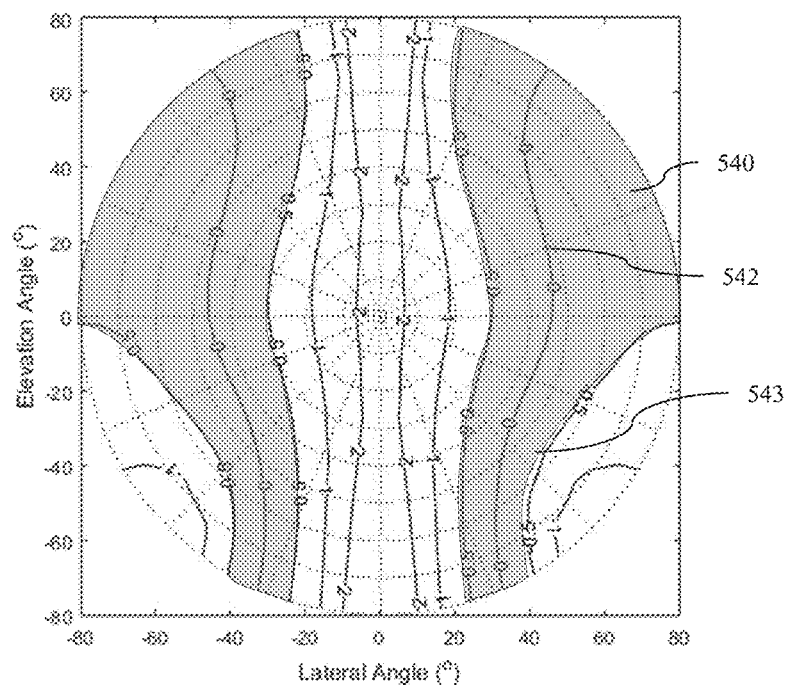
FIG. 13B is a schematic graph illustrating the variation of the logarithm of contrast with polar direction for the transmitted light rays in FIGS. 12B-C for the arrangement of FIG. 12A.

FIG. 13B is a schematic graph illustrating the variation of the logarithm of contrast with polar direction for the transmitted light rays in FIGS. 12B-C for the arrangement of FIG. 12A. Advantageously high head-on contrast ratio is achieved while the off-axis contrast ratio is reduced, reducing image visibility for off-axis snoopers.

The polar region 540 that provides high visual security level will now be considered.

For iso-contrast lines where $\log_{10}$ contrast is 0, image contrast is 1:1 and the display is substantially invisible to off-axis snoopers, independent of luminance and illuminance levels. However the polar region in which such low visibility is present is limited. For the present discussion, the polar region 540 over which $0.5 > \log_{10}$ contrast $> -0.5$ (3.16:1 > contrast > 0.316:1) will be considered. For contrast levels less than 1:1, the images are inverted, however the image structure such as text and outlines will remain visible to an off-axis snooper.

Advantageously the polar region 540 over which the display device 100 has reduced image visibility, and therefore increased visual security level, VSL is increased by means of contrast reduction.

An alternative contrast-privacy arrangement 599 will now be described.

Figure 14A:
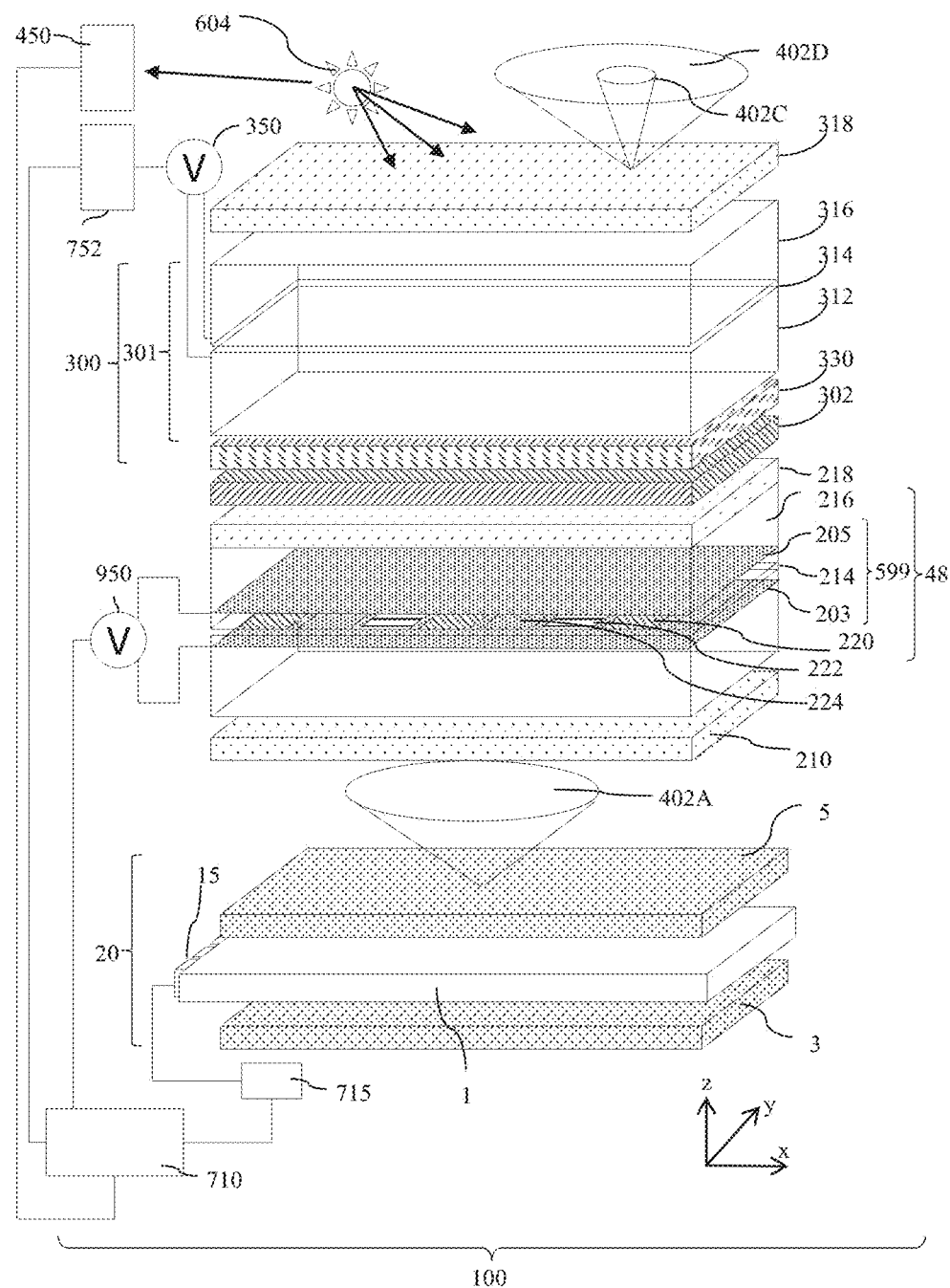
FIG. 14A is a schematic diagram illustrating in side perspective view a controllable privacy display for use in ambient illumination comprising: a transmissive spatial light modulator comprising a biased in-plane switching liquid crystal mode, arranged between input and output polarisers; and a reflective polariser, a compensation retarder and a switchable liquid crystal retarder arranged between the output polariser and an additional polariser.

FIG. 14A is a schematic diagram illustrating inside perspective view a controllable privacy display device 100 for use in ambient light 604 illumination comprising: a transmissive spatial light modulator 48 comprising a biased in-plane switching liquid crystal mode, arranged between input and output polarisers 210, 218; and a reflective polariser, a compensation retarder and a switchable liquid crystal retarder arranged between the output polariser and an additional polariser.

The display device 100 comprises a spatial light modulator 48 comprising a layer 214 of liquid crystal material 213 and the contrast-privacy optical arrangement 599 comprises at least one electrode 203, 205 arranged to provide biased in-plane switching of the liquid crystal material 213.

In comparison to the arrangement of FIG. 1, the contrast-privacy arrangement 599 is provided by electrodes 203, 205 at the liquid crystal layer 214 of the spatial light modulator 48 in comparison to the plural retarders 500.

Figure 14B:
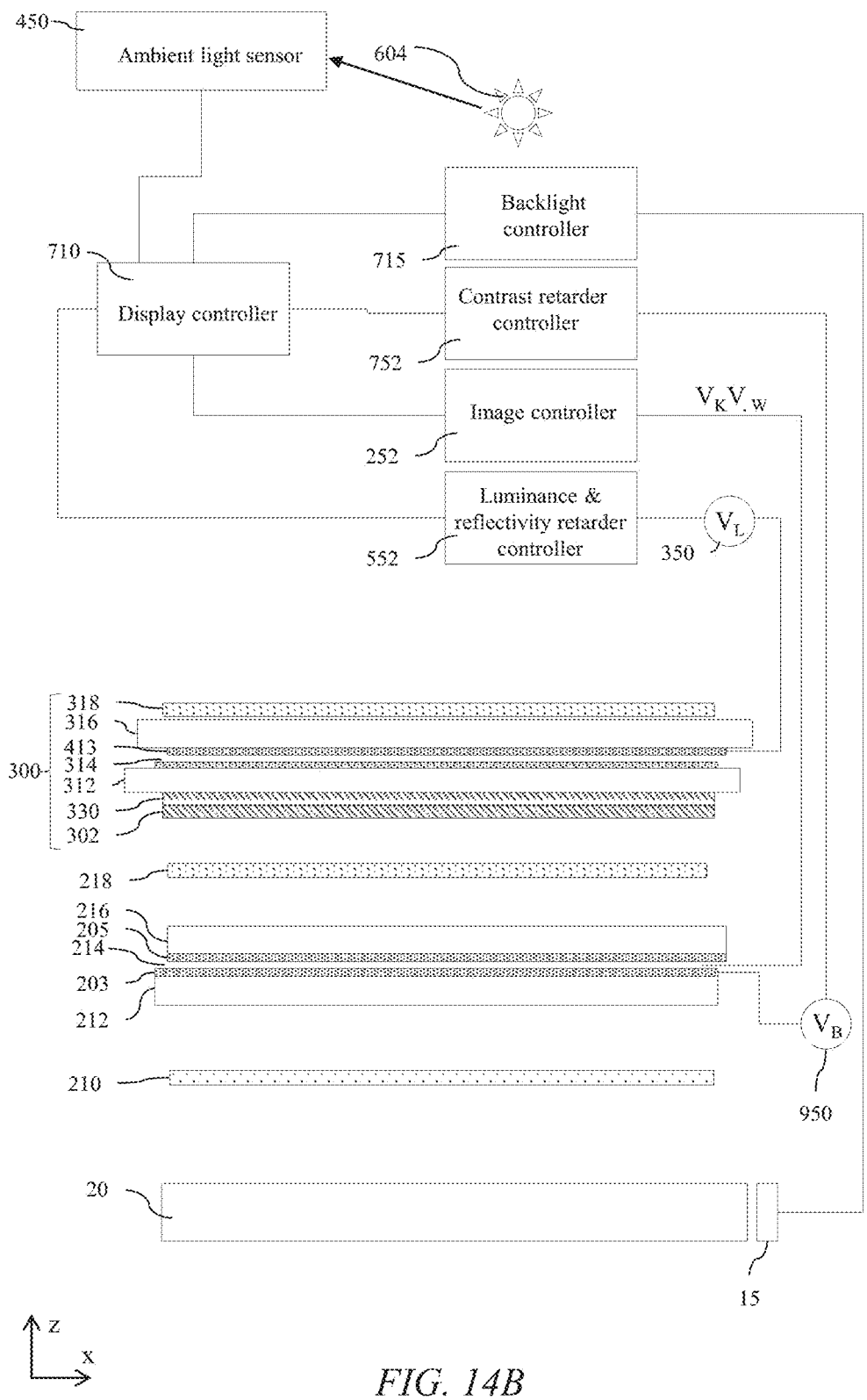
FIG. 14B is a schematic diagram illustrating a control system for the controllable privacy display of FIG. 14A.

FIG. 14B is a schematic diagram illustrating a control system for the controllable privacy display of FIG. 14A. The structure and operation of FIG. 14B is similar to FIG. 2, with contrast control retarder 752 controlling voltage driver 950 that sets bias voltage $V_B$.

Figure 14C:
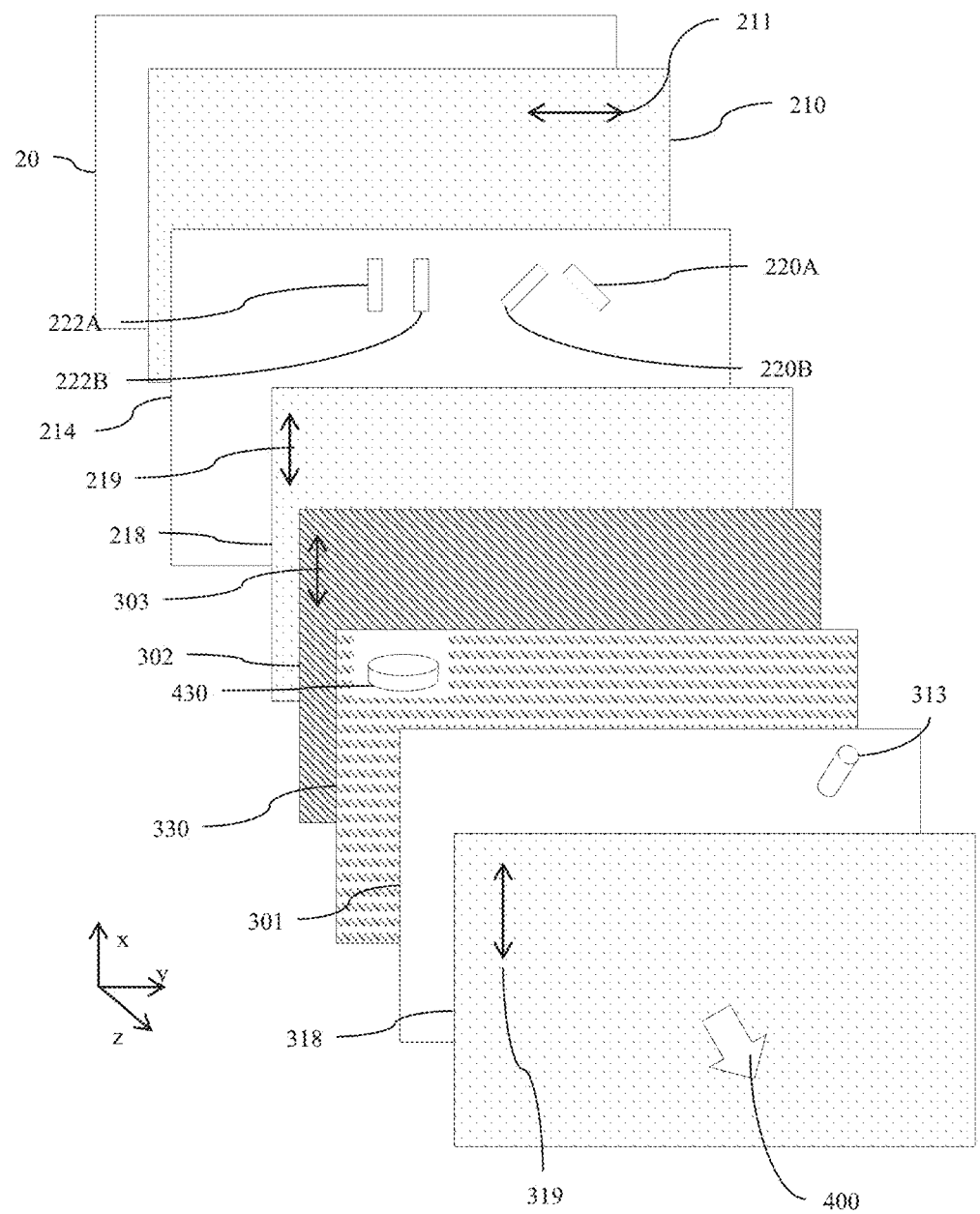
FIG. 14C is a schematic diagram illustrating in front view alignment of optical layers in the optical stack of FIG. 14A.

FIG. 14C is a schematic diagram illustrating in front view alignment of optical layers in the optical stack of FIG. 14A. The structure of FIG. 14C is similar to the optical stack of FIG. 3, however the plural retarders 500 are omitted.

The operation of a bias controlled in-plane switching liquid crystal layer 214 will now be described.

Figure 14D:
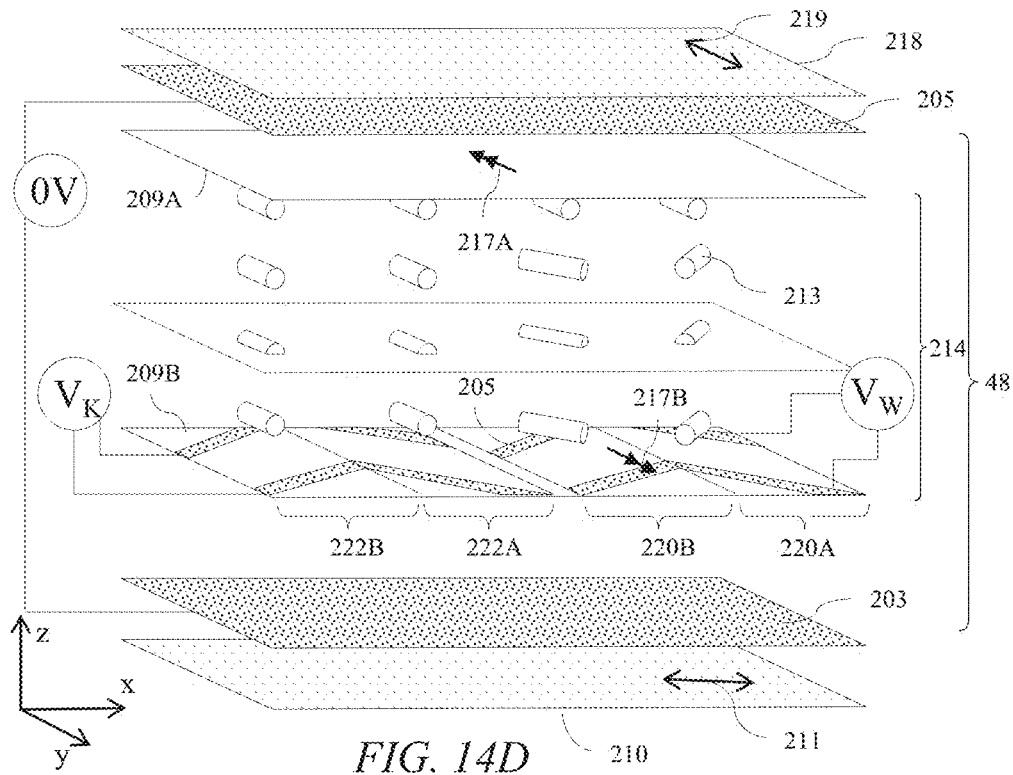
FIG. 14D is a schematic diagram illustrating in perspective side view an arrangement of a biased in-plane switching spatial light modulator, in a public mode of operation.
Figure 14E:
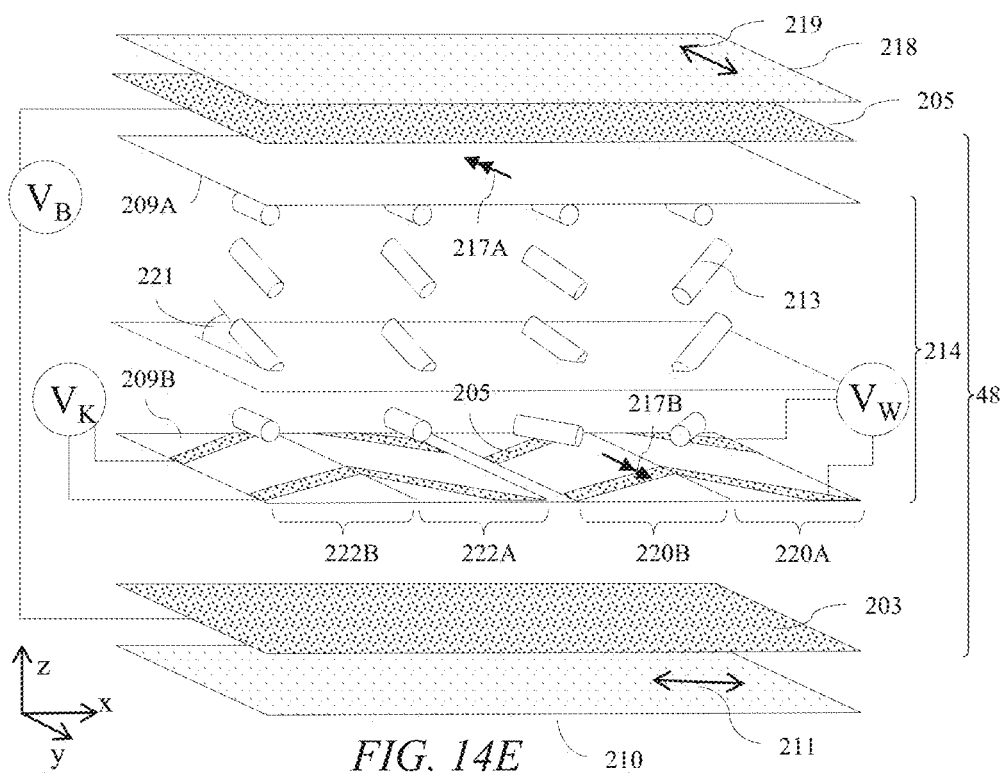
FIG. 14E is a schematic diagram illustrating in perspective side view an arrangement of a biased in-plane switching spatial light modulator, in a privacy mode of operation.

FIG. 14D is a schematic diagram illustrating in perspective side view an arrangement of a biased in-plane switching spatial light modulator, in a public mode of operation; and FIG. 14E is a schematic diagram illustrating in perspective side view an arrangement of a biased in-plane switching spatial light modulator, in a privacy mode of operation.

In public mode, voltage $V_B$ is set to zero volts so that the molecules 213 of the display operate in-plane and public mode operation is achieved as described for FIG. 11A for example.

By comparison, in privacy mode, as illustrated in FIG. 14E, the molecules 213 are tilted by the applied voltage $V_B$ to achieve out-of-plane liquid crystal molecule orientation, at angle 221 from the plane. Such tilted molecules of liquid crystal material 213 provide viewing angle contrast modifications that may be similar in nature to that provided by an uncompensated switchable retarder 501 of FIG. 1 (i.e. omitting a passive compensation retarder 530) and as will be described with respect to TABLE 4, below.

However, in comparison to the arrangement of FIG. 1, the molecules undergo a splay and twist as well as tilt due to the homogeneous alignment at the upper alignment layer 209A that degrades colour performance. Undesirably such displays provide colour saturation variations that are clearly visible to on-axis observers.

Further luminance-privacy arrangements 399 comprising backlights 20 that are directional backlights and may further comprise switchable backlights and will now be described.

Figure 15A:
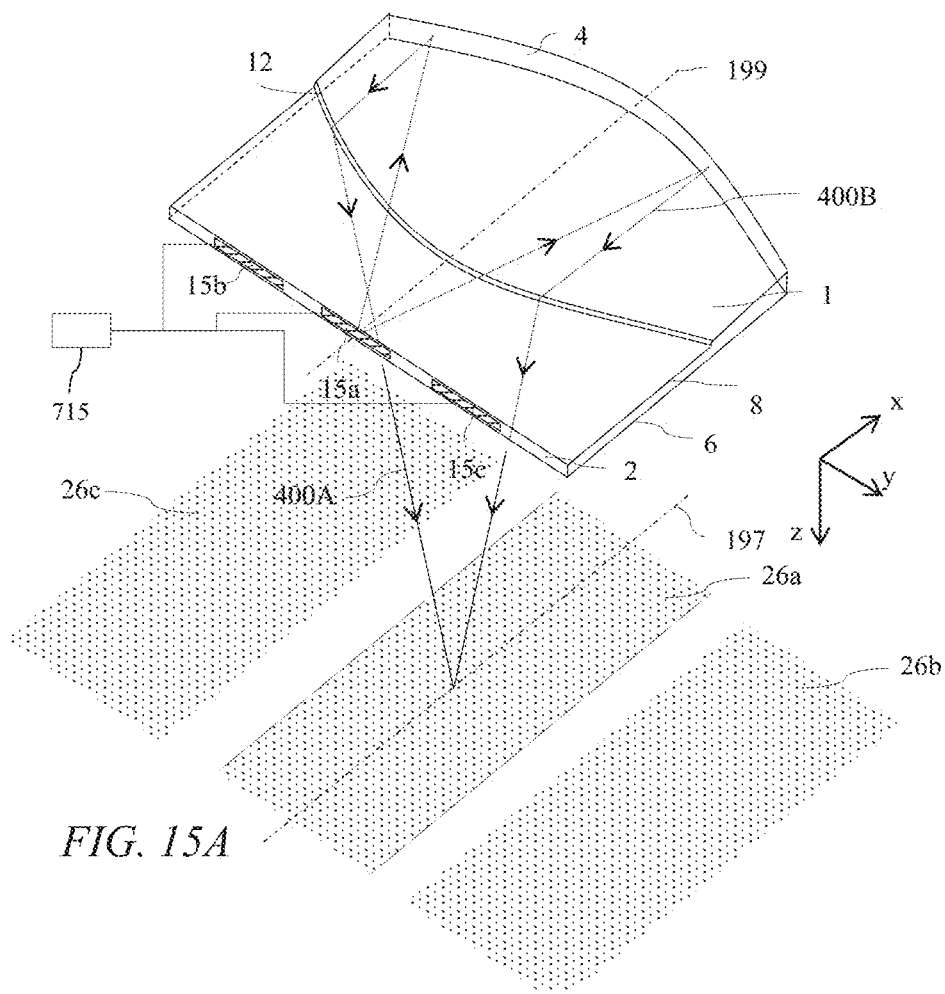
FIG. 15A is a schematic diagram illustrating a rear perspective view of operation of an imaging waveguide in a narrow angle mode of operation.

FIG. 15A is a schematic diagram illustrating a rear perspective view operation of an imaging waveguide 1 providing on-axis optical window 26a and off-axis optical windows 26b, 26c. Imaging waveguides are described in U.S. Pat. Nos. 9,519,153 and 10,054,732, both of which are herein incorporated by reference in their entireties.

The display device 100 comprises: a backlight 20 comprising plural light sources 15a-n and a directional waveguide 1 arranged to direct light from different light sources 15a-n in different angular ranges; and a spatial light modulator 48 arranged to receive light from the waveguide 1 and output light from an output side, and the luminance-privacy optical arrangement 399 comprises a switching arrangement arranged to selectively operate the light sources 15a-n.

Light rays 400A, 400B provided by input set 15a of light sources are directed to reflective end 4, and directed within the waveguide 1 to extraction feature 12 by means of total internal reflection within the waveguide 1. The waveguide 1 comprises a light input surface 2 extending along a first end of the directional waveguide 1, and a reflective end 4 extending along a second end of the directional waveguide 1 opposite to the first end 2 for reflecting the input light back along the waveguide 1, the reflective end 4 having positive optical power in the lateral direction. The second guide surface 8 comprises light extraction features 12 and intermediate regions 10 between the light extraction features 12, the light extraction features 12 being oriented to deflect the reflected input light 400A, 400B through the first guide surface 6 as output light and the intermediate regions 10 being arranged to direct light through the waveguide 1 without extracting it.

As illustrated in FIG. 15A, the light extraction features may have positive optical power in the lateral direction, such optical power cooperates with the optical power of the curved reflective end 4 to provide imaging of the set 15 of light sources. After reflection rays 400A, 400B is directed in the z-direction to optical window 26 in the window plane 106. Optical window 26a is an image in the lateral direction (y-axis) of the set 15 of light sources.

The second guide surface 8 is thus arranged to deflect the reflected input light 400A, 400B through the first guide 6 surface as output light, and the waveguide 1 is arranged to image the set 15 of light sources in the lateral direction so that the output light from the light sources is directed into respective optical windows 26 in output directions that are distributed in dependence on input positions of the light sources of the set 15 of light sources.

Further off-axis optical windows 26b, 26c are provided by illuminating sets 15b, 15c of light sources respectively. By switching light source sets 15b, 15c independently of light source set 15a, then the backlight 20 may switch between a narrow angle profile and a wide angle profile.

The backlight 20 may thus provide the luminance-privacy arrangement 399 or may be used in cooperation with the retarder 300 and additional polariser 318 of FIG. 1 for example.

Advantageously the angular profile of the public mode of operation may be maximised to achieve increased image visibility for off-axis observers in public mode of operation, and increased visual security level in privacy mode.

Figure 15B:
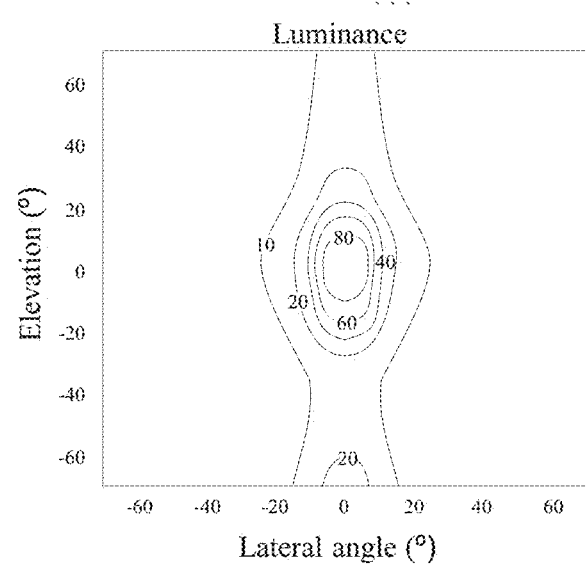
FIG. 15B is a schematic graph illustrating field-of-view luminance plot of the output of FIG. 15A when used in a display apparatus.

FIG. 15B is a schematic graph illustrating field-of-view luminance plot of the output of FIG. 15A when used in a display apparatus with no switchable liquid crystal retarder 300 and additional polariser 318, where luminance contour lines are illustrated.

Advantageously relatively low levels of off-axis luminance may be achieved for off-axis viewing, achieved by the imaging of the waveguide 1. For example less than 5% of head-on luminance at a lateral angle of 45 degrees and elevation of 0 degrees may be provided.

Such a waveguide has a thickness that is limited by the height of the light sources and efficiency determined by the relative height of the reflective end 4 and input end 2. It would be desirable to provide reduced thickness.

Figure 15C:
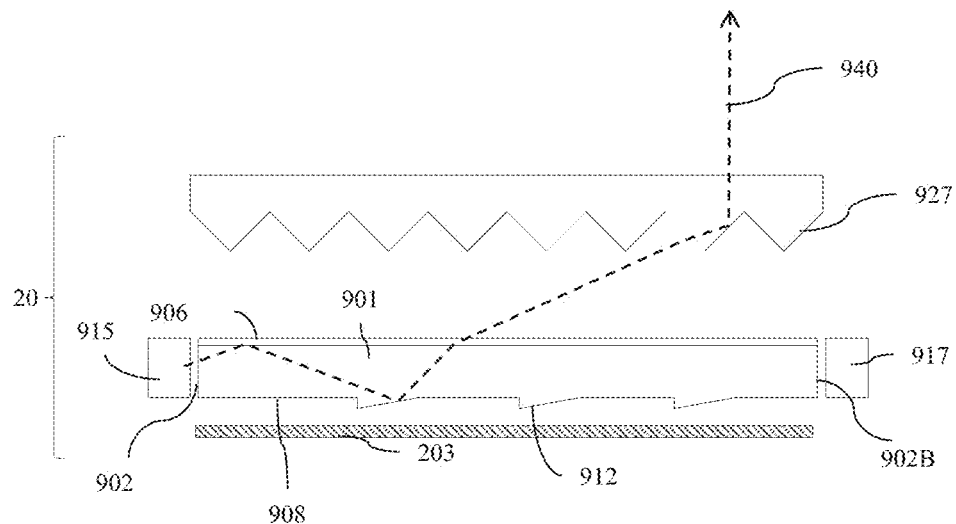
FIG. 15C is a schematic diagram illustrating side view of a backlight comprising collimating waveguide.
Figure 15D:
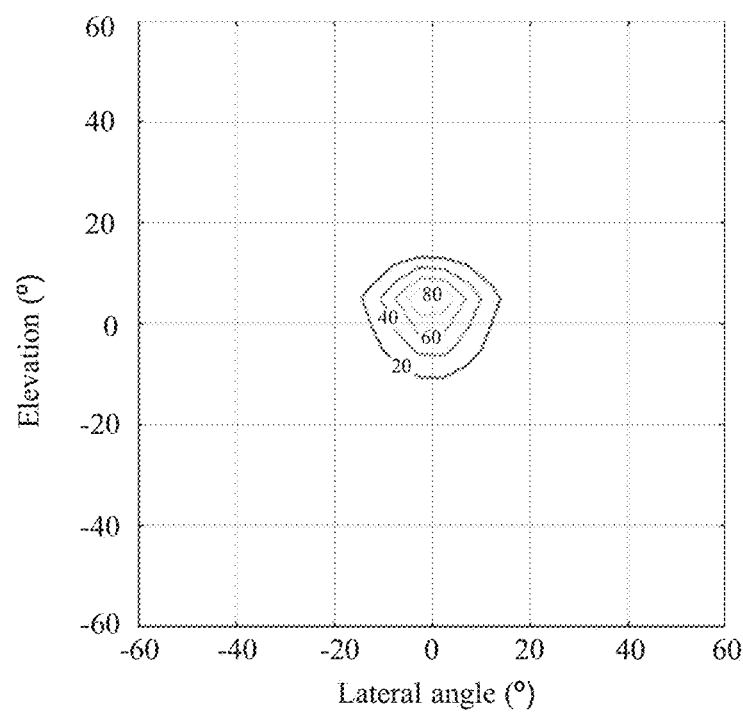
FIG. 15D is a schematic graph illustrating field-of-view luminance plot of the output of FIG. 15C when used in a display apparatus.

FIG. 15C is a schematic diagram illustrating side view of a backlight comprising collimating waveguide; and FIG. 15D is a schematic graph illustrating field-of-view luminance plot of the output of FIG. 15C.

Directional backlight 20 comprises a collimating waveguide 901 with first and second opposing guide surfaces. A plurality of elongate lenticular elements 906 is arranged on the first guide surface of the waveguide 901. The lenticular elements 906 have extended cylindrical lens shapes that extend away from end 902 of the waveguide 901.

A plurality of inclined light extraction features 912 arranged in an array on the second guide surface of the waveguide 901 opposite the first guide surface with planar light guiding surface 908 between light deflecting features 912

Input light sources 915 are arranged at the end 902. The plurality of elongate lenticular elements 906 and the plurality of inclined light extraction features 912 are oriented to deflect input light rays 940 guided through the directional waveguide 901 to exit through the first guide surface of the waveguide 901.

Light ray 940 from illumination source 915 is guided within the waveguide 901 and output towards turning film 927 either by transmission through the lenticular surface 906 or by reflection from the reflector 903 after exiting planar surfaces 908. Output light rays 950 from the waveguide 901 are deflected by total internal reflection in the turning film 927 and are incident onto the optical stack 548 of the display 100.

In comparison to the arrangement of FIG. 15A, thickness may be advantageously reduced.

In the present embodiments, the backlight 20 may be arranged to provide an angular light distribution that has reduced luminance for off-axis viewing positions in comparison to head-on luminance. A typical wide angle backlight has a roll-off at higher angles such that the full width half maximum of relative luminance may be preferably greater than 40°, more preferably greater than 60° and most preferably greater than 80°.

The backlight 20 may be a directional backlight that provides a luminance at polar angles to the normal to the spatial light modulator 48 greater than 45 degrees that is at most 30% of the luminance along the normal to the spatial light modulator 48, preferably at most 20% of the luminance along the normal to the spatial light modulator 48, and more preferably at most 10% of the luminance along the normal to the spatial light modulator 48. In an illustrative embodiment of FIG. 1A, the luminance at polar angles to the normal to the spatial light modulator 48 greater than 45 degrees may be at most 18%.

Backlight 20 may further comprise a switchable backlight arranged to switch the output angular luminance profile in order to provide reduced off-axis luminance in a privacy mode of operation and higher off-axis luminance in a public mode of operation. Such a directional backlight provides some off-axis luminance reduction, advantageously increasing head-on efficiency and reducing display visibility and stray light for off-axis locations.

The polar properties of various display arrangements will now be discussed, extending the discussion of visual security level given for FIGS. 4A-B and FIGS. 5A-B.

Figure 16A:
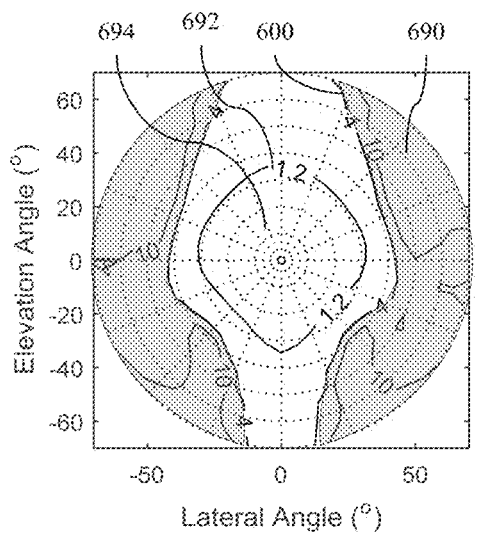
FIG. 16A is a schematic graph illustrating field-of-view visual security level plot for a display comprising the luminance, transmission, reflectivity, and logarithmic contrast ratio polar variations of FIGS. 16B-E for a ratio of illuminance to head-on luminance of 1.0 lux/nit.

FIG. 16A is a schematic graph illustrating field-of-view visual security level, VSL plot for a display comprising the luminance, transmission, reflectivity, and logarithmic contrast ratio polar variations of FIGS. 16B-E for a ratio of illuminance to head-on luminance of 1.0 lux/nit. In the present embodiments, the visual security level, VSL is calculated according to equation 4, above.

Figure 16B:
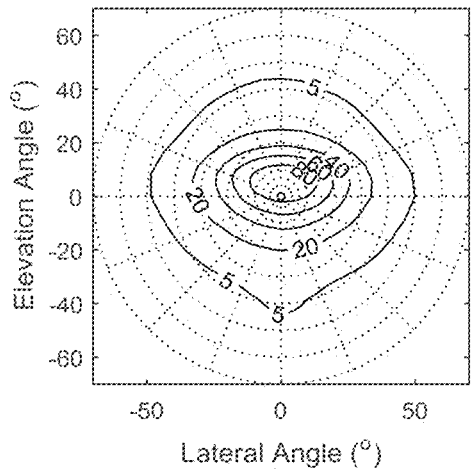
FIG. 16B is a schematic graph illustrating luminance field-of-view plot for a collimated backlight.
Figure 16C:
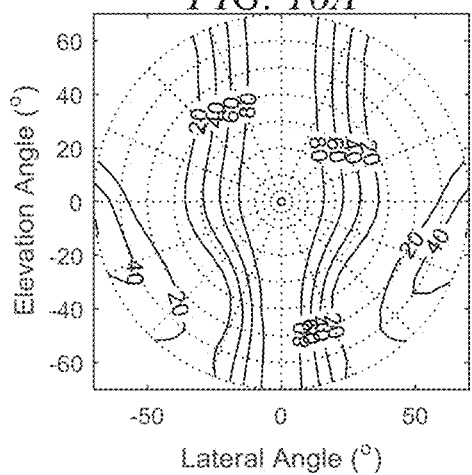
FIG. 16C is a schematic graph illustrating transmission field-of-view plot for a display comprising plural retarders of TABLE 2 arranged between the output polariser and the additional polariser.
Figure 16D:
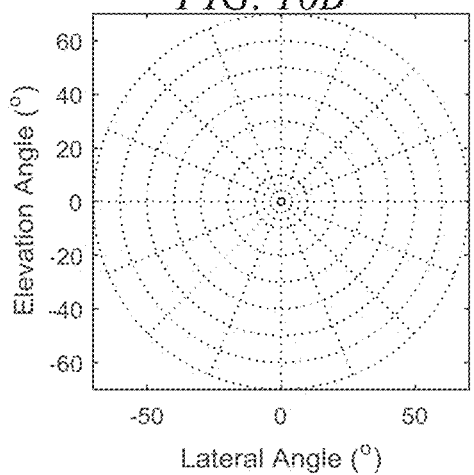
FIG. 16D is a schematic graph illustrating reflectivity field-of-view plot for a display comprising no reflective polariser arranged between the output polariser and the additional polariser.
Figure 16E:
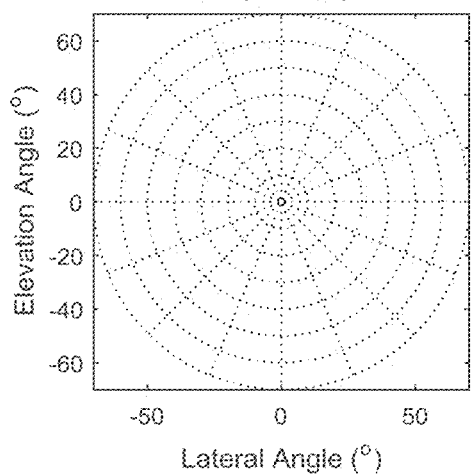
FIG. 16E is a schematic graph illustrating logarithmic contrast ratio field-of-view plot for a display comprising no retarder arranged between the input polariser and the output polariser.

FIG. 16B is a schematic graph illustrating luminance field-of-view plot for a collimated backlight 20; FIG. 16C is a schematic graph illustrating transmission field-of-view plot for a display comprising plural retarders 300 of TABLE 3 arranged between the output polariser 218 and the additional polariser 318; FIG. 16D is a schematic graph illustrating reflectivity field-of-view plot for a display 100 comprising no reflective polariser arranged between the output polariser 218 and the additional polariser 318; and FIG. 16E is a schematic graph illustrating logarithmic contrast ratio field-of-view plot for a display comprising no retarder 500 arranged between the input polariser 210 and the output polariser 218.

TABLE 3

| | | | Active LC retarder | | | |
|---|---|---|---|---|---|---|
| | Passive retarder(s) | | Alignment layers | Pretilt/ deg | Δn.d/ nm | Δε | Voltage/ V |
| Mode | Type | Δn.d/ nm | | | | | |
| Public | Crossed A | +500 @ 45° | Homogeneous | 2 | 750 | 13.2 | 10 |
| Privacy | | +500 @ 135° | Homogeneous | 2 | | | 2.3 |

Referring to FIG. 16A, the VSL threshold 600 contour is illustrated along with the desirable region 690 that is above VSL threshold 600 for viewing by a snooper. Further a region 694 is indicated with a VSL that is above an image visibility threshold of W=0.83 (VSL=1.2), within contour 692, (described with respect to equation 11 above).

Figure 17A:
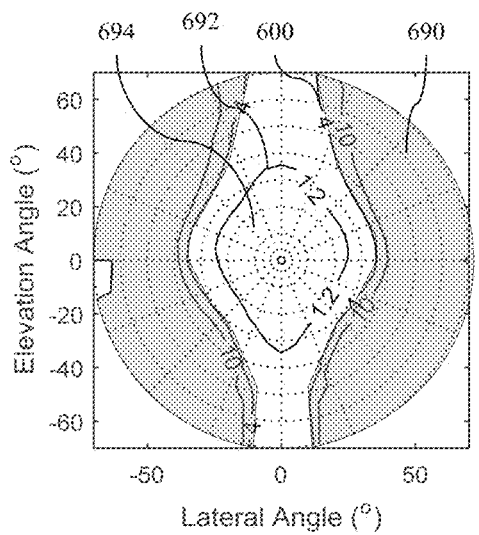
FIG. 17A is a schematic graph illustrating field-of-view visual security level plot for a display comprising the luminance, transmission, reflectivity, and logarithmic contrast ratio polar variations of FIGS. 17B-E for a ratio of illuminance to head-on luminance of 1.0 lux/nit.
Figure 17B:
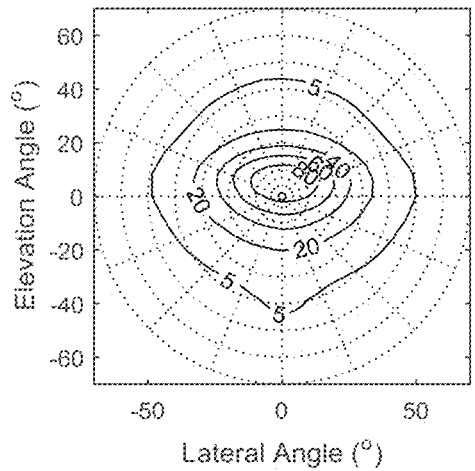
FIG. 17B is a schematic graph illustrating luminance field-of-view plot for a collimated backlight.
Figure 17C:
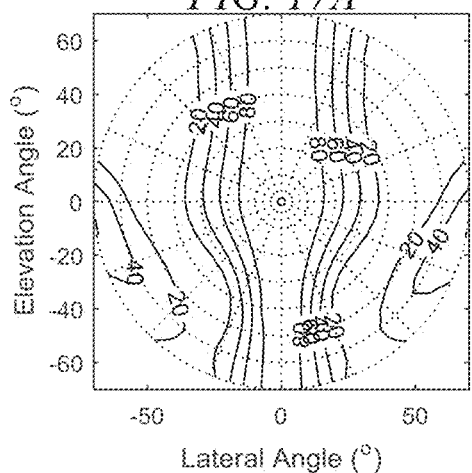
FIG. 17C is a schematic graph illustrating transmission field-of-view plot for a display comprising plural retarders of TABLE 2 arranged between the output polariser and the additional polariser.

FIG. 17A is a schematic graph illustrating field-of-view visual security level plot for a display comprising the luminance, transmission, reflectivity, and logarithmic contrast ratio polar variations of FIGS. 17B-E for a ratio of illuminance to head-on luminance of 1.0 lux/nit; FIG. 17B is a schematic graph illustrating luminance field-of-view plot for a collimated backlight; FIG. 17C is a schematic graph illustrating transmission field-of-view plot for a display comprising plural retarders of TABLE 2 arranged between the output polariser and the additional polariser.

Figure 17D:
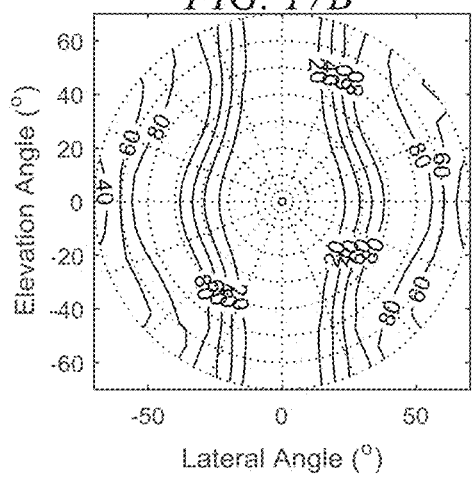
FIG. 17D is a schematic graph illustrating reflectivity field-of-view plot for a display comprising a reflective polariser arranged between the output polariser and the plural retarders.

FIG. 17D is a schematic graph illustrating reflectivity field-of-view plot for a display comprising a reflective polariser 302 arranged between the output polariser 218 and the plural retarders 300 for the arrangement of TABLE 3, as a percentage of peak reflectivity achievable for a given optical stack of reflective polariser 302.

Figure 17E:
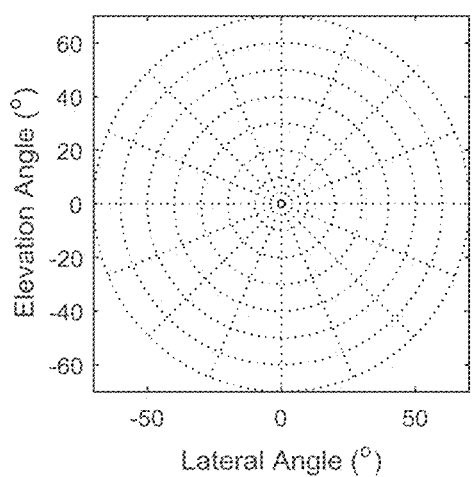
FIG. 17E is a schematic graph illustrating logarithmic contrast ratio field-of-view plot for a display comprising no retarder arranged between the input polariser and the output polariser.

FIG. 17E is a schematic graph illustrating logarithmic contrast ratio field-of-view plot for a display comprising no retarder arranged between the input polariser and the output polariser. As no contrast-privacy arrangement 599 is operated, the contrast is uniform.

In comparison to the arrangement of FIG. 16A, FIG. 17A advantageously achieves increased region over which VSL is above threshold, due to the effect of increased display reflectivity from the reflective polariser 302.

Figure 18A:
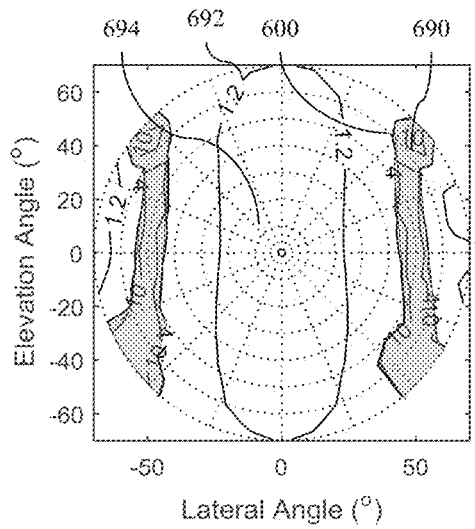
FIG. 18A is a schematic graph illustrating field-of-view visual security level plot for a display comprising the luminance, transmission, reflectivity, and logarithmic contrast ratio polar variations of FIGS. 18B-E for a ratio of illuminance to head-on luminance of 1.0 lux/nit.

FIG. 18A is a schematic graph illustrating field-of-view visual security level plot for a display comprising the luminance, transmission, reflectivity, and logarithmic contrast ratio polar variations of FIGS. 18B-E for a ratio of illuminance to head-on luminance of 1.0 lux/nit.

Figure 18B:
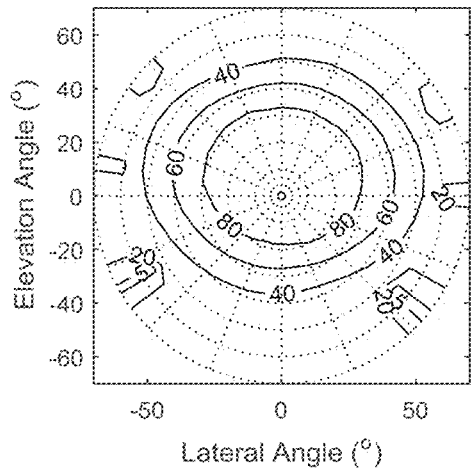
FIG. 18B is a schematic graph illustrating luminance field-of-view plot for a wide angle backlight.
Figure 18C:
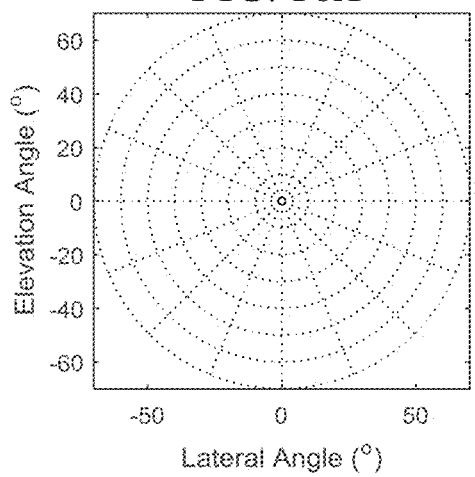
FIG. 18C is a schematic graph illustrating transmission field-of-view plot for a display comprising plural retarders of TABLE 2 arranged between the output polariser and the additional polariser.
Figure 18D:
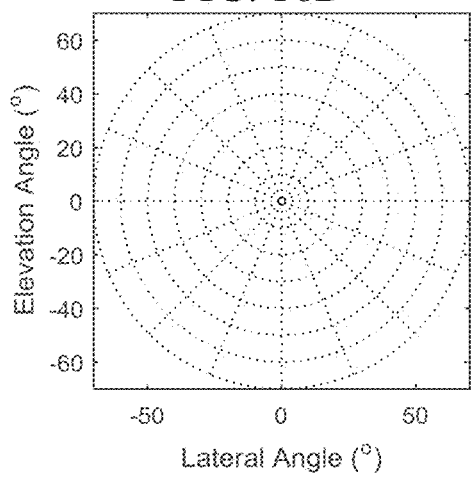
FIG. 18D is a schematic graph illustrating reflectivity field-of-view plot for a display comprising a reflective polariser arranged between the output polariser and the plural retarders.

FIG. 18B is a schematic graph illustrating luminance field-of-view plot for a wide angle backlight that is typically used with such an arrangement; FIG. 18C is a schematic graph illustrating transmission field-of-view plot for a display comprising plural retarders of TABLE 2 arranged between the output polariser and the additional polariser; and FIG. 18D is a schematic graph illustrating reflectivity field-of-view plot for a display comprising a reflective polariser arranged between the output polariser and the plural retarders.

Figure 18E:
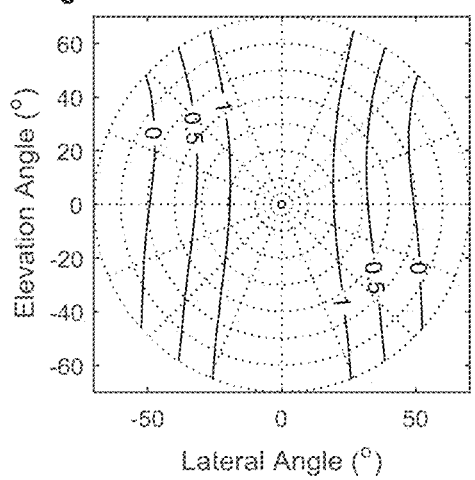
FIG. 18E is a schematic graph illustrating logarithmic contrast ratio field-of-view plot for a display comprising retarders as described in TABLE 3 arranged between the input polariser and the output polariser.

FIG. 18E is a schematic graph illustrating logarithmic contrast ratio field-of-view plot for a display comprising retarders as described in TABLE 4 arranged between the input polariser and the output polariser.

TABLE 4

| | Active LC retarder | | | | IPS cell | |
|---|---|---|---|---|---|---|
| Mode | Alignment layers | Pretilt/ deg | Δn.d/ nm | Δε | Voltage $V_C$/V | Δn.d/ nm |
| Public | Homogeneous | 2 | +300 | 13.2 | 10 | 265 |
| Privacy | Homogeneous | 7 | | | 1.6 | |

In comparison to FIGS. 16A and 17A, the polar region for visual security level VSL>4 is substantially reduced.

The effect of reducing ambient light 604 illuminance on a display of FIG. 1 with no contrast-privacy element 599 will now be described.

Figure 19A:
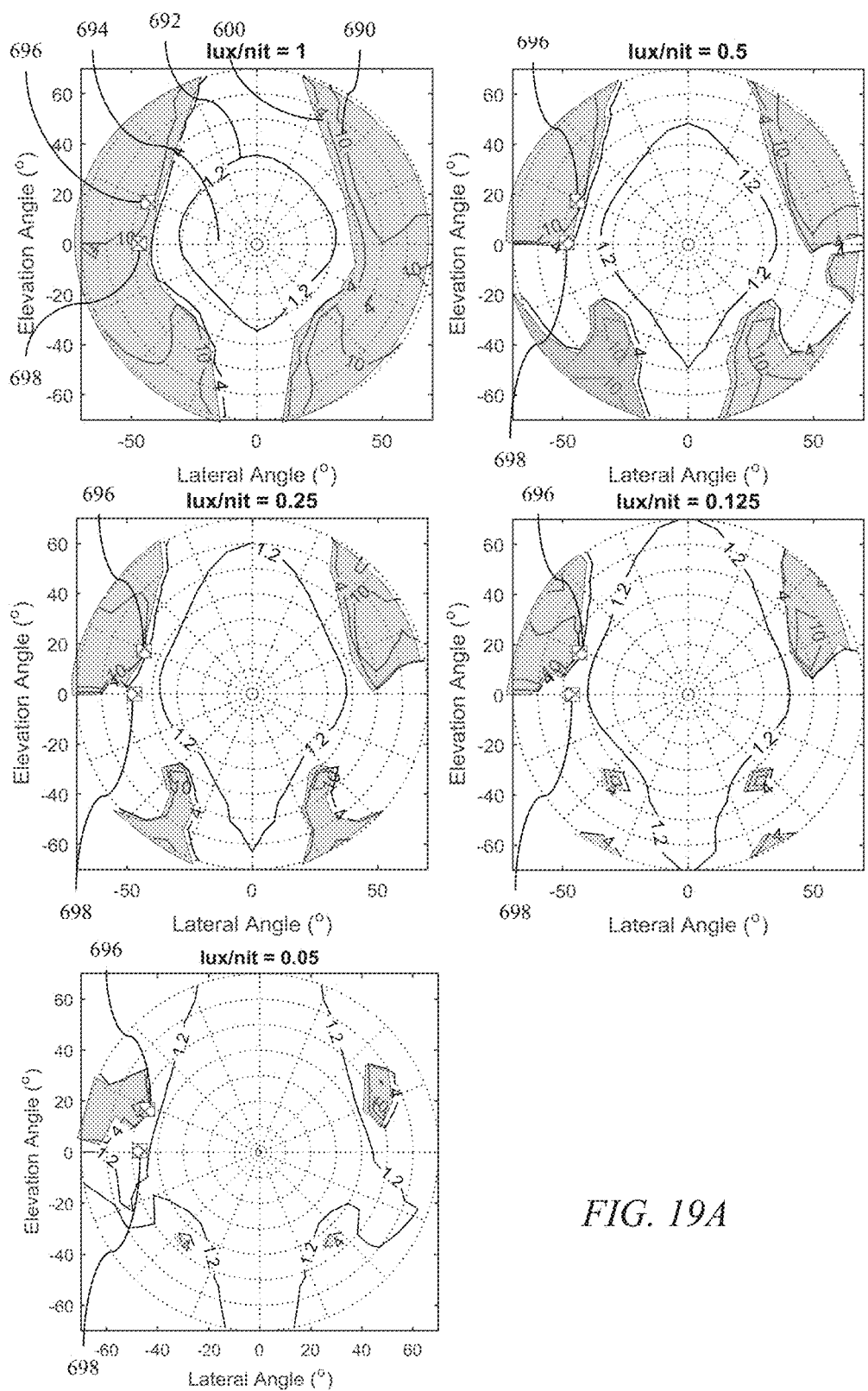
FIG. 19A is a schematic graph illustrating field-of-view visual security level plot for a display comprising the luminance, transmission, reflectivity, and logarithmic contrast ratio polar variations of FIGS. 16B-E for ratios of illuminance to head-on luminance of 1 lux/nit, 0.5 lux/nit, 0.25 lux/nit, 0.125 lux/nit and 0.05 lux/nit.
Figure 19B:
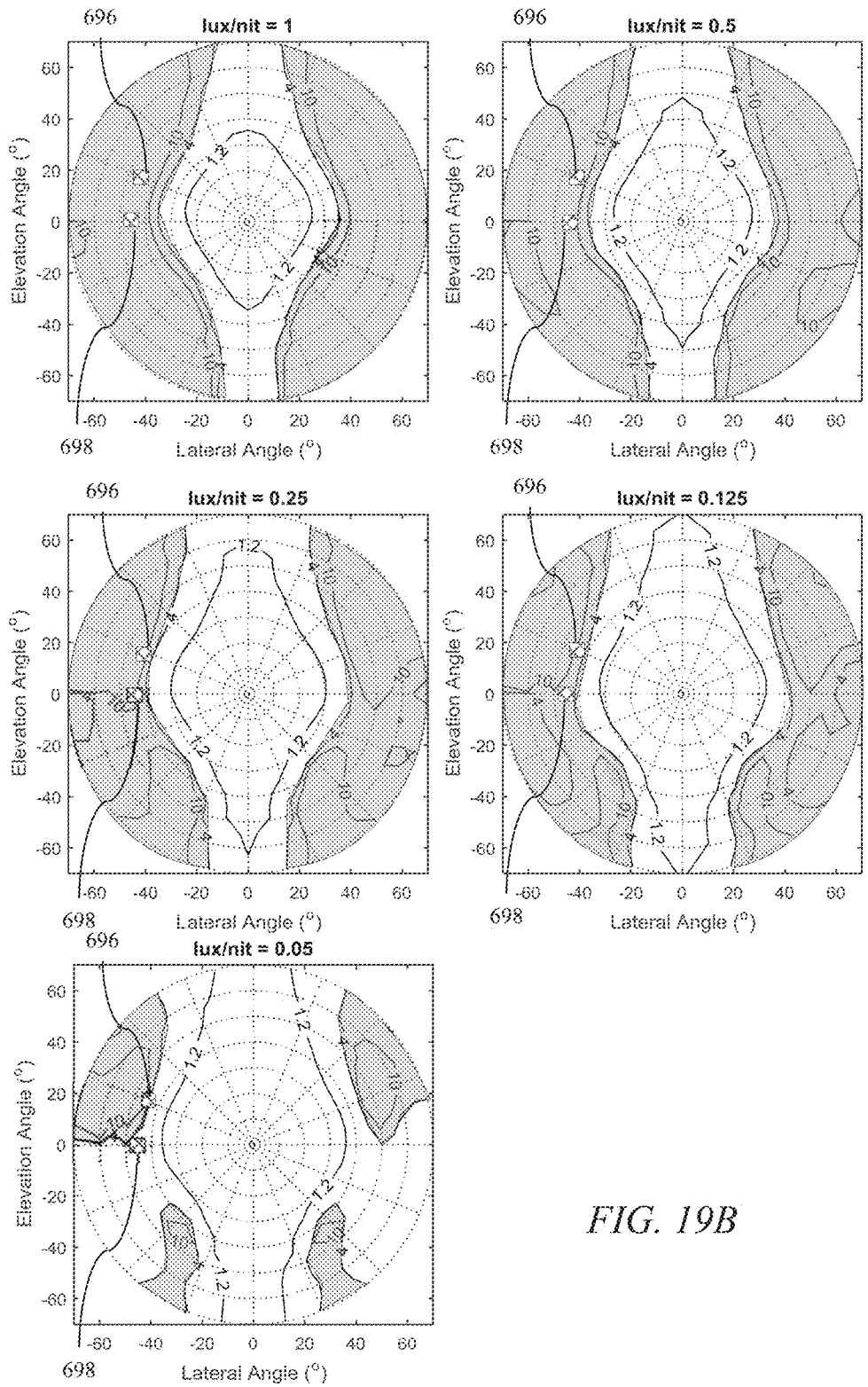
FIG. 19B is a schematic graph illustrating field-of-view visual security level plot for a display comprising the luminance, transmission, reflectivity, and logarithmic contrast ratio polar variations of FIGS. 17B-E for ratios of illuminance to head-on luminance of 1 lux/nit, 0.5 lux/nit, 0.25 lux/nit, 0.125 lux/nit and 0.05 lux/nit.

FIG. 19A is a schematic graph illustrating field-of-view visual security level plot for a display comprising the luminance, transmission, reflectivity, and logarithmic contrast ratio polar variations of FIGS. 16B-E (with no reflective polariser 302) for ratios of illuminance to head-on luminance of 1 lux/nit, 0.5 lux/nit, 0.25 lux/nit, 0.125 lux/nit and 0.05 lux/nit; and FIG. 19B is a schematic graph illustrating field-of-view visual security level plot for a display comprising the luminance, transmission, reflectivity, and logarithmic contrast ratio polar variations of FIGS. 17B-E (with reflective polariser) for ratios of illuminance to head-on luminance of 1 lux/nit, 0.5 lux/nit, 0.25 lux/nit, 0.125 lux/nit and 0.05 lux/nit.

As the display illuminance falls, the region 690 of VSL above threshold 600 significantly reduces in size. Undesirably the angles from which a snooper can perceive the displayed image increase in size, undesirably reducing efficacy of the privacy mode of operation.

For illustrative purposes, polar reference locations 696, 698 are marked. For the arrangement of FIG. 19A, lux/nit ratios of 0.5 and 1.0 the display achieves desirable VSL above threshold 600 at both locations 696, 698 whereas at lower ambient illuminance levels, the reference points are below threshold 600 and the display may be undesirably visible to a snooper.

In comparison to the arrangement of FIG. 19A, the display maintains desirable visual security at lux/nit ratios of 0.125 and above, however, the visual security at 0.05 lux/nit is undesirable.

The appearance of visual security level, VSL for displays incorporating both luminance-privacy arrangement 399 and contrast-privacy arrangement 599 will now be described.

Figure 20A:
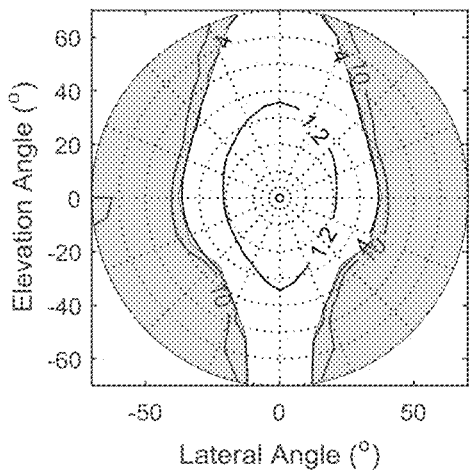
FIG. 20A is a schematic graph illustrating field-of-view visual security level plot for a display comprising the luminance, transmission, reflectivity, and logarithmic contrast ratio polar variations of FIGS. 20B-E for a ratio of illuminance to head-on luminance of 1.0 lux/nit.
Figure 20B:
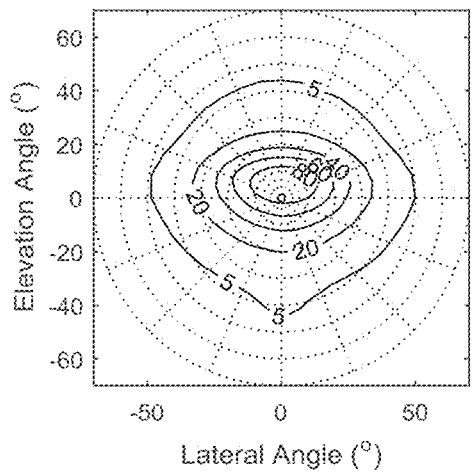
FIG. 20B is a schematic graph illustrating luminance field-of-view plot for a collimated backlight.
Figure 20C:
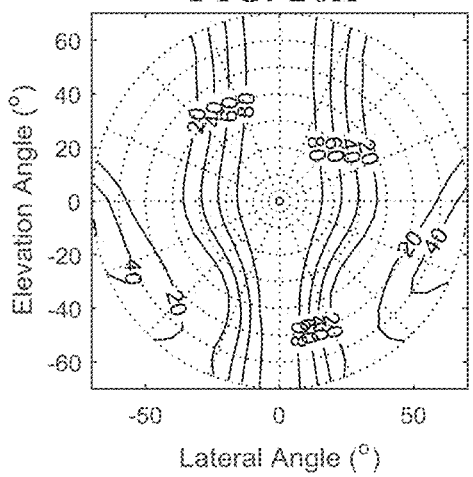
FIG. 20C is a schematic graph illustrating transmission field-of-view plot for a display comprising plural retarders of TABLE 2 arranged between the output polariser and the additional polariser.
Figure 20D:
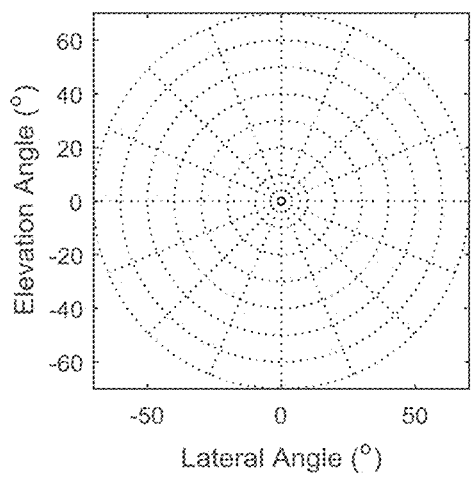
FIG. 20D is a schematic graph illustrating reflectivity field-of-view plot for a display comprising no reflective polariser arranged between the output polariser and the additional polariser.
Figure 20E:
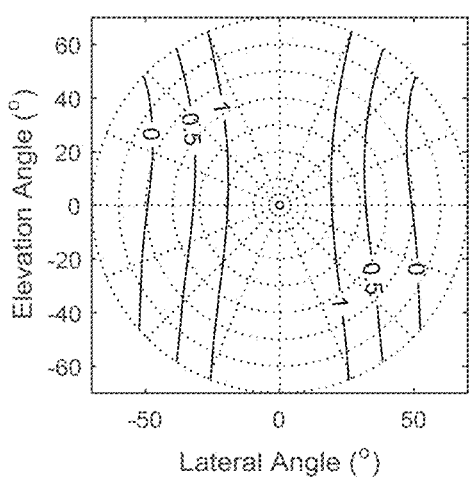
FIG. 20E is a schematic graph illustrating logarithmic contrast ratio field-of-view plot for a display comprising retarders as described in TABLE 3 arranged between the input polariser and the output polariser.

FIG. 20A is a schematic graph illustrating field-of-view visual security level plot for a display comprising the luminance, transmission, reflectivity, and logarithmic contrast ratio polar variations of FIGS. 20B-E for a ratio of illuminance to head-on luminance of 1.0 lux/nit; FIG. 20B is a schematic graph illustrating luminance field-of-view plot for a collimated backlight 20; FIG. 20C is a schematic graph illustrating transmission field-of-view plot for a display comprising the plural retarders 300 of TABLE 3 arranged between the output polariser 218 and the additional polariser 318; FIG. 20D is a schematic graph illustrating reflectivity field-of-view plot for a display comprising no reflective polariser 302 arranged between the output polariser 218 and the additional polariser 318; and FIG. 20E is a schematic graph illustrating logarithmic contrast ratio field-of-view plot for a display 100 comprising retarders 500 as described in TABLE 4 arranged between the input polariser 210 and the output polariser 218.

Figure 21A:
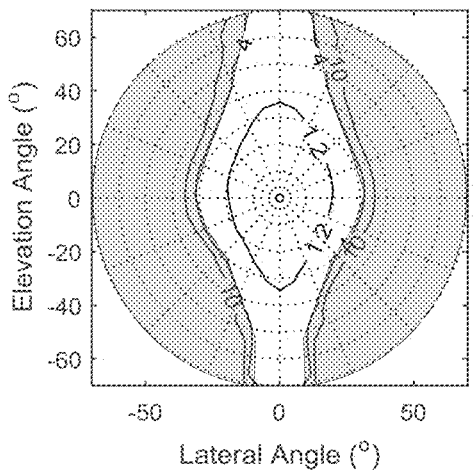
FIG. 21A is a schematic graph illustrating field-of-view visual security level plot for a display comprising the luminance, transmission, reflectivity, logarithmic contrast ratio and logarithmic contrast ratio polar variations of FIGS. 21B-E for a ratio of illuminance to head-on luminance of 1.0 lux/nit.
Figure 21B:
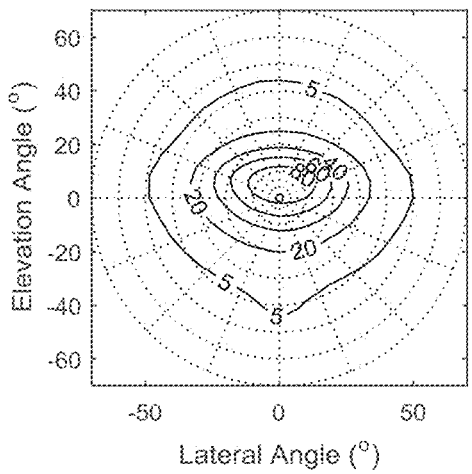
FIG. 21B is a schematic graph illustrating luminance field-of-view plot for a collimated backlight.
Figure 21C:
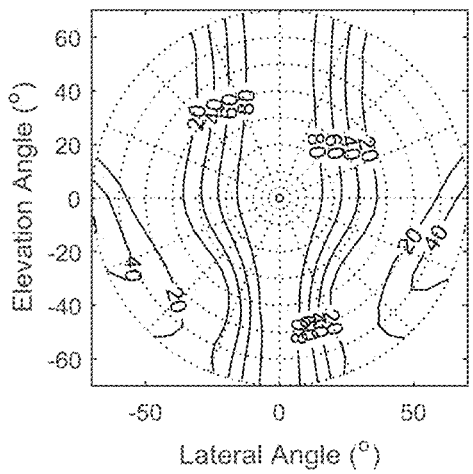
FIG. 21C is a schematic graph illustrating transmission field-of-view plot for a display comprising plural retarders of TABLE 2 arranged between the output polariser and the additional polariser.
Figure 21D:
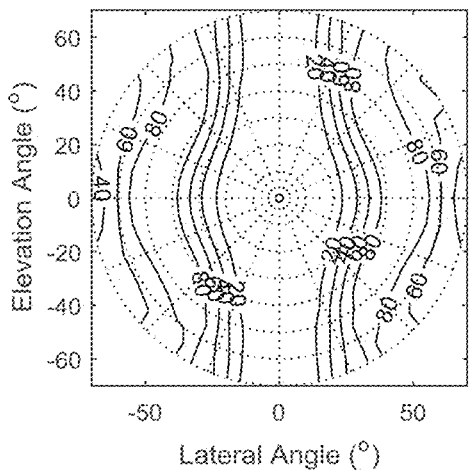
FIG. 21D is a schematic graph illustrating reflectivity field-of-view plot for a display comprising a reflective polariser arranged between the output polariser and the plural retarders.
Figure 21E:
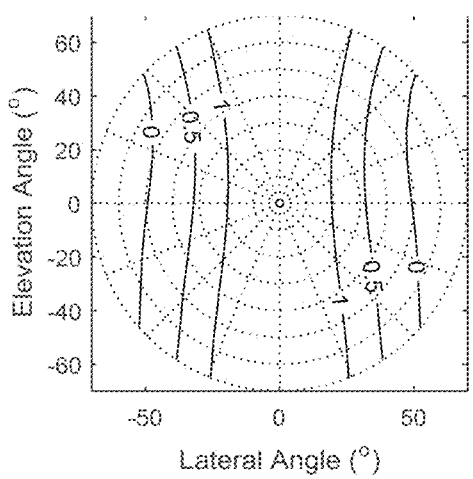
FIG. 21E is a schematic graph illustrating logarithmic contrast ratio field-of-view plot for a display comprising plural retarders as described in TABLE 3 arranged between the input polariser and the output polariser.

FIG. 21A is a schematic graph illustrating field-of-view visual security level plot for a display comprising the luminance, transmission, reflectivity, logarithmic contrast ratio and logarithmic contrast ratio polar variations of FIGS. 21B-E for a ratio of illuminance to head-on luminance of 1.0 lux/nit; FIG. 21B is a schematic graph illustrating luminance field-of-view plot for a collimated backlight 20; FIG. 21C is a schematic graph illustrating transmission field-of-view plot for a display 100 comprising plural retarders 300 of TABLE 3 arranged between the output polariser 218 and the additional polariser 318; FIG. 21D is a schematic graph illustrating reflectivity field-of-view plot for a display 100 comprising a reflective polariser 302 arranged between the output polariser 218 and the plural retarders 300; and FIG. 21E is a schematic graph illustrating logarithmic contrast ratio field-of-view plot for a display comprising plural retarders 500 as described in TABLE 4 arranged between the input polariser 210 and the output polariser 218.

It would be desirable to provide improved visual security level at low lux/nit ratios while maintaining high image quality for the primary user. The effect of ambient illuminance light 604 on the appearance of visual security level, VSL for displays incorporating both luminance-privacy arrangement 399 and contrast-privacy arrangement 599 with the control apparatus of the present disclosure will now be described.

Figure 22A:
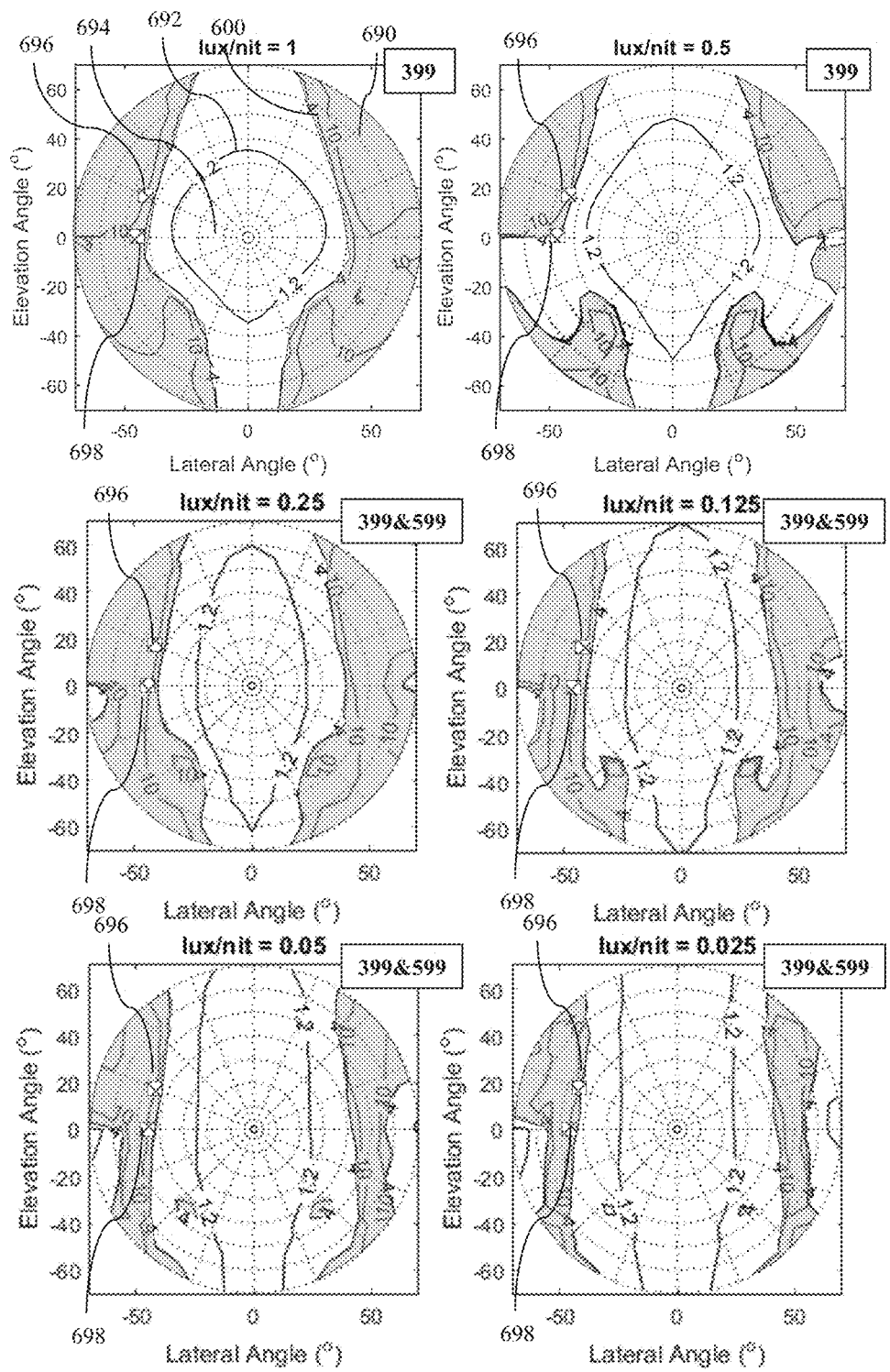
FIG. 22A is a sequence of schematic graphs illustrating field-of-view visual security level plot for a display comprising the luminance, transmission, reflectivity, logarithmic contrast ratio and black pixel state polar variations of FIGS. 20B-E for a ratio of illuminance to head-on luminance of 1.0 lux/nit, 0.5 lux/nit, 0.25 lux/nit, 0.125 lux/nit, 0.05 lux/nit and 0.25 lux/nit.
Figure 22B:
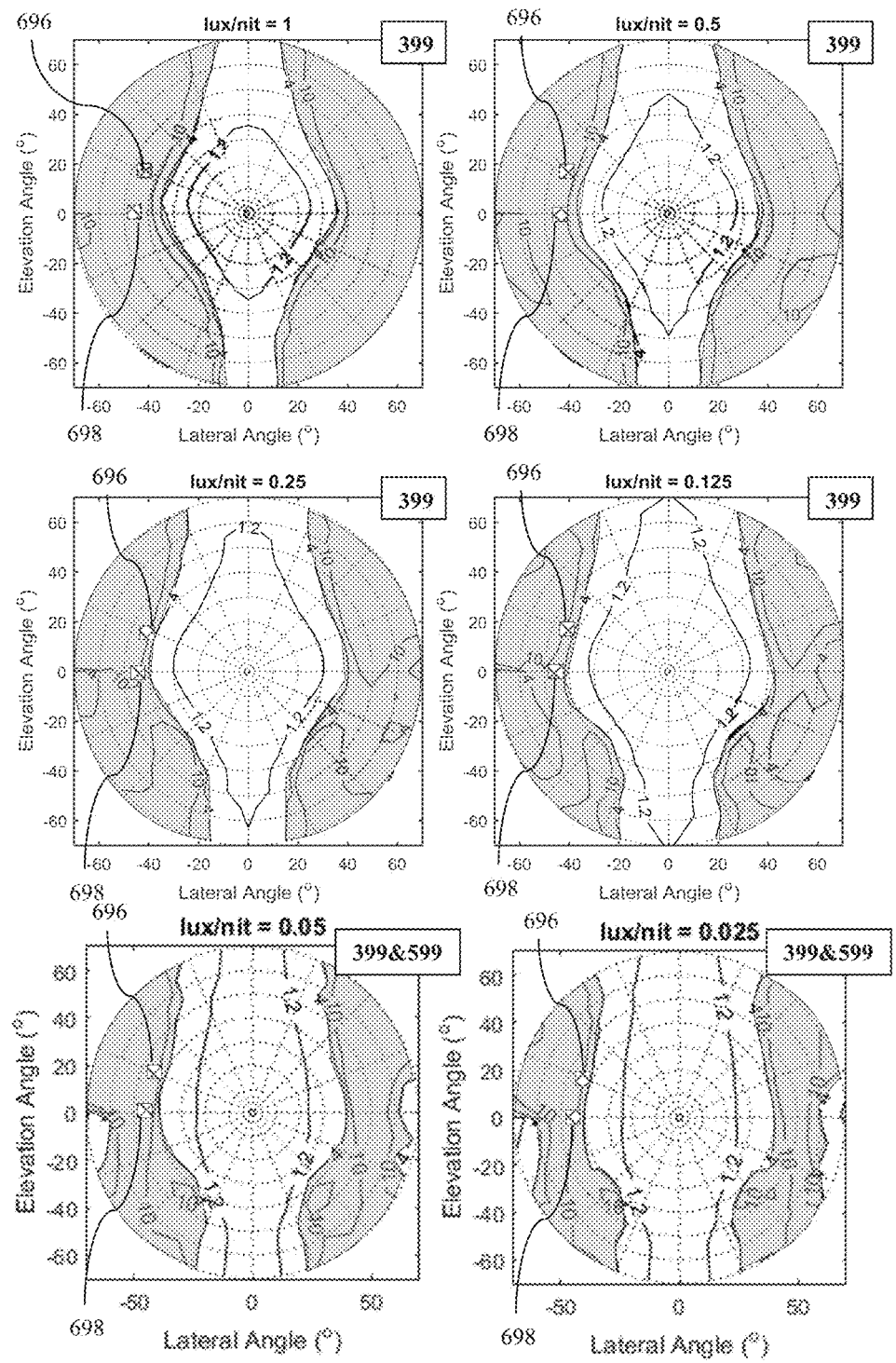
FIG. 22B is a sequence of schematic graphs illustrating field-of-view visual security level plot for a display comprising the luminance, transmission, reflectivity, logarithmic contrast ratio and black pixel state polar variations of FIGS. 21B-E for a ratio of illuminance to head-on luminance of 1.0 lux/nit, 0.5 lux/nit, 0.25 lux/nit, 0.125 lux/nit, 0.05 lux/nit and 0.25 lux/nit.

FIG. 22A are schematic graphs illustrating field-of-view visual security level plot for a display comprising the luminance, transmission, reflectivity, logarithmic contrast ratio and black pixel state polar variations of FIGS. 20B-E for a ratio of illuminance to head-on luminance of 1.0 lux/nit, 0.5 lux/nit, 0.25 lux/nit, 0.125 lux/nit, 0.05 lux/nit and 0.25 lux/nit; and FIG. 22B are schematic graphs illustrating field-of-view visual security level plot for a display comprising the luminance, transmission, reflectivity, logarithmic contrast ratio and black pixel state polar variations of FIGS. 21B-E for a ratio of illuminance to head-on luminance of 1.0 lux/nit, 0.5 lux/nit, 0.25 lux/nit, 0.125 lux/nit, 0.05 lux/nit and 0.25 lux/nit.

FIGS. 22A and 22B further indicate whether the luminance-privacy arrangement 399 is operable or whether both the luminance-privacy and contrast-privacy arrangements 399, 599 are operable at each of the respective lux/nit ratios. Thus for the arrangement with no reflective polariser 302, then the contrast-privacy arrangement is introduced at level of ambient light 604 for a lux/nit ratio of between 0.5 and 0.25. By comparison when the reflective polariser 302 is introduced as shown in FIG. 22B the contrast-privacy arrangement is operable at lux/nit ratio between 0.125 and 0.05. Advantageously the display maintains a desirable visual security level for low ambient light 604 and maintains high image quality without contrast degradations for the primary user at higher ambient light 604 levels.

The control of the luminance-privacy arrangement 399 and contrast-privacy arrangement 599 will now be described further.

Figure 22C:
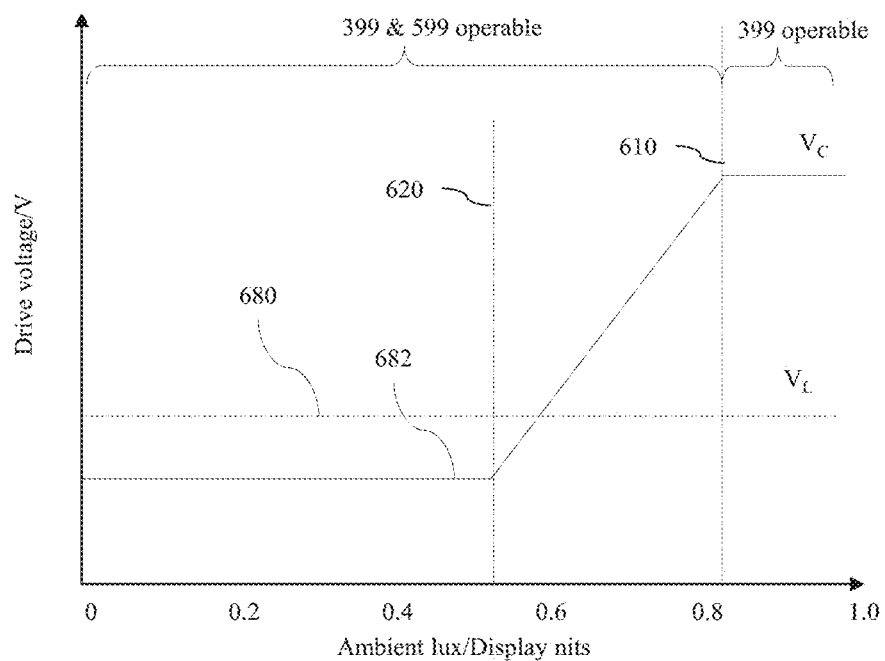
FIG. 22C is a schematic graph illustrating the variation of control voltages for the display of FIG. 1 with no reflective polariser 302.
Figure 22D:
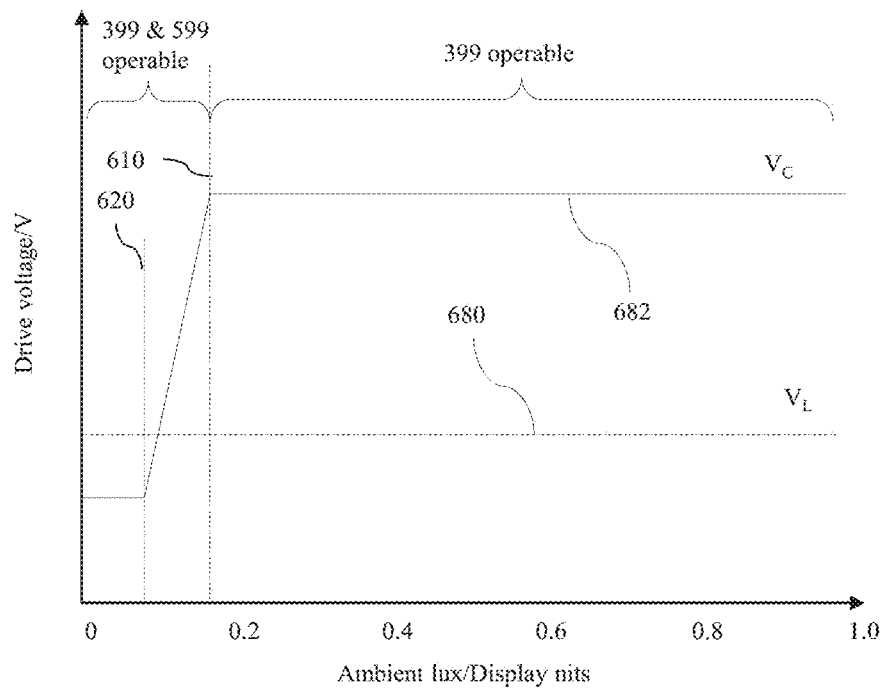
FIG. 22D is a schematic graph illustrating the variation of control voltages for the display of FIG. 1 with reflective polariser 302.

FIG. 22C is a schematic graph illustrating the variation of control voltages for the display of FIG. 1 with no reflective polariser 302; and FIG. 22D is a schematic graph illustrating the variation of control voltages for the display of FIG. 1 with reflective polariser 302.

As illustrated by profile 680, the control voltage $V_L$ that is used to drive the switchable liquid crystal layer 314 and as described in TABLE 3 may be fixed, for example at 2.3V so that for the lux/nit range of 0 to 1.0 then the luminance-privacy arrangement 399 is operable.

The voltage $V_C$ applied to the contrast-privacy arrangement 599 is adjusted when the ambient light sensor 450 detects second levels of ambient light 604 below the first level 610.

As illustrated by profile 682, the control voltage $V_C$ that is used to drive the switchable liquid crystal layer 514 and as described in TABLE 4 is adjusted depending on the measured ambient light 604. At higher ambient light 604 levels (high lux/nit) above first level 610, the layer 514 may be driven at high voltage for example at >5V so that only small variations of contrast with viewing angle are provided, and the display has high image quality to the primary user while maintaining desirable visual security levels. Below threshold 620, the layer 514 is driven at 1.6V to provide optimum contrast-privacy performance.

At intermediate levels between levels 620 and 610 of ambient light 604, the voltage $V_C$ is adjusted. Thus the out-of-plane tilt of the molecules 513 in the layer 514 are adjusted to achieve increasing contrast effect but so the contrast variations of the display device 100 contrast-privacy arrangement 599 is not fully switched on. The profile 682 in the intermediate levels may be linear as shown or may be non-linear with adjustment to maintain desirable VSL at the reference measurement points for the measured ambient light 604.

Figure 22E:
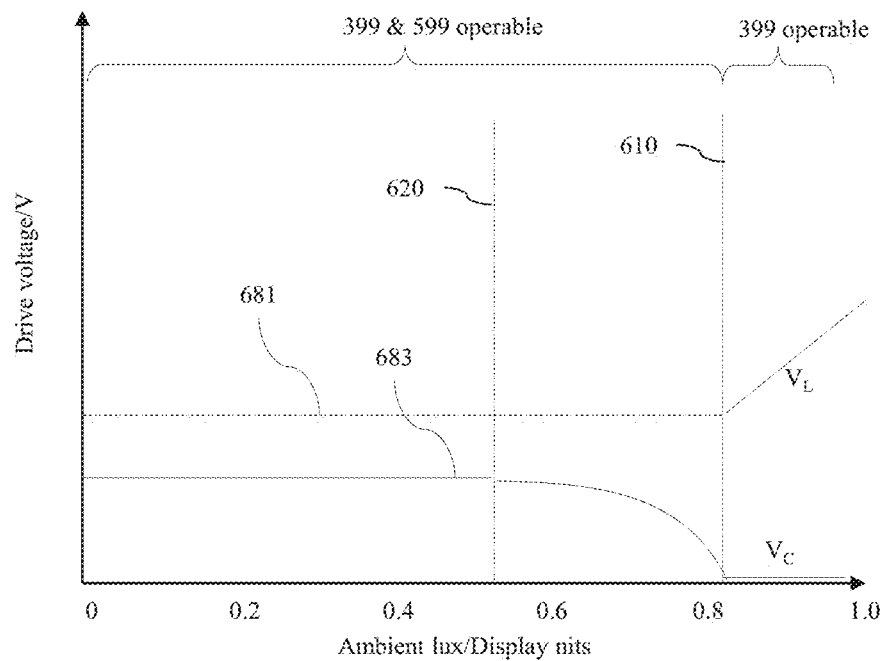
FIG. 22E is a schematic graph illustrating an alternative variation of control voltages for the display of FIG. 1.

FIG. 22E is a schematic graph illustrating an alternative variation of control voltages $V_C$, $V_L$ for the display of FIG. 1. In comparison to FIG. 22C, FIG. 22E illustrates that the luminance-privacy control voltage profile 681 may be adjusted at ambient light 604 levels above the first level 610. Advantageously, the VSL may be maintained at a desirable level, and the luminance roll-off of the display may be reduced, improving image luminance uniformity to the head-on user. As the ambient light 604 level reduces the voltage may be adjusted to achieve increased visual security level to compensate for the loss of light from reflection from the display.

FIG. 22E also illustrates that the contrast-privacy arrangement 599 control voltage profile 683 may be adjusted in a non-linear manner in order to achieve desirable visual security level. Further, the voltage for no contrast modulation may be less than the voltage for field-of-view contrast modulations, for example zero volts, that is dependent on the optical structure of the arrangement 599. For example a biased in-plane switching LCD will typically have zero volts for public operation or for luminance levels above the first level 610.

Figure 22F:
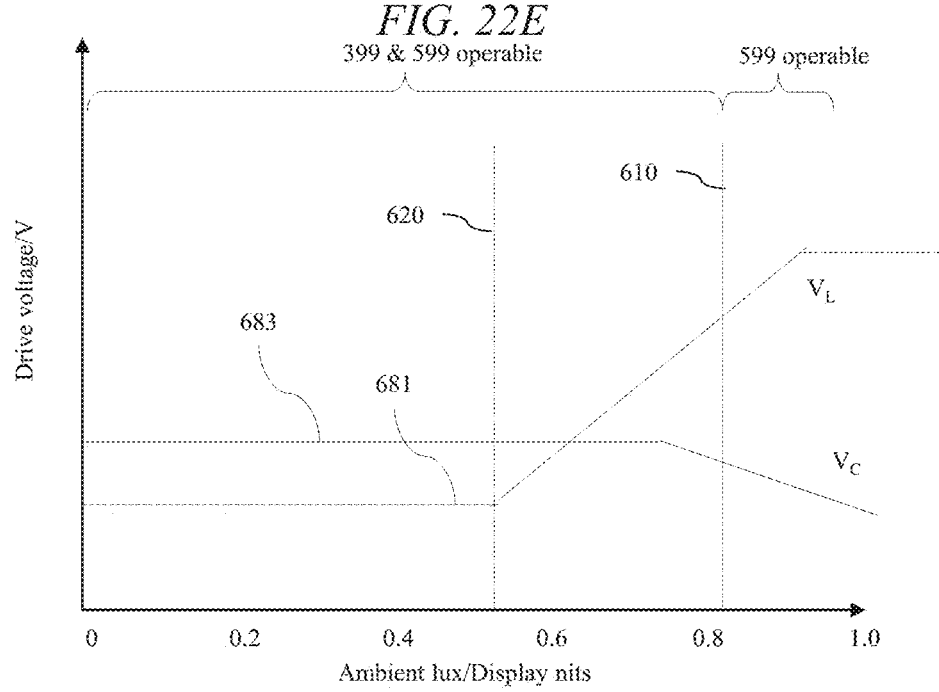
FIG. 22F is a schematic graph illustrating a further alternative variation of control voltages for the display of FIG. 1.

FIG. 22F is a schematic graph illustrating an alternative variation of control voltages $V_C$, $V_L$ for the display of FIG. 1. In comparison to the other embodiments described herein, at ambient light 604 levels above the first level 610, the luminance-privacy arrangement 399 voltage $V_L$ is set for a mode of operation between narrow angle and public operation. Further the contrast-privacy arrangement 599 voltage $V_C$ is set for an intermediate contrast range. The combined VSL of the two settings provides a desirable visual security level. Advantageously the display achieves reduces luminance uniformity variations and reduces contrast uniformity variations while achieving desirable visual security level for varying ambient light 604 levels.

A description of the operation of plural retarders 500 and retarders 300 will now be given in more detail, the principles of which may be applied in general to all of the devices described above. In various devices described above, plural retarders 500 are arranged between the input polariser 210 and the output polariser 218 in various different configurations. In each case, the plural retarders are configured so that they do not affect the transmission of light for a white state pixel along an axis along a normal to the plane of the retarder(s) but it does reduce the transmission of light along an axis inclined to a normal to the plane of the retarder(s), at least in one of the switchable states of the plural retarders 500. Further the plural retarders 500 are configured so that they do not affect the transmission of light for a black state pixel along an axis along a normal to the plane of the retarder(s) but it does increase the transmission of light along an axis inclined to a normal to the plane of the retarder(s), at least in one of the switchable states of the plural retarders 500.

The operation of the present off-axis contrast reducing embodiments may be considered in a similar manner to the operation of retarders between parallel polarisers as will be described further below. In the present embodiments a contrast modification for off-axis viewing locations is achieved by modification of the polarisation states representing black and white pixel states, due to the angular variation in optical phase in the plural retarders and liquid crystal spatial light modulator 48. Intermediate grey level states of image pixels may be considered as combinations of black and white pixels.

In various devices described above, plural retarders 300 are arranged between a display polariser 210 or 218 and an additional polariser 318 in various different configurations. In each case, the retarders 300 are configured so that they do not affect the luminance of light along an axis along a normal to the plane of the retarder(s) but it does reduce the luminance of light along an axis inclined to a normal to the plane of the retarder(s), at least in one of the switchable states of the switchable retarder 301.

There will now be given a description of this effect in more detail, the principles of which may be applied in general to all of the devices described above.

Figure 23A:
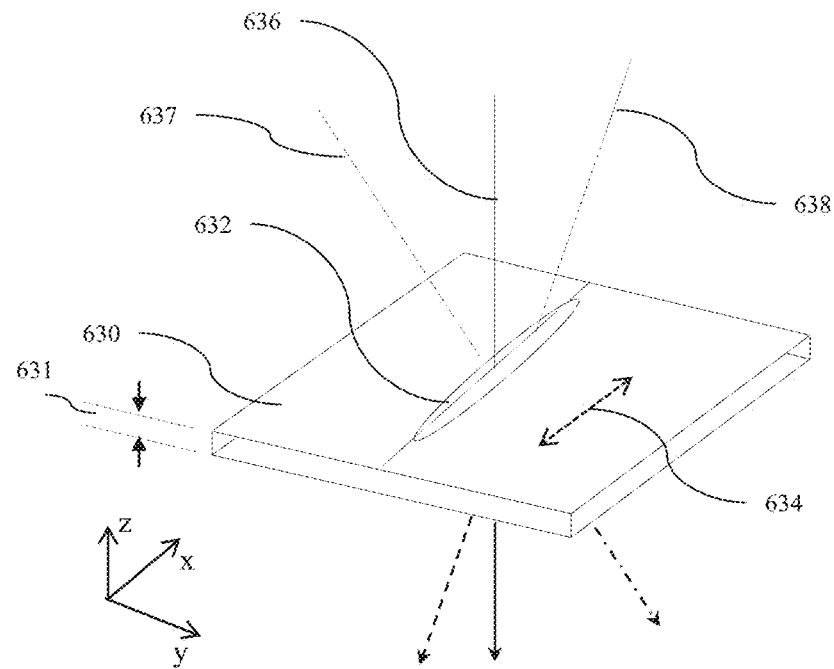
FIG. 23A is a schematic diagram illustrating in perspective view illumination of a retarder layer by off-axis light.

FIG. 23A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 23B:
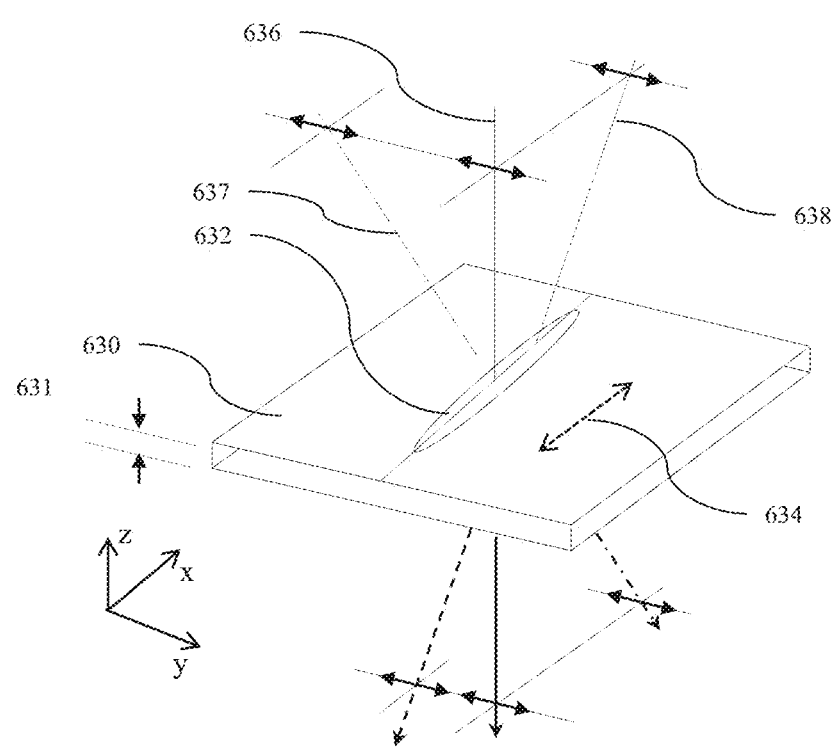
FIG. 23B is a schematic diagram illustrating in perspective view illumination of a retarder layer by off-axis light of a first linear polarization state at 0 degrees.
Figure 23C:
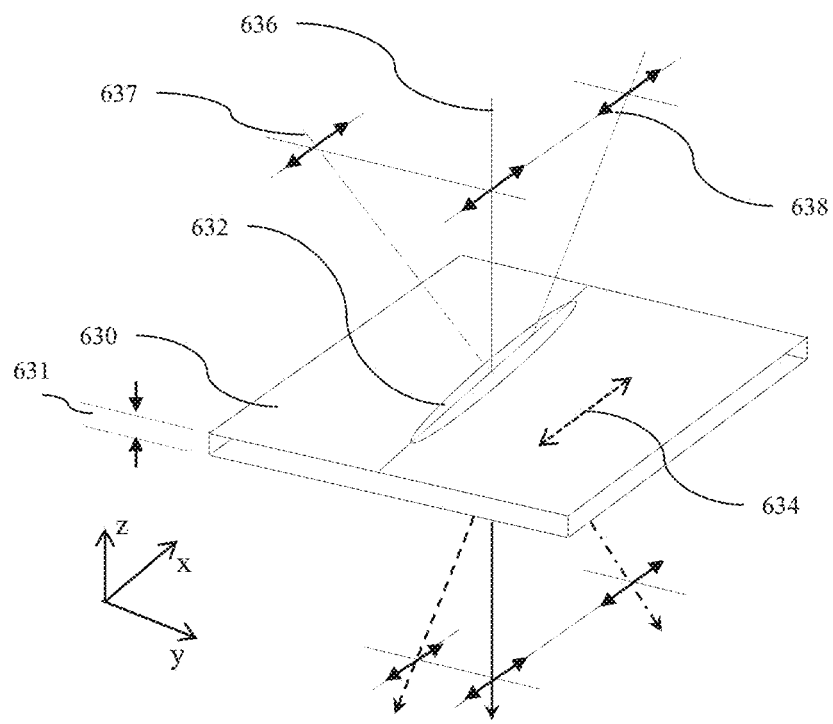
FIG. 23C is a schematic diagram illustrating in perspective view illumination of a retarder layer by off-axis light of a first linear polarization state at 90 degrees.

FIG. 23B is a schematic diagram illustrating in perspective view illumination of a retarder layer by off-axis light of a third linear polarization state at 90 degrees to the x-axis and FIG. 23C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by the retarders in the devices described above.

Figure 23D:
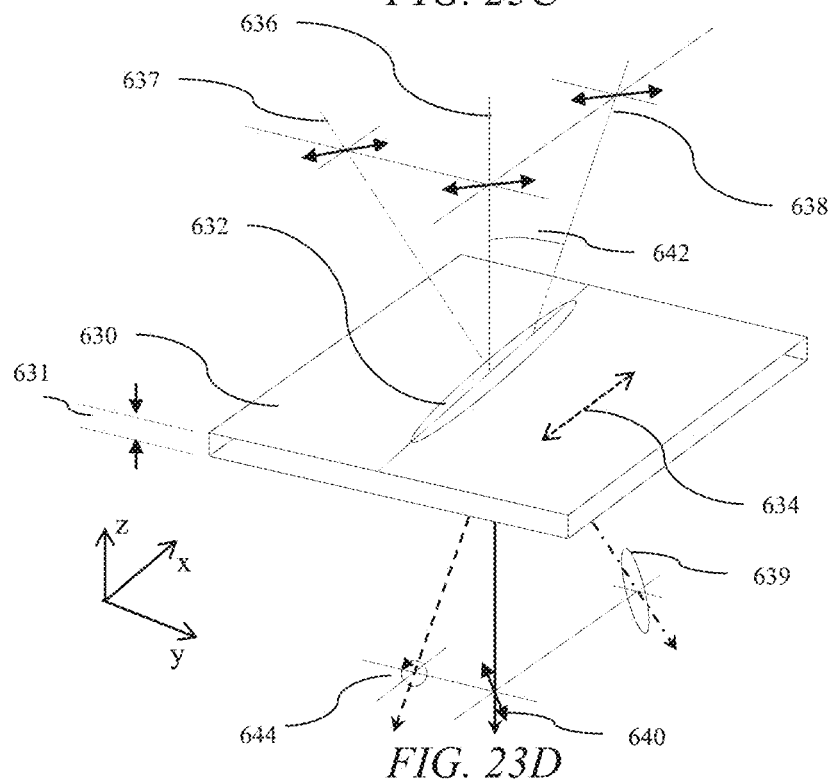
FIG. 23D is a schematic diagram illustrating in perspective view illumination of a retarder layer by off-axis light of a first linear polarization state at 45 degrees.

FIG. 23D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 23D relates to the retarder 630 that is passive, a similar effect is achieved by the retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate between the parallel polarisers 500, 210 will now be described.

Figure 24A:
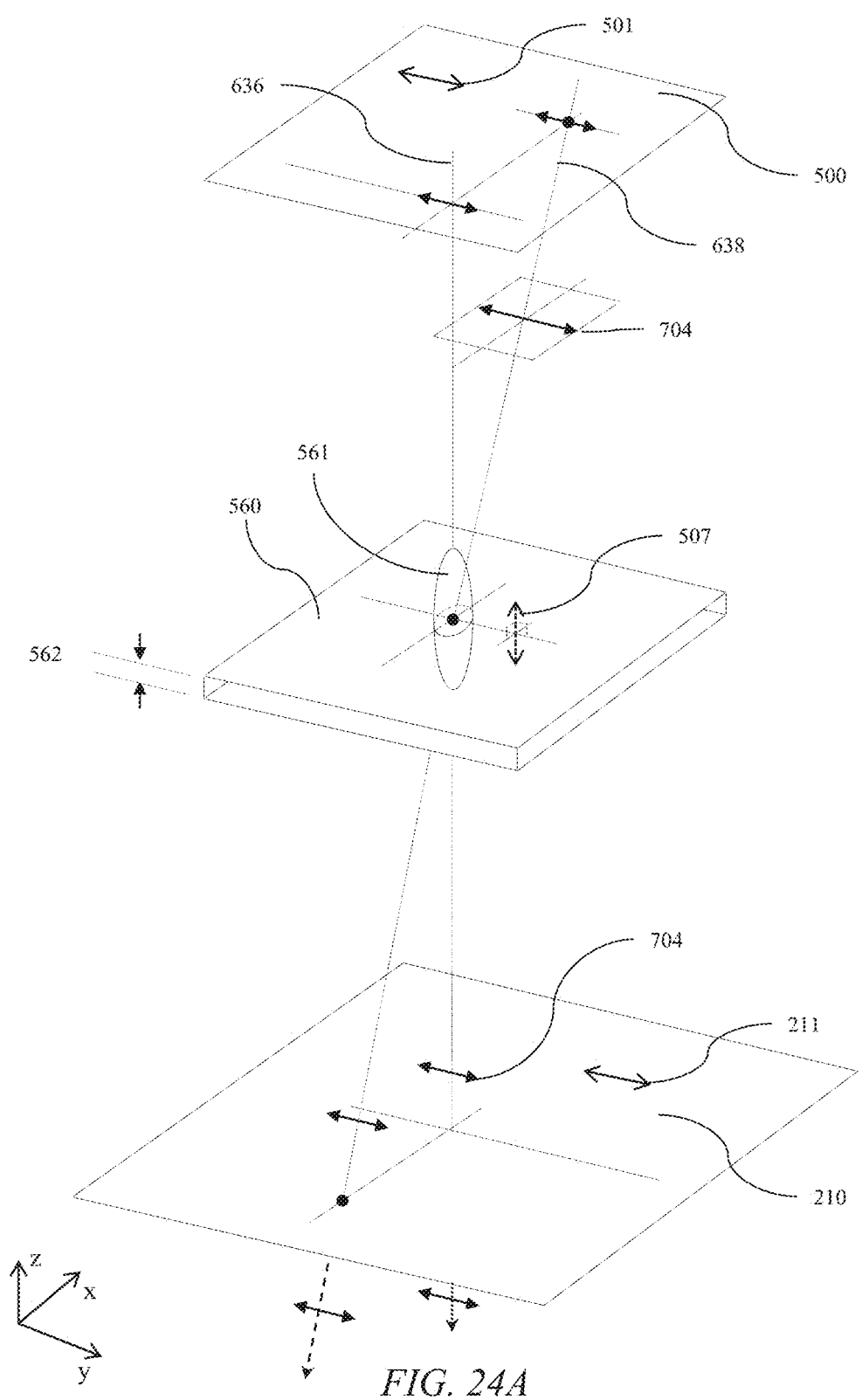
FIG. 24A is a schematic diagram illustrating in perspective view illumination of a C-plate retarder by off-axis polarised light with a positive elevation.

FIG. 24A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder 560 having an optical axis 561 perpendicular to the plane of the retarder 560, that is the x-y plane. The retarder 560 having an optical axis perpendicular to the plane of the retarder comprises a C-plate.

Figure 24B:
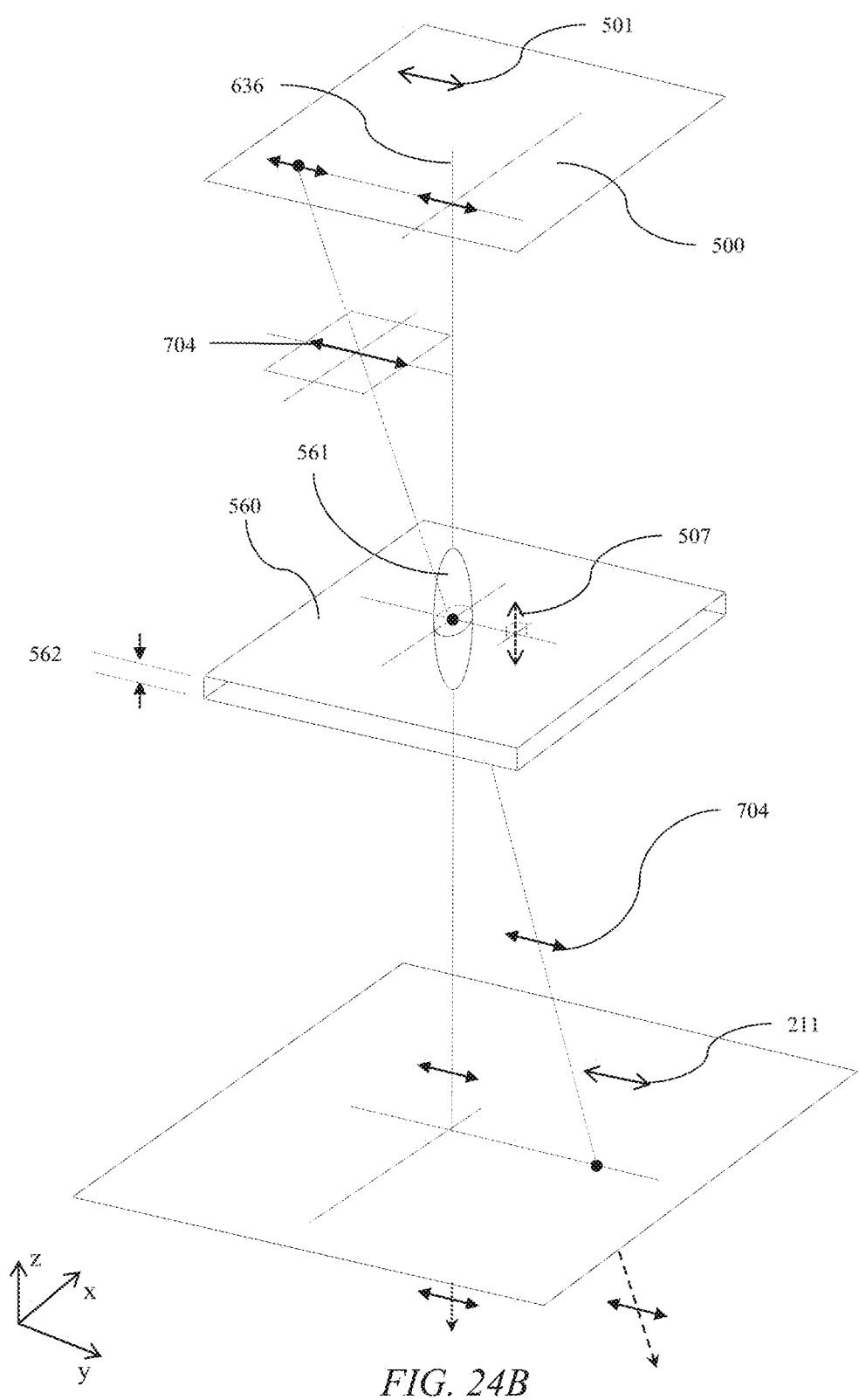
FIG. 24B is a schematic diagram illustrating in perspective view illumination of a C-plate retarder by off-axis polarised light with a negative lateral angle.

FIG. 24B is a schematic diagram illustrating in perspective view illumination of a C-plate layer by off-axis polarised light with a negative lateral angle. As with the arrangement of FIG. 24A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560.

Figure 24C:
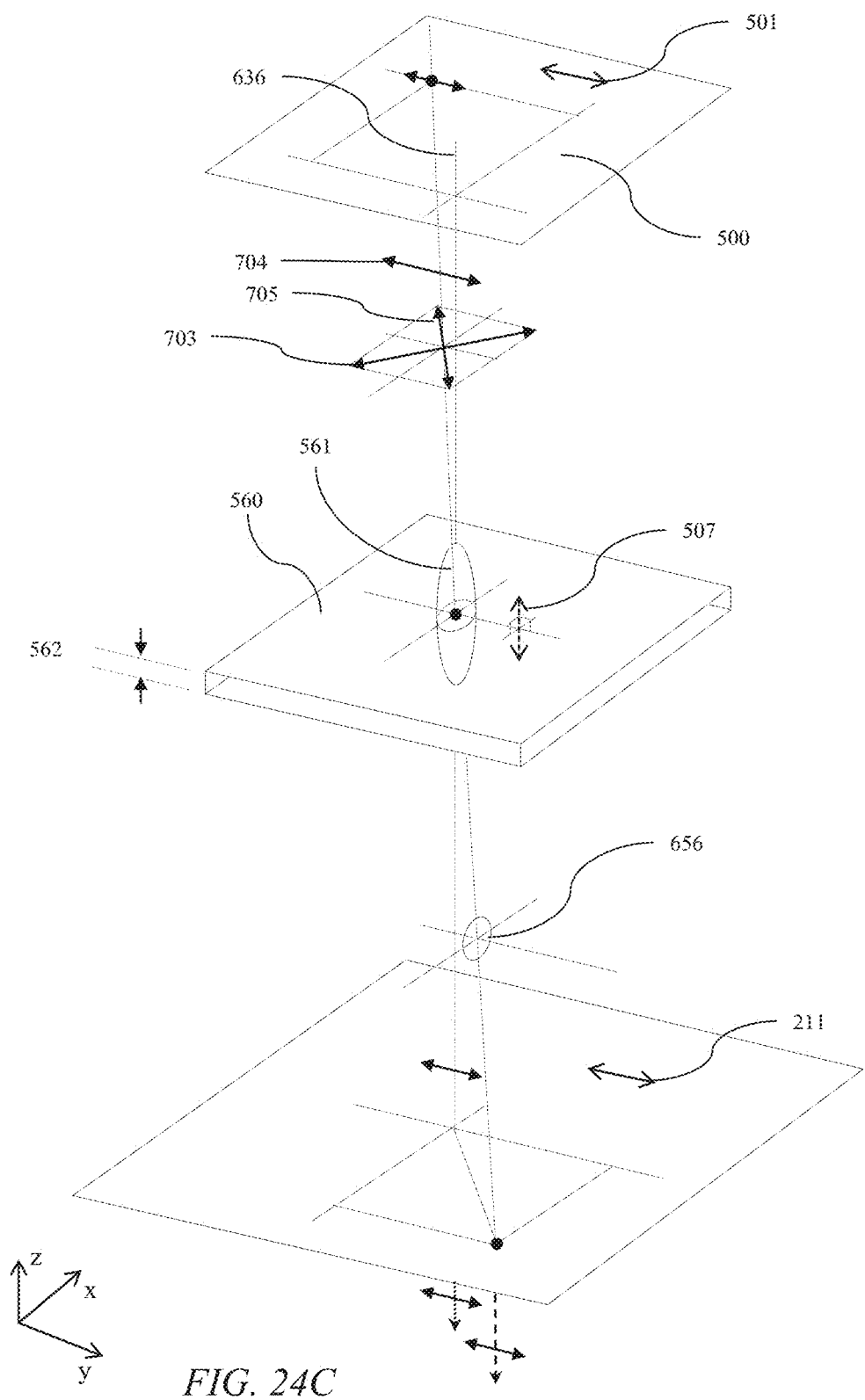
FIG. 24C is a schematic diagram illustrating in perspective view illumination of a C-plate retarder by off-axis polarised light with a positive elevation and negative lateral angle.

FIG. 24C is a schematic diagram illustrating in perspective view illumination of a C-plate layer by off-axis polarised light with a positive elevation and negative lateral angle. In comparison to the arrangement of FIGS. 24A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 24A-B.

Figure 24D:
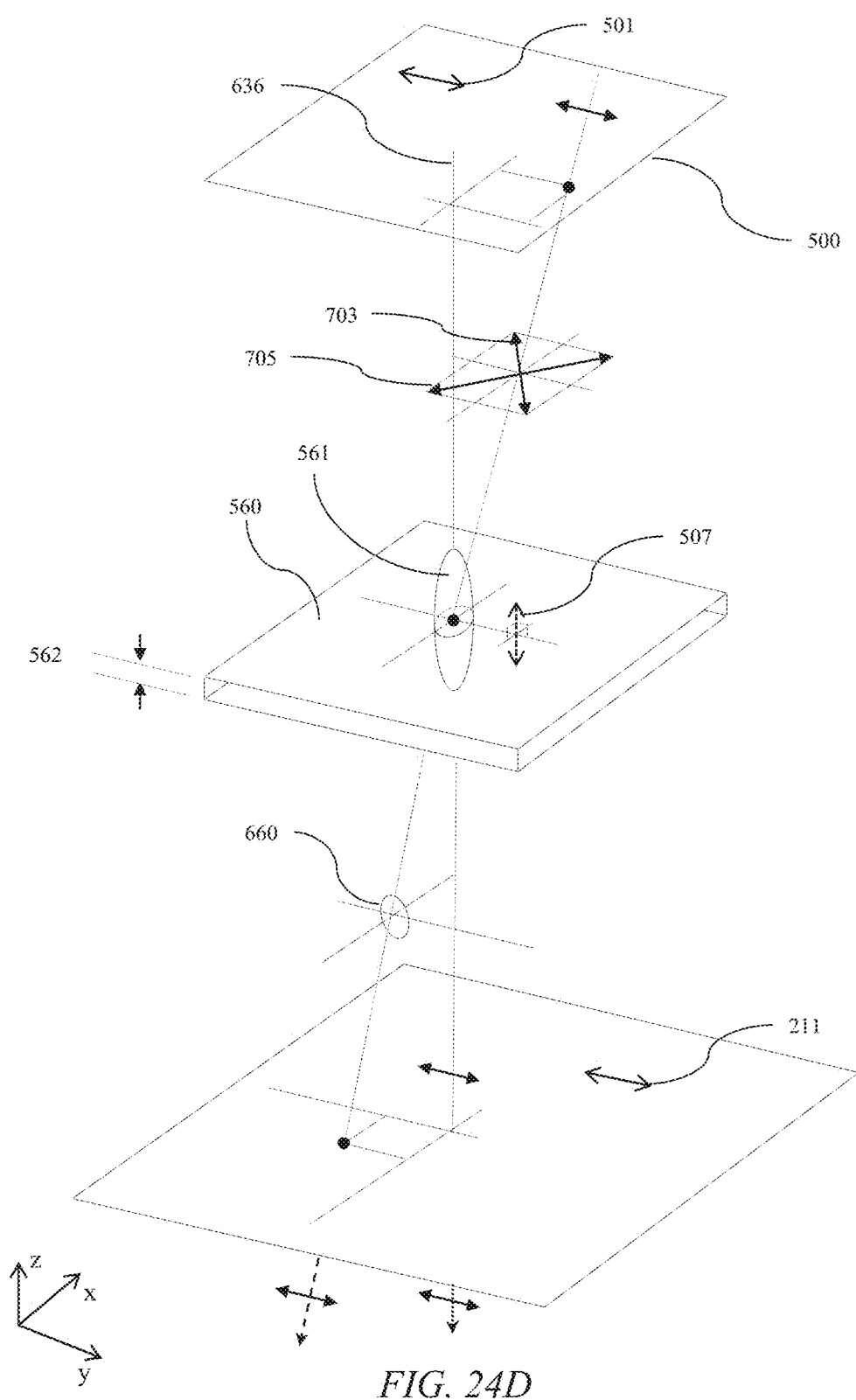
FIG. 24D is a schematic diagram illustrating in perspective view illumination of a C-plate retarder by off-axis polarised light with a positive elevation and positive lateral angle.

FIG. 24D is a schematic diagram illustrating in perspective view illumination of a C-plate layer by off-axis polarised light with a positive elevation and positive lateral angle. In a similar manner to FIG. 24C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560.

Although FIG. 24D relates to the retarder 560 that is passive, a similar effect is achieved by the retarders described above, in a switchable state of the switchable liquid crystal retarder corresponding to the privacy mode.

Figure 24E:
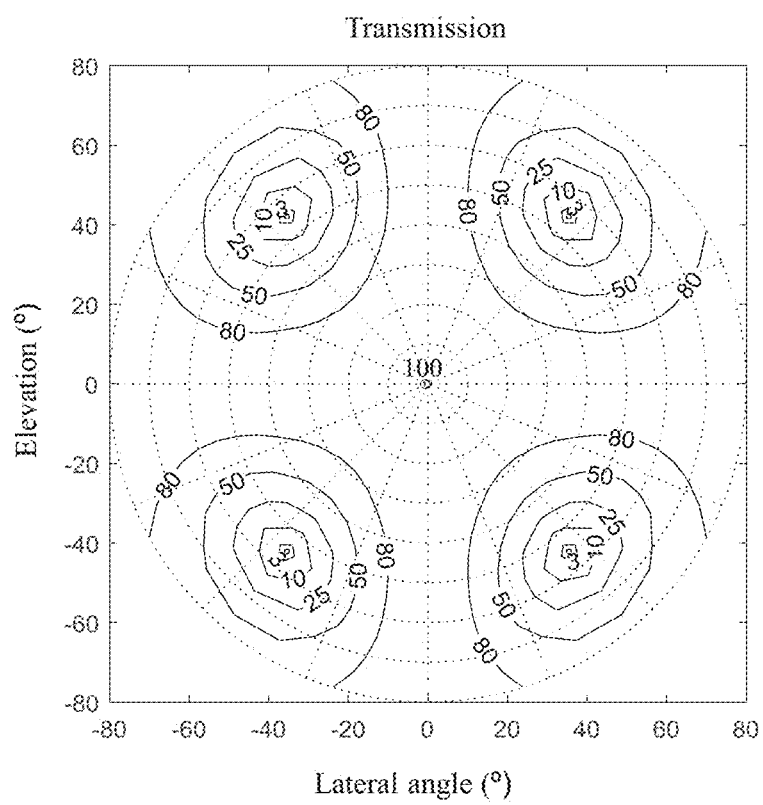
FIG. 24E is a schematic graph illustrating the variation of output transmission with polar direction for transmitted light rays in FIGS. 24A-D.

FIG. 24E is a schematic graph illustrating the variation of output transmission with polar direction for transmitted light rays in FIGS. 24A-D. Thus, the C-plate may provide luminance reduction in polar quadrants. In combination with switchable liquid crystal retarder layer 314 described elsewhere herein, (i) removal of luminance reduction of the C-plate may be provided in a first public mode state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 will now be described for various off-axis illumination arrangements.

Figure 25A:
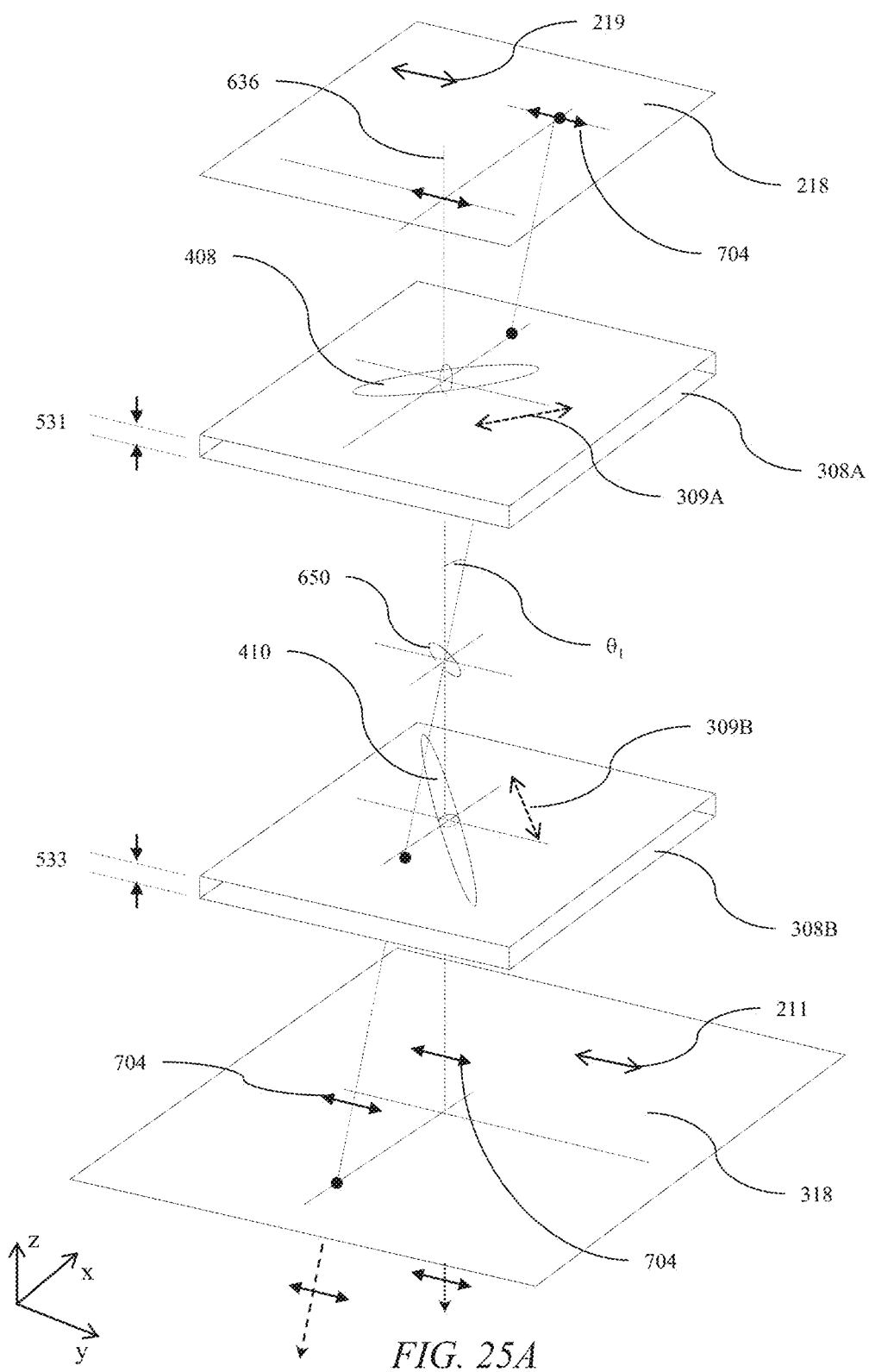
FIG. 25A is a schematic diagram illustrating in perspective view illumination of crossed A-plate retarder layers by off-axis polarised light with a positive elevation.

FIG. 25A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 25A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 25B:
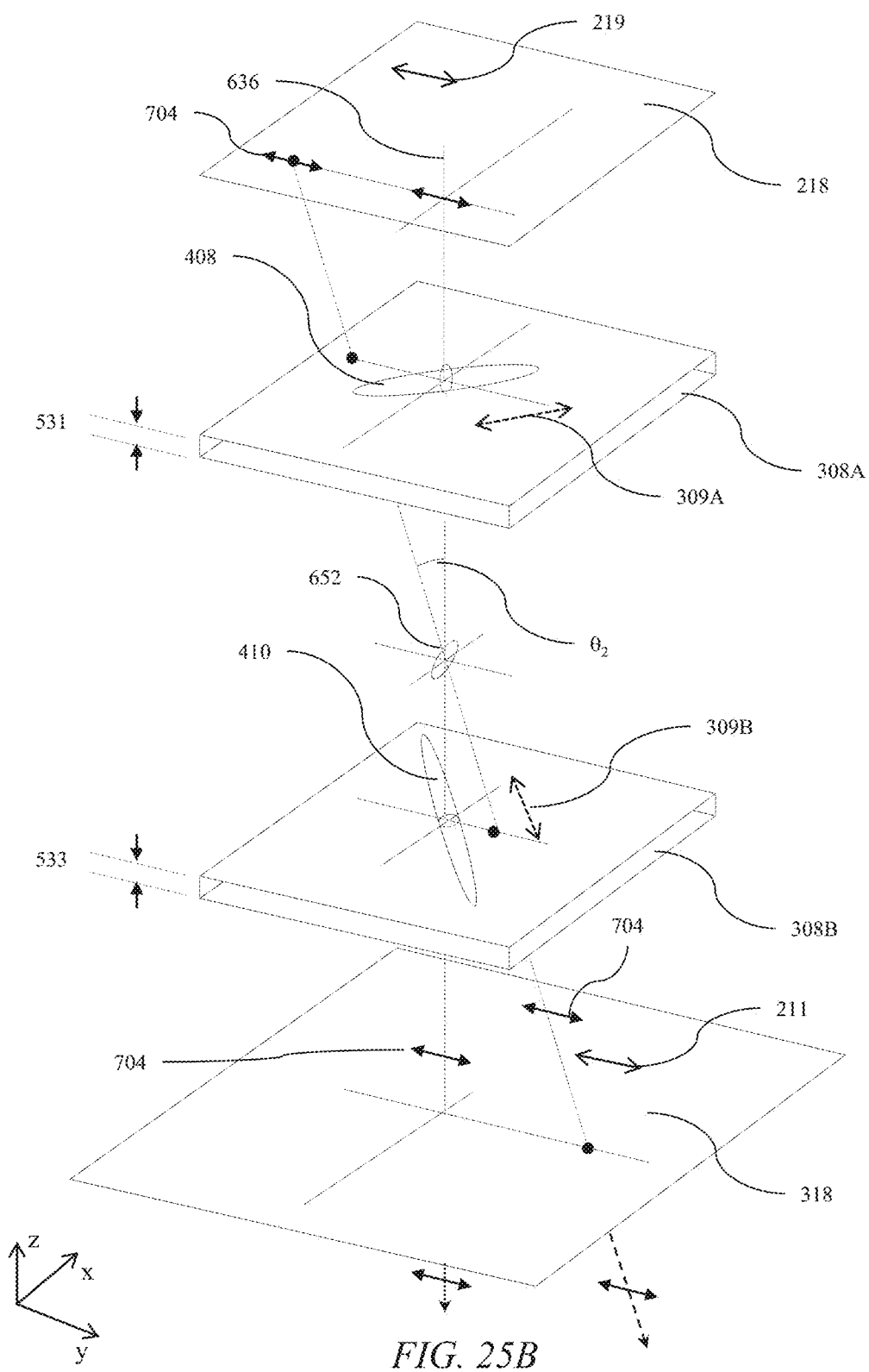
FIG. 25B is a schematic diagram illustrating in perspective view illumination of crossed A-plate retarder layers by off-axis polarised light with a negative lateral angle.

FIG. 25B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 25C:
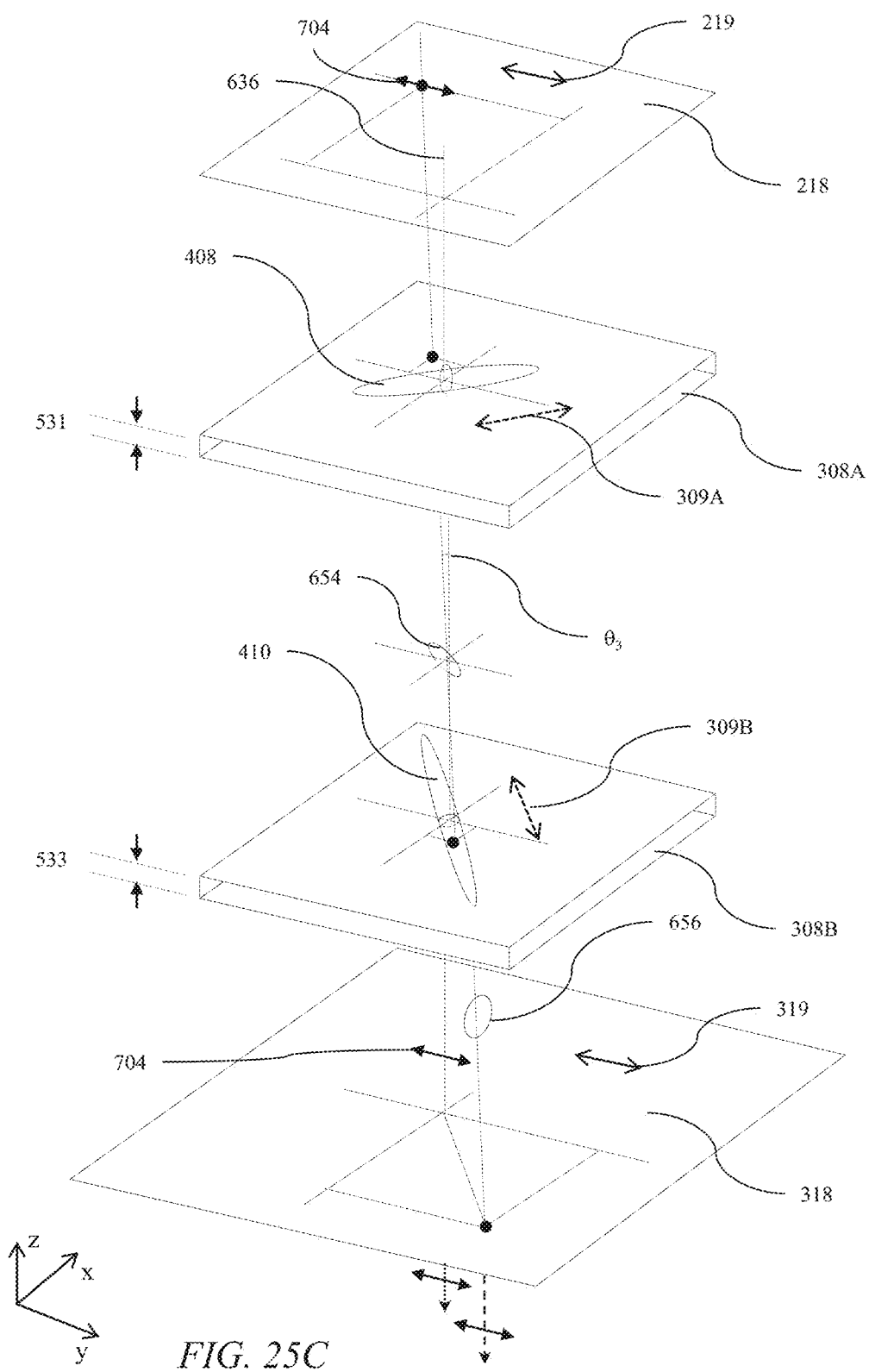
FIG. 25C is a schematic diagram illustrating in perspective view illumination of crossed A-plate retarder layers by off-axis polarised light with a positive elevation and negative lateral angle.

FIG. 25C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 218 with reduced luminance in comparison to the input luminance of the first polarisation component 704.

Figure 25D:
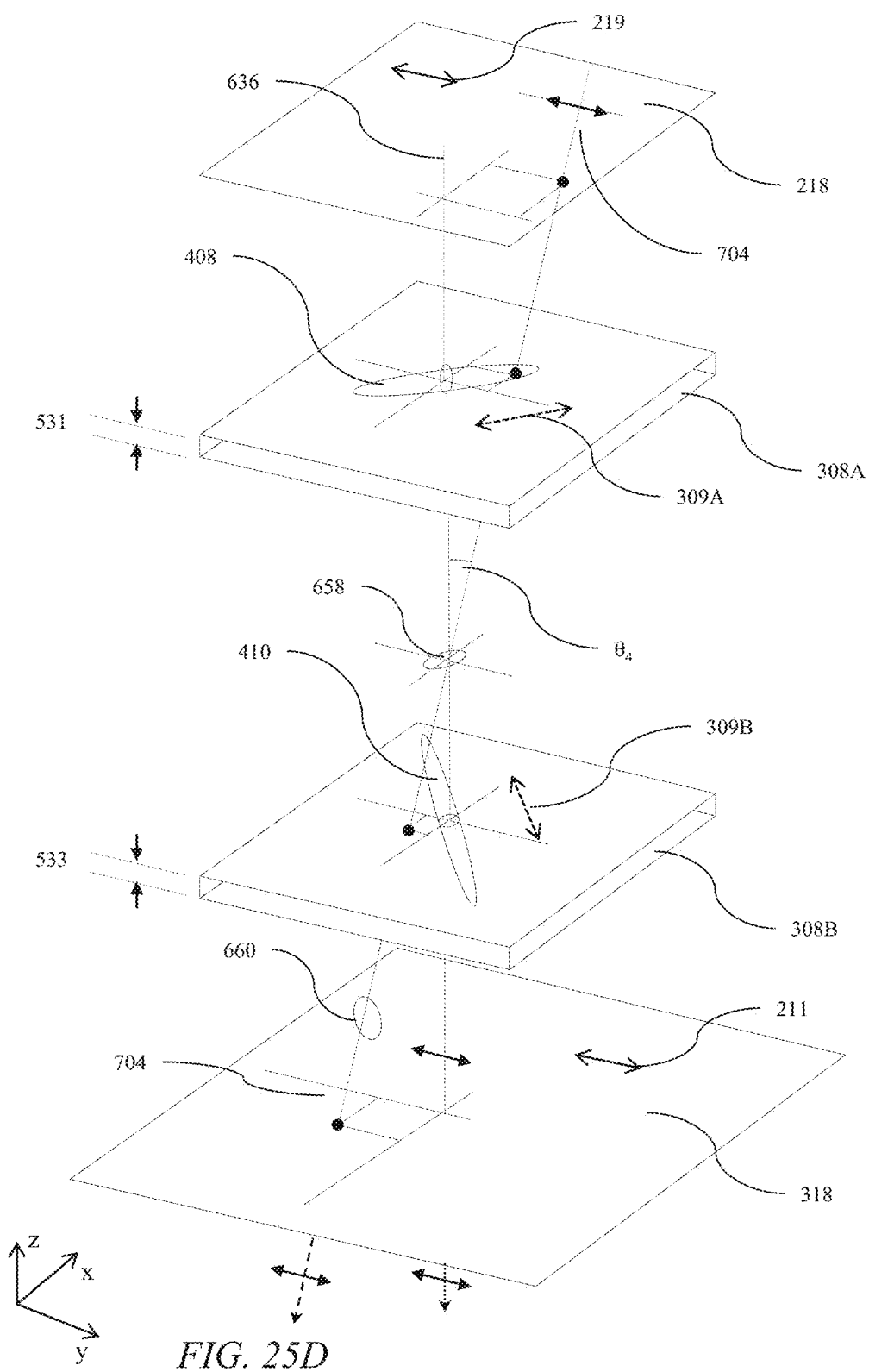
FIG. 25D is a schematic diagram illustrating in perspective view illumination of crossed A-plate retarder layers by off-axis polarised light with a positive elevation and positive lateral angle.

FIG. 25D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 25E:
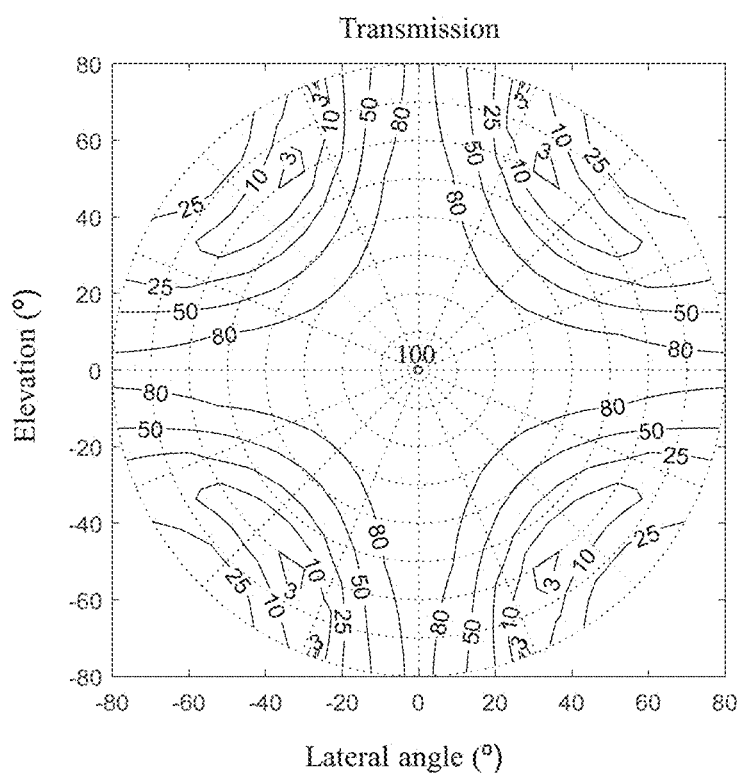
FIG. 25E is a schematic graph illustrating the variation of output transmission with polar direction for transmitted light rays in FIGS. 25A-D.

FIG. 25E is a schematic graph illustrating the variation of output transmission with polar direction for transmitted light rays in FIGS. 25A-D. In comparison to the arrangement of FIG. 24E, the area of luminance reduction is increased for off-axis viewing. However, the switchable liquid crystal retarder layer 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising:
a display device arranged to display an image, the display device having a selectively operable luminance-privacy optical arrangement arranged on operation to reduce the luminance of the image to an off-axis viewer, and a selectively operable contrast-privacy optical arrangement arranged on operation to reduce the contrast of the image to an off-axis viewer; and
a control system arranged to control the display device, the control system being capable of selectively operating either one or both of the luminance-privacy arrangement and the contrast-privacy arrangement, wherein the display device comprises:
a spatial light modulator; and
a display polarizer arranged on a side of the spatial light modulator, and
the luminance-privacy optical arrangement comprises:
an additional polarizer arranged on the same side of the spatial light modulator as the display polarizer; and
at least one retarder arranged between the additional polarizer and the display polarizer, the at least one retarder including a switchable liquid crystal retarder comprising a layer of liquid crystal material and electrodes arranged to apply a voltage for switching the layer of liquid crystal material, wherein the at least one retarder further includes at least one passive compensation retarder.

2. A display apparatus according to claim 1, wherein the control system is arranged to operate neither of the luminance-privacy arrangement and the contrast-privacy arrangement in a public mode and one or both of the luminance-privacy arrangement and the contrast-privacy arrangement in a privacy mode.

3. A display apparatus according to claim 2, wherein
the display apparatus further comprises an ambient light sensor arranged to detect the level of the ambient light, and
the control system is arranged, in the privacy mode, to operate the luminance-privacy arrangement when the ambient light sensor detects first levels of ambient light and to operate both the luminance-privacy arrangement and the contrast-privacy arrangement when the ambient light sensor detects second levels of ambient light below the first levels.

4. A display apparatus according to claim 3, wherein
the contrast-privacy optical arrangement is arranged on operation to reduce the contrast of the image to an off-axis viewer by a controllable amount, and
the control system is arranged, when operating the contrast-privacy arrangement, to control the amount of reduction of the contrast of the image to an off-axis viewer in dependence on the detected level of ambient light.

5. A display apparatus according to claim 3, wherein
the control system is arranged, in the privacy mode, to determine a visual security level representing the security against viewing of a displayed image by an off-axis viewer, the visual security level being dependent on the level of ambient light detected by the ambient light sensor and increasing as the level of ambient light increases, and
the control system is arranged, in the privacy mode, to selectively operate the luminance-privacy arrangement and the contrast-privacy arrangement to maintain the visual security level above a predetermined threshold.

6. A display apparatus according to claim 1, wherein the display device comprises:
a backlight;
a spatial light modulator comprising a layer of liquid crystal material arranged to receive light from the backlight and output light from an output side;
an input polarizer arranged on an input side of the spatial light modulator; and
an output polarizer arranged on the output side of the spatial light modulator, and
the contrast-privacy optical arrangement comprises at least one retarder arranged between the input polarizer and the output polarizer on either the input side or the output side of spatial light modulator,
the at least one retarder including a switchable liquid crystal retarder comprising a layer of liquid crystal material and electrodes arranged to apply a voltage for switching the layer of liquid crystal material.

7. A display apparatus according to claim 1, wherein the display device comprises a spatial light modulator comprising a layer of liquid crystal material and the contrast-privacy optical arrangement comprises at least one electrode arranged to apply a voltage to provide biased in-plane switching of the liquid crystal material.

8. A display apparatus according to claim 6, wherein the voltage is adjusted when the ambient light sensor detects second levels of ambient light below the first levels.

9. A display apparatus comprising:
a display device arranged to display an image, the display device having a selectively operable luminance-privacy optical arrangement arranged on operation to reduce the luminance of the image to an off-axis viewer, and a selectively operable contrast-privacy optical arrangement arranged on operation to reduce the contrast of the image to an off-axis viewer; and
a control system arranged to control the display device, the control system being capable of selectively operating either one or both of the luminance-privacy arrangement and the contrast-privacy arrangement, wherein the display device comprises:
a spatial light modulator; and
a display polarizer arranged on a side of the spatial light modulator, and
the luminance-privacy optical arrangement comprises:
an additional polarizer arranged on the same side of the spatial light modulator as the display polarizer; and
at least one retarder arranged between the additional polarizer and the display polarizer, the at least one retarder including a switchable liquid crystal retarder comprising a layer of liquid crystal material and electrodes arranged to apply a voltage for switching the layer of liquid crystal material, wherein the additional polarizer is arranged on the output side of the spatial light modulator and the luminance-privacy optical arrangement further comprises a reflective polarizer arranged between the at least one retarder and the display polarizer.

10. A display apparatus according to claim 9, wherein the control system is arranged to operate neither of the luminance-privacy arrangement and the contrast-privacy arrangement in a public mode and one or both of the luminance-privacy arrangement and the contrast-privacy arrangement in a privacy mode.

11. A display apparatus according to claim 10, wherein the display apparatus further comprises an ambient light sensor arranged to detect the level of the ambient light, and
the control system is arranged, in the privacy mode, to operate the luminance-privacy arrangement when the ambient light sensor detects first levels of ambient light and to operate both the luminance-privacy arrangement and the contrast-privacy arrangement when the ambient light sensor detects second levels of ambient light below the first levels.

12. A display apparatus according to claim 11, wherein
the contrast-privacy optical arrangement is arranged on operation to reduce the contrast of the image to an off-axis viewer by a controllable amount, and
the control system is arranged, when operating the contrast-privacy arrangement, to control the amount of reduction of the contrast of the image to an off-axis viewer in dependence on the detected level of ambient light.

13. A display apparatus according to claim 11, wherein
the control system is arranged, in the privacy mode, to determine a visual security level representing the security against viewing of a displayed image by an off-axis viewer, the visual security level being dependent on the level of ambient light detected by the ambient light sensor and increasing as the level of ambient light increases, and
the control system is arranged, in the privacy mode, to selectively operate the luminance-privacy arrangement and the contrast-privacy arrangement to maintain the visual security level above a predetermined threshold.

14. A display apparatus according to claim 9, wherein
the display device comprises:
a backlight;
a spatial light modulator comprising a layer of liquid crystal material arranged to receive light from the backlight and output light from an output side;
an input polarizer arranged on an input side of the spatial light modulator; and
an output polarizer arranged on the output side of the spatial light modulator, and
the contrast-privacy optical arrangement comprises at least one retarder arranged between the input polarizer and the output polarizer on either the input side or the output side of spatial light modulator,
the at least one retarder including a switchable liquid crystal retarder comprising a layer of liquid crystal material and electrodes arranged to apply a voltage for switching the layer of liquid crystal material.

15. A display apparatus according to claim 9, wherein the display device comprises a spatial light modulator comprising a layer of liquid crystal material and the contrast-privacy optical arrangement comprises at least one electrode arranged to apply a voltage to provide biased in-plane switching of the liquid crystal material.

16. A display apparatus according to claim 14, wherein the voltage is adjusted when the ambient light sensor detects second levels of ambient light below the first levels.

* * * * *